United States Patent
Wolfston, Jr. et al.

(10) Patent No.: US 11,977,834 B1
(45) Date of Patent: May 7, 2024

(54) METHOD AND SYSTEM FOR ANNOTATING AND ORGANIZING ASYNCHRONOUS COMMUNICATION WITHIN A GROUP

(71) Applicant: CollegeNET, Inc., Portland, OR (US)

(72) Inventors: James H. Wolfston, Jr., Portland, OR (US); Herts Chen, Portland, OR (US); Jeff M. Bolton, Portland, OR (US); Stuthi Neal Vennapusapalle, Portland, OR (US); Mikhail A. Krughkov, Portland, OR (US)

(73) Assignee: CollegeNET, Inc., Portland, OR (US)

( * ) Notice: Subject to any disclaimer, the term of this patent is extended or adjusted under 35 U.S.C. 154(b) by 0 days.

(21) Appl. No.: 17/979,456

(22) Filed: Nov. 2, 2022

(51) Int. Cl.
| | |
|---|---|
| *G06F 3/048* | (2013.01) |
| *G06F 3/0482* | (2013.01) |
| *G06F 40/169* | (2020.01) |
| *H04L 12/18* | (2006.01) |

(52) U.S. Cl.
CPC .......... *G06F 40/169* (2020.01); *G06F 3/0482* (2013.01); *H04L 12/1831* (2013.01); *G06F 2203/04803* (2013.01)

(58) Field of Classification Search
None
See application file for complete search history.

(56) References Cited

U.S. PATENT DOCUMENTS

| | | |
|---|---|---|
| 7,895,157 B2 | 2/2011 | Bedingfield, Sr. |
| 7,945,621 B2 | 5/2011 | Yuan et al. |
| 8,816,179 B2 | 8/2014 | Wang |
| 9,342,233 B1 * | 5/2016 | Dimson ........... G06F 40/242 |

(Continued)

OTHER PUBLICATIONS

International Search Report dated Feb. 7, 2023 in corresponding International Application No. PCT/US2022/079129.
(Continued)

*Primary Examiner* — Thanh T Vu
(74) *Attorney, Agent, or Firm* — Jones Day

(57) ABSTRACT

In one implementation, an asynchronous communications system for distributing communications among selected users whereby those users can generate and distribute new content based upon received communications may include a server for maintaining a plurality of asynchronous communicated content. The communicated content includes a video communication, a transcript synchronized to at least a part of an audio track of the video communication, a distribution list of recipients of the communicated content, and any annotations made to the communicated content. The system further includes an interactive graphical user interface operable on a device of a user. The device is in communication with the server to access communicated content received by the user. The graphical user interface includes a video region for playing a video communication of communicated content, a transcript region for displaying at least a part of the transcript synchronized to an audio track of the video communication, and an interactive menu having annotation options for the user to select that is responsive to the user (i) highlighting a text excerpt from the synchronized transcript, (ii) selecting at least one of the asynchronous annotation options, and (iii) generating an annotation to be associated with the highlighted text excerpt.

20 Claims, 57 Drawing Sheets

(56) References Cited

U.S. PATENT DOCUMENTS

| | | | |
|---|---|---|---|
| 2003/0106063 | A1 | 6/2003 | Guedalia |
| 2004/0143603 | A1 | 7/2004 | Kaufmann et al. |
| 2004/0261013 | A1 | 12/2004 | Wynn et al. |
| 2006/0147882 | A1 | 7/2006 | Sambucetti et al. |
| 2007/0277092 | A1 | 11/2007 | Basson et al. |
| 2011/0249954 | A1 | 10/2011 | Meek et al. |
| 2012/0151345 | A1 | 6/2012 | McClements, IV |
| 2012/0236201 | A1* | 9/2012 | Larsen ............. H04N 21/242 348/468 |
| 2015/0339787 | A1 | 11/2015 | Evans |
| 2018/0211552 | A1* | 7/2018 | Samuelson ......... G06F 16/7844 |
| 2022/0239516 | A1 | 7/2022 | Iyer et al. |

OTHER PUBLICATIONS

Written Opinion dated Feb. 7, 2023 in corresponding International Application No. PCT/US2022/079129.

"Canvas Studio: Engaging Higher Education" (Downloaded Oct. 19, 2023) 8 pages, Internet: https://www.instructure.com/higher-education/products/canvas/canvas-studio.

"Vidlogs: How It Works" (Downloaded Oct. 6, 2023) 9 pages, Internet: https://vidlogs.com/how-it-works/.

* cited by examiner

When the province of physical theory was extended to encompass microscopic phenomena through the creation of quantum mechanics, the concept of consciousness came to the fore again. It was not possible to formulate the laws of quantum mechanics in a fully consistent way without reference to the consciousness.

Ask
*"quantum mechanics"*
Does God play dice with the universe?

Respond:

FIG. 19

STEP 3: SET FILTER

About me:

Nickname [ ]
Age [ ]
Gender [ ]
Sexual preference [ ]

Choose what type of partner you are interested in:

Age [ ]
Gender [ ]
Sexual preference [ ]

FIG. 50

METHOD AND SYSTEM FOR ANNOTATING AND ORGANIZING ASYNCHRONOUS COMMUNICATION WITHIN A GROUP

TECHNICAL FIELD

The following disclosure relates to systems, methods, and devices for asynchronous communication systems within a group.

BACKGROUND

Conventional communications for business meetings, presentations, classroom lectures, etc. are typically live. Whether in-person or remote, the participants in the meeting/discussion must coordinate so as to be on the same schedule, at the same time. Whether the meeting is in a conference room, classroom, webinar, etc., those who wish to actively participate must be in simultaneous attendance. If attendees need to recall particular points of discussion, those attendees must take notes, either on paper or electronically. Also, during live presentations, participants' questions, comments, etc., may disrupt the presenter. In some instances, such disruptions might create difficulties for the presenter or might cause unwelcomed distractions for others in attendance.

Conventional communications can be recorded for later viewing, but that does not enable active participation. For example, a classroom lecture can be recorded by video or a webinar can be recorded for later playback on-demand. In these scenarios, those who watch later cannot be more than a passive observer. Once the recording has been made, the meeting, lecture, class, etc. has concluded. Additionally, if a person is interested in just a segment of a recorded conversation, that person needs to remember at what time that segment of the meeting had occurred.

For the past several decades, email has served as the primary medium for electronic asynchronous communication. Email allows a person to compose a message, and send it, along with attachments, to one or a set of recipients, each of whom can respond or forward to others, at any time after having received the message. Social media provides another way for a set of users to communicate with each other asynchronously, such as by posting and commenting on other's posts.

There is a need for an asynchronous communication system that facilitates the type of interactive discussion that is typically associated with live meetings/lectures, but in a manner where users can participate asynchronously. Such a system combines the capabilities of live meetings with the ability for participants to meaningfully contribute on their own timeframe.

SUMMARY

In one embodiment, an asynchronous communications system is described for distributing communications among selected users whereby those users can generate and distribute new content based upon received communications. The system may include a server for maintaining a plurality of asynchronous communicated content. The communicated content may include a video communication, a transcript synchronized to at least a part of an audio track of the video communication, a distribution list of recipients of the communicated content, and any annotations made to the communicated content. The system may further include an interactive graphical user interface operable on a device of a user. The device may be in communication with the server to access communicated content received by the user. The graphical user interface may include a video region for playing a video communication of communicated content, a transcript region for displaying at least a part of the transcript synchronized to an audio track of the video communication, and an interactive menu having annotation options for the user to select that is responsive to the user (i) highlighting a text excerpt from the synchronized transcript, (ii) selecting at least one of the asynchronous annotation options, and (iii) generating an annotation to be associated with the highlighted text excerpt.

In some embodiments, the annotation can be a textual annotation, an audio annotation, a video annotation, or a combination thereof. In some embodiments, the interactive graphical user interface is configured to display annotations that are associated with the displayed portion of the transcript. In some embodiments, the interactive graphical user interface is configured to change a text style of text excerpts in the displayed portion of the transcript that are associated with the displayed annotations. In some embodiments, the interactive graphical user interface includes an annotations region for displaying the annotations. In some embodiments, the interactive menu further includes user selection options for the user to select a subset of the recipients for whom the annotation is to be displayed. In some embodiments, the annotation includes a textual content retrieved from a third-party source based on the highlighted text excerpt.

In an embodiment, a method is described for distributing communications among selected users using an asynchronous communication system. The method includes receiving, from a server, a video communication selected for a user and a transcript of the video communication. The server may maintain a plurality of asynchronous communicated content. The communicated content may include the video communication, the transcript synchronized to at least part of an audio track of the video communication, a distribution list of recipients of the communicated content, and any annotations made to the communicated content. The method may further include displaying an identification of the video communication and controlling playback of the video communication in response to user-selections, and displaying the transcript of the video communication synchronized to the playback of the video communication. The method may further include generating an interactive menu having annotation options for the user to select that is responsive to the user (i) highlighting a text excerpt from the transcript, (ii) selecting at least one of the asynchronous annotation options, and (iii) generating an annotation to be associated with the highlighted text excerpt, and displaying annotations made by the user.

In some embodiments, the annotation can be a textual annotation, an audio annotation, a video annotation, or a combination thereof. In some embodiments, the displayed annotations are associated with the displayed portion of the transcript. In some embodiments, the method may further include displaying annotations that are (1) made by other users and (2) selected for the user. In some embodiments, the method may further include changing a text style of text excerpts in the displayed portion of the transcript that are associated with the displayed annotations. In some embodiments, the interactive menu further includes user selection options for the user to select a subset of the recipients for whom the annotation is to be displayed. In some embodiments, the annotation includes a textual content retrieved from a third-party source based on the highlighted text excerpt.

In an embodiment, a computer-readable storage medium is described comprising instructions which, when executed by a computer, may cause the computer to carry out, a method for distributing communications among selected users using an asynchronous communication system. The method may include receiving, from a server, a video communication selected for a user and a transcript of the video communication. The server may maintain a plurality of asynchronous communicated content, wherein communicated content includes the video communication, the transcript synchronized to at least part of an audio track of the video communication, a distribution list of recipients of the communicated content, and any annotations made to the communicated content. The method may further include displaying an identification of the video communication and controlling playback of the video communication in response to user-selections, and displaying the transcript of the video communication synchronized to the playback of the video communication. The method may further include generating an interactive menu having annotation options for the user to select that is responsive to the user (i) highlighting a text excerpt from the transcript, (ii) selecting at least one of the asynchronous annotation options, and (iii) generating an annotation to be associated with the highlighted text excerpt, and displaying annotations made by the user.

In some embodiments, the annotation can be a textual annotation, an audio annotation, a video annotation, or a combination thereof. In some embodiments, the displayed annotations are associated with the displayed portion of the transcript. In some embodiments, the method may further include displaying annotations that are (1) made by other users and (2) selected for the user. In some embodiments, the method may further include changing a text style of text excerpts in the displayed portion of the transcript that are associated with the displayed annotations. In some embodiments, the interactive menu further includes user selection options for the user to select a subset of the recipients for whom the annotation is to be displayed. In some embodiments, annotation includes a textual content retrieved from a third-party source based on the highlighted text excerpt.

Non-transitory computer program products (i.e., physically embodied computer program products) are also described that store instructions, which when executed by one or more data processors of one or more computing systems, cause at least one data processor to perform operations described herein. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The above and other aspects and their implementations are described in greater detail in the drawings, the descriptions, and the claims.

BRIEF DESCRIPTION OF THE DRAWINGS

The patent or application file includes at least one drawing executed in color. Copies of this patent or patent application publication with color drawing(s) will be provided upon request.

FIG. 19 is an example screen of an interactive GUI displaying annotation options available to the user in response to the user selecting an ask option.

FIG. 50 is another example screen of an online dating site using an asynchronous communication system for dating profile data entry.

DETAILED DESCRIPTION

In accordance with various embodiments, the present disclosure is directed to an asynchronous communications system, including a communications protocol and graphical user interface, that is conducive to conducting, organizing, and archiving interactive, yet asynchronous, discussions among a group. This system can be used for various applications as a supplement to, or replacement for, having live communications among a group. As examples, this system can be used for providing educational courses, for conducting meetings and other business communications, for conducting interviews such as for employment opportunities or for admission to universities, or for communications in social settings.

As described herein, the asynchronous communication system can maintain and facilitate an evolving set of video and text-based content that can provide a full-on replacement/asynchronous video alternative to a meeting environment (e.g., classroom, in-person meeting, web meeting, etc.) itself. This provides an alternative to the meeting environment eliminating the need for scheduling a fixed meeting time or meeting place.

Traditional meeting environments facilitate one-way communication. For example, a speaker makes a statement and observers watch and listen to that statement. As an observer participating in a traditional meeting environment, one can only observer events occurring in sequence and pace in which the speaker makes them. Additionally, an observer is bound by the pace set by the speaker. Use of the asynchronous communication system described herein, an observer can interactively participate in a discussion at his/her own pace, rather than the speaker's pace, and can contribute to the discussion at relevant points along the way.

The asynchronous communication system centers around a video messaging system that contains structured video messages (e.g., "threads") that are created by a first user and/or other used and exchanged and expanded over time amongst them. The asynchronous communication system allows any participant to compose and deliver threads to subgroups of users (e.g., user to user, user to several users, first user to second user and other users). As described in detail herein, the asynchronous communication system can be used in a number of different application settings such as a corporate environment such as corporate interviews or meetings, a dating website, a classroom setting, and the like.

Figure 1:
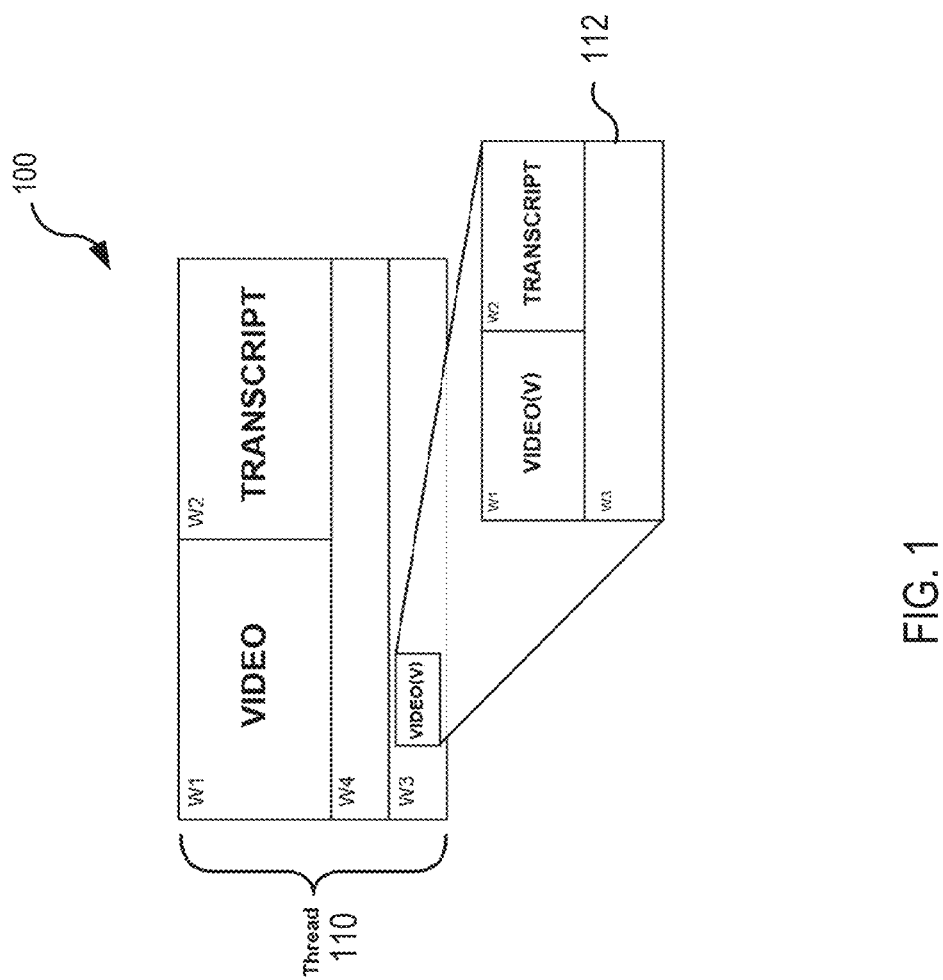
FIG. 1 is a block diagram illustrating an example message thread generated using an asynchronous communication system according to at least one embodiment.

FIG. 1 is a block diagram 100 illustrating an example message thread generated using an asynchronous communication system 304 according to at least one embodiment. The example message thread 110 includes a playable video component W1 including audio of spoken words, a synced transcript W2 of those spoken words, and a reserved space W3 that can embedded another message thread 112. The message thread 110 can be archived or saved in a data store 310 or provided to other users of the asynchronous communication system 304. The message thread 110 can be displayed to a user via an interactive GUI. A user that originates a given message thread (e.g., thread 110, thread 112) is an originator of that message thread. Message threads 110, 112 can be generated by an originator through annotation of the interactive GUI. For example, by right-clicking any video appearing anywhere in a given thread, a user can originate a new thread (e.g., thread 112) by right-clicking on a video to pull it into a new W1 as the subject for the new thread.

Figure 2:
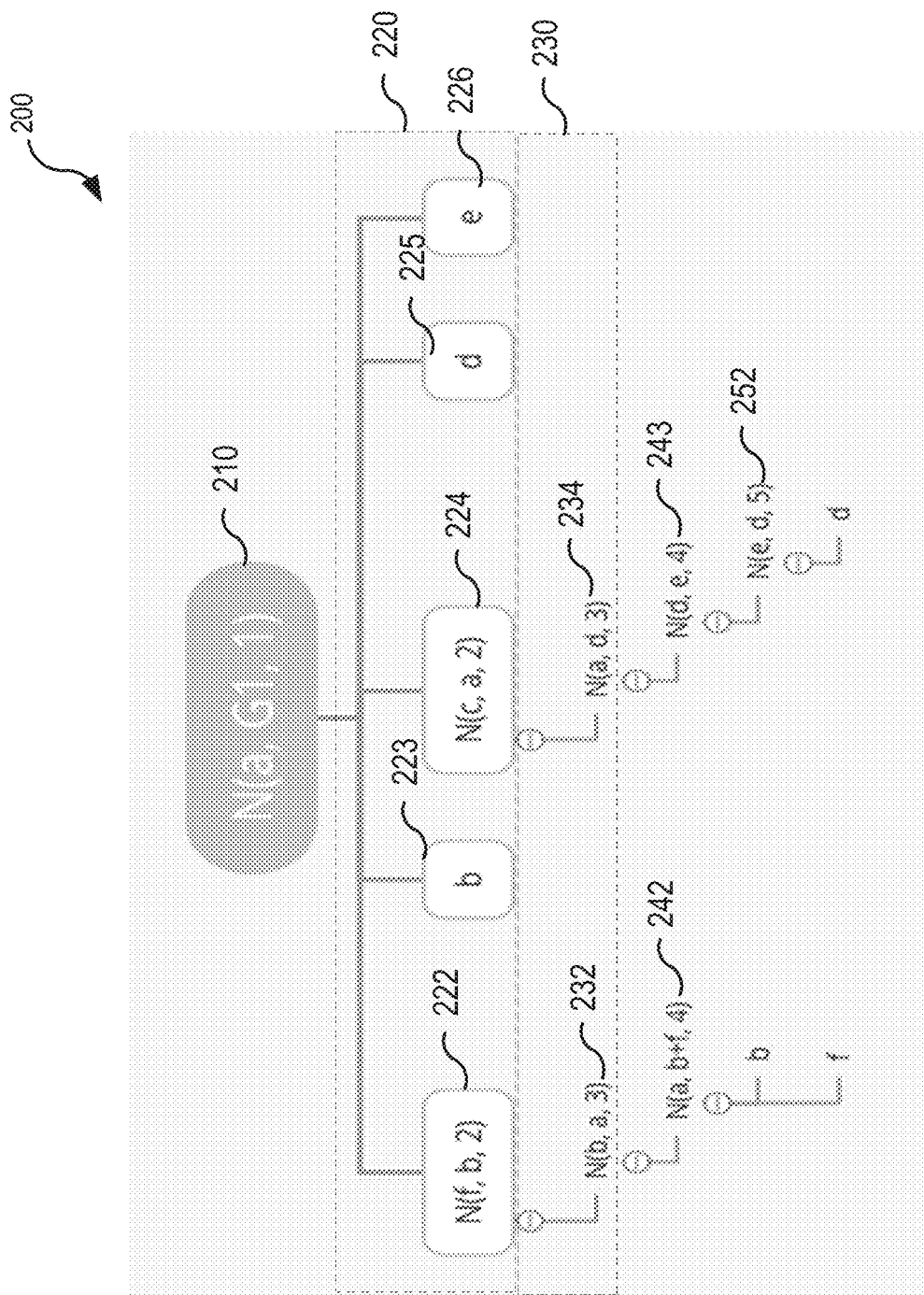
FIG. 2 is a block diagram illustrating an example data structure for generated message threads within an asynchronous communication system.

FIG. 2 is a block diagram illustrating an example data structure 200 for generated message threads 110 within an asynchronous communication system 304. As previously discussed in FIG. 1, a user (e.g., an originator) generates a message thread 110 with components W1, W2, W3, and sends that thread 110 to a group of users (G1): users a, b, c, d, e, f, etc. in FIG. 2. When a user annotates a synced transcript W2 at a timestamp T of the video W1, that video W1 and transcript W2 are tagged by the user, along with that user's questions, lookup, notes, and the like in W3. This is denoted in the message as Mx+Tx, where x represents the number of the marking. A node "N" is used to represent W1/W2/W3, the originator (e.g., sending user), the subscribers (e.g., receiving users), and Mx+Tx. Every window vertically in a given thread may contain W1/W2 in addition to its W3. In other words, every window such as W4 may contain its own recoding video, transcription, messages, and M+T. Therefore, every node can be structured with W1/W2/W3 at all levels of a communication.

Such a node is denoted mathematically or symbolically as: N(x, y, z), where N represents a node, x represents a sending user (e.g., originator), y represents one or more receiving users (e.g., recipients), and z represents a level (or depth) of windows counting from W1/W2/W3 at level 1, W4 at level 2, and Wx at level Z. More specifically, the data structure 200 in FIG. 2 is an acyclic recursion of connected nodes (e.g., N(x, y, z)) starting from z=1 down to level Z. At each level z, there could be 1 or many nodes sent from user x to user y. In FIG. 2, a node 110 is a window containing W1/W2/W3. This window is sent from user a to group G1 at tree (thread) level 1 (e.g., level 220). Likewise, node 222 (e.g., N(f, b, 2)) is a window sent from user f to user b at level 2 (e.g., level 230) upon receiving N(a, G1, 1). Group G1 is the recipient group at level 1 (e.g., level 200), which includes user b, c, d, e, f User f in turn sends a node 222 (e.g., N(f, b, 2)), and user c sends node 224 (e.g., N(c, a, 2)). However, recipient users b, d, e did not respond by sending any node upon receiving N(a, G1, 1). As such, users b, d, e are each a terminal node containing only their user ID. In other words, nodes 223, 225, 226 are terminal nodes. Such terminal nodes are also called leaf nodes in a tree.

Each node within data structure 200 includes various permissions (e.g., visibility) of each user. More specifically, user a can see any nodes containing markings of a as well as the originating node (e.g., nodes 210 224, 232, 234, 242. User b can see any nodes containing markings of b as well as the originating node (e.g., nodes 210, 222, 232, 242). User c can see any nodes containing markings of c as well as the originating node (e.g., nodes 210, 224). User d can see any nodes containing markings of d as well as the originating node (e.g., nodes 210, 234, 243, 252). User e can see any nodes containing markings of e as well as the originating node (e.g., nodes 210, 243, 252). User f can see any nodes containing markings off as well as the originating node (e.g., nodes 210, 222, 242).

Figure 3:
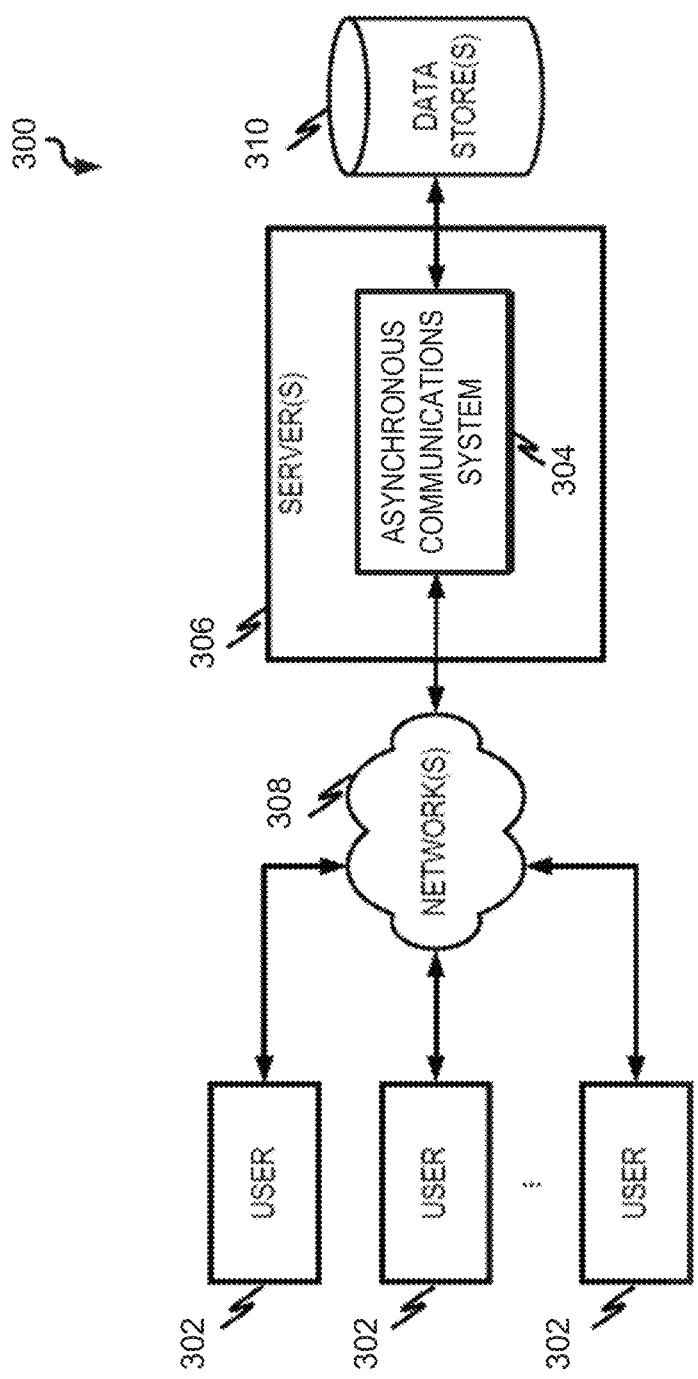
FIG. 3 illustrates an example computer-implemented environment wherein users can interact with an asynchronous communications system for maintaining and facilitating an evolving set of video and text-based content as described herein, hosted on one or more servers through a network.
Figure 7:
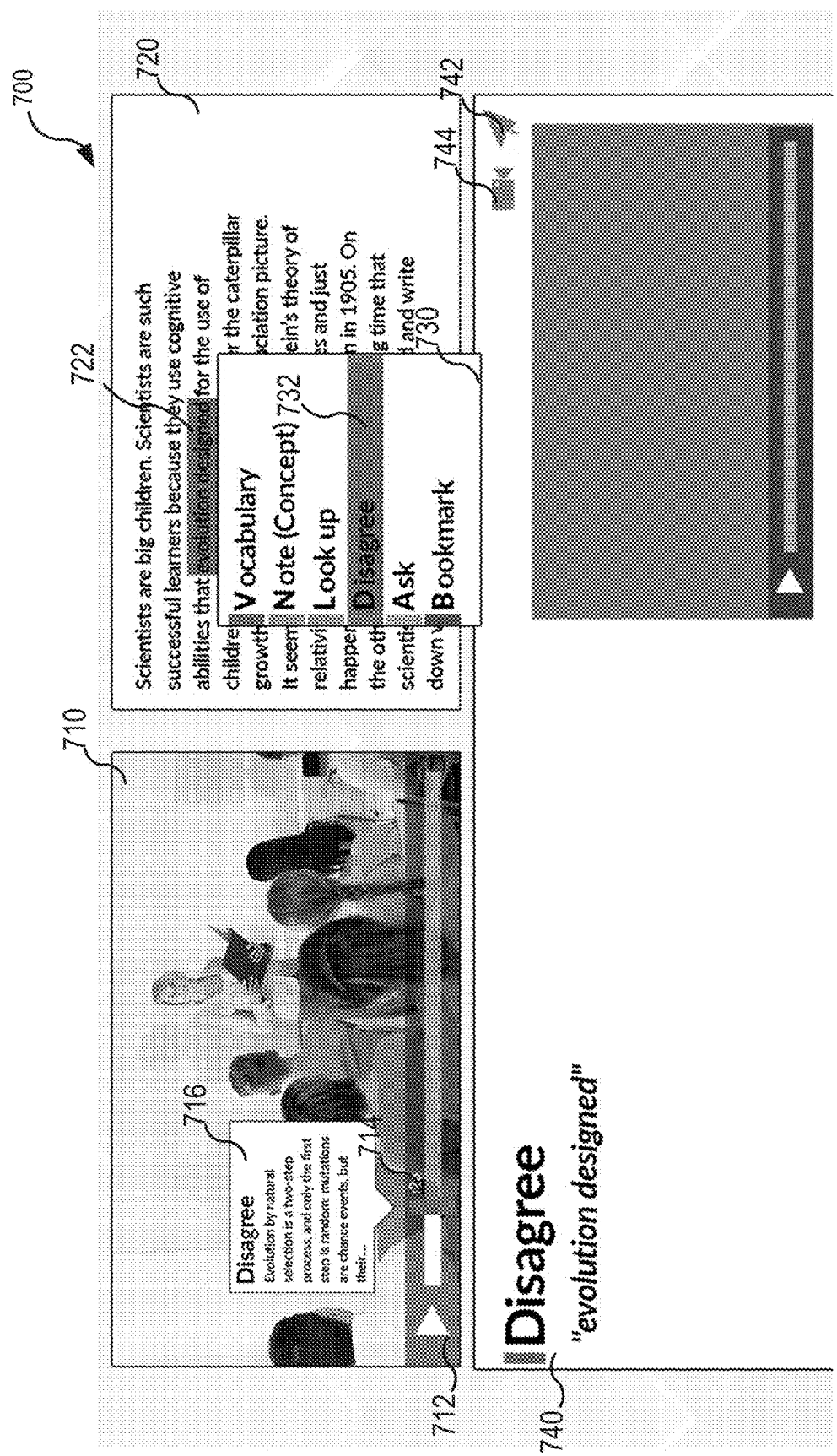
FIG. 7 is another example screen of an interactive GUI displaying annotation options available to the user with the user selecting a disagreement option.

FIG. 3 illustrates an example computer-implemented environment 300 wherein users 302 can interact with an asynchronous communications system 304 for maintaining and facilitating an evolving set of video and text-based content as described herein, hosted on one or more servers 306 through a network 308. Alternatively, or additionally, system 304 may be configured to distribute communications among selected users whereby those users can generate and distribute new content based upon received communications. The asynchronous communications system 304 can assist the users 302 with interfacing between an object-oriented modeling language-based interface and a hardware description language-based interface. For example, users 302 can use the asynchronous communication system 304 to receive information, participate in a dialogue to comment, and/or augment the information being shared, and create additional conversations. Particularly, this is done using one or more datastores 310 containing at least three types of information: audio, visual, and written. A primary video communication is made available to users 302 along with a synced transcript. Authorized users (e.g., a subset of users 302) can access the video and/or synced transcript and use a graphical user interface (GUI) to annotate the primary video communication and/or synced transcript. For example, users can designate certain excerpts of the video/transcript, prepare annotations, notes, and the like. Such annotations are described in more detail in FIGS. 7-10. The user 302 can designate these edits and/or additions to be associated with the user's account, and/or the user 302 can share any of them with other users. For example, the users 302 can interact with the asynchronous communications system 304 and/or other users 302 through several ways, such as over one or more networks 308. One or more servers 306 accessible through the network(s) 308 can host the asynchronous communications system 304. For example, server 306 can maintain asynchronous annotations of communicated content such as a post of a primary video communication, a synched transcript of the video communication, and any number of user annotations made in response to the primary video communication. The one or more servers 306 can also contain or have access to one or more data stores 310 for storing data for the asynchronous communications system 304. Additionally, or alternatively, server 306 may be configured to maintain a plurality of asynchronous communicated content. A communicated content may include a video communication, a transcript synchronized to at least a part of an audio track of the video communication, a distribution list of recipients of the communicated content, and any annotations made to the communicated content. Through annotation of an interactive graphical user interface (GUI), which may be operable on a device of a user, users 302 can access a personalized page of the asynchronous annotations of the communicated content. The device of a user may be in communication with the server to access communicated content received by the user. The personalized page can enable a user 302 to access the communicated content. The interactive GUI can be responsive to various annotations of the user 302 such as (i) designating excerpts from the synched transcript for quick access, (ii) generating notes prepared by the user regarding the communicated content, and (iii) generating textual, audio, or video responses to the communicated content to be posted via the server 106 to the GUI associated with one or more users 302. As shown in FIG. 7 below, in some embodiments, the GUI may include a video region for playing a video communication of communicated content, a transcript region for displaying at least a part of the transcript synchronized to an audio track of the video communication, and an interactive menu having annotation options for the user to select that is responsive to the user (i) highlighting a text excerpt from the synchronized transcript, (ii) selecting at least one of the asynchronous annotation options, and (iii) generating an annotation to be associated with the highlighted text excerpt.

The asynchronous communications system 304 is an example flexible information transversal (FIT) system that facilitates users 302 to digest information at their own pace. Such a system allows users 302 to interactively alter an original communication medium (e.g., audio, visual, or written element) into a record of their transversal. More specifically, an original communication medium can be transformed by one or more users 302 through annotations, underlines, highlighting, bookmarking or dogearing, and/or marginalia.

One example application of the asynchronous communication system 304 is in a collegian environment, which is described in more detail in FIGS. 4-36. In a collegian environment, users 302 (e.g., students) can individually dissect and/or analyze lecture videos (e.g., pre-recorded videos or livestreamed video) that they receive from a lecturer (e.g., professor, teaching assistant, and the like) or other students in class. Those individually dissected videos can then be transmitted to other students or back to the lecturer for further analysis and discussion.

Figure 4:
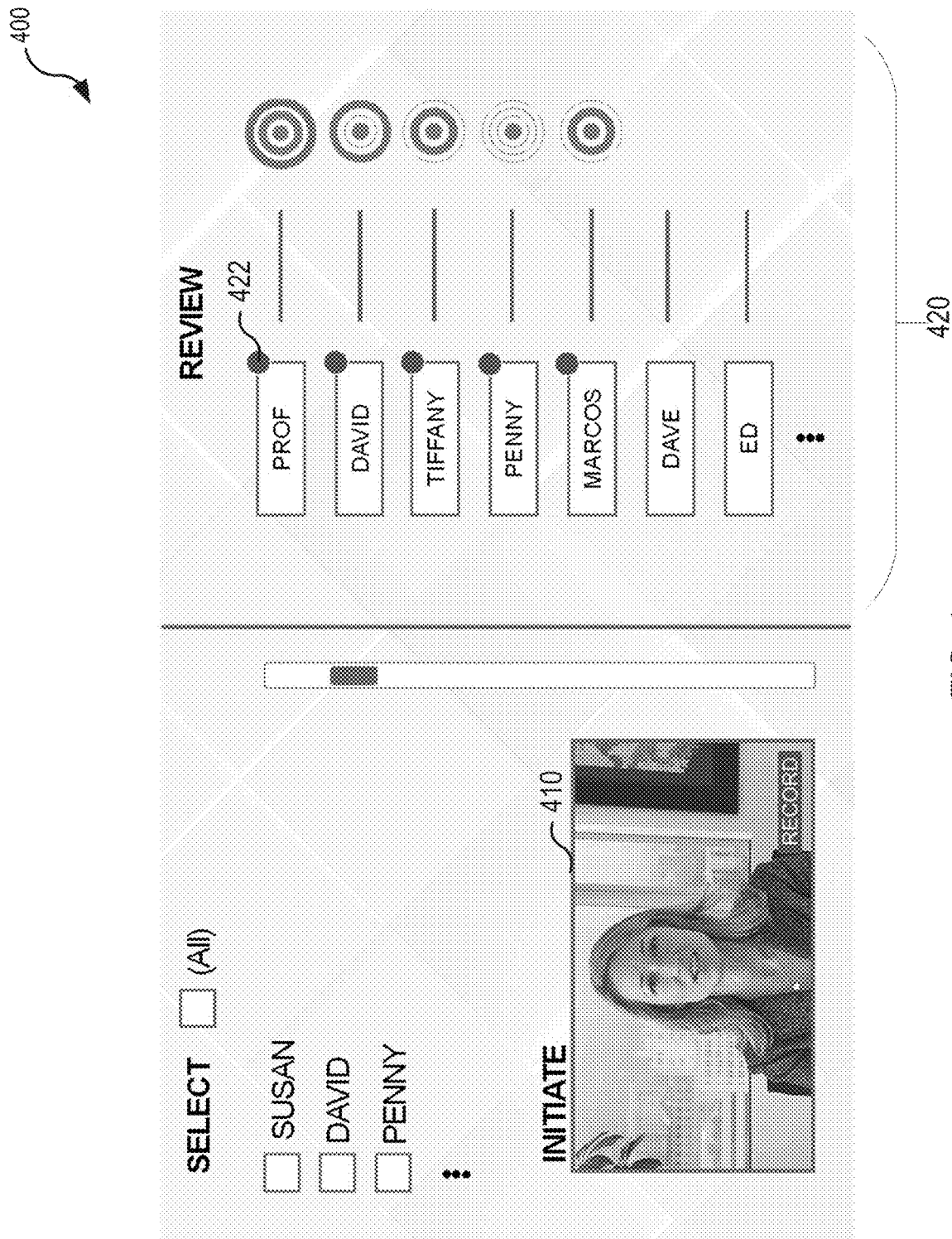
FIG. 4 is an example screen of an interactive GUI of an asynchronous communication system.

FIG. 4 is an example screen 400 of an interactive GUI of an asynchronous communication system 304. In the collegian setting, a class can include a professor and a plurality of students (e.g., David, Tiffany, Penny, Marcos, Dave, Ed, Susan, Penny, etc.). The screen 400 includes a primary video communication 410 that can be recorded by a professor. That primary video communication 410 can then be distributed to the students of the class via a video messaging inbox 420 that contains structured video messages or threads. Each user can receive a prompt 422 alerting them that a structured video thread awaits their review.

Figure 5:
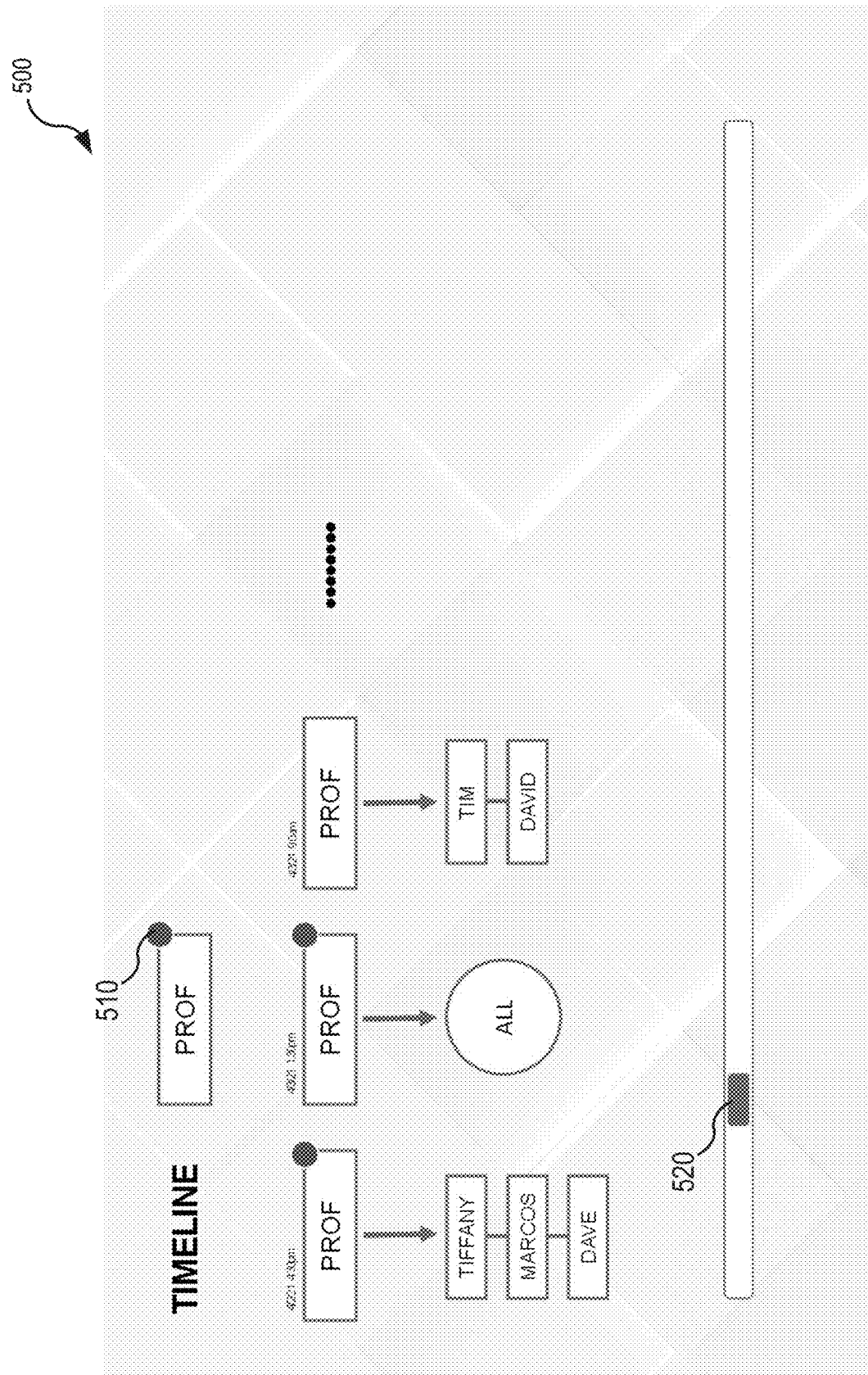
FIG. 5 is another example screen of an interactive GUI displaying an example timeline of generated threads having message alerts.

FIG. 5 is another example screen 500 of an interactive GUI displaying an example timeline of generated threads having message alerts 510. A professor can originate a first thread. That thread can be distributed to a subset of students in the class (e.g., Tiffany, Marco, and Dave) at a first timestamp (e.g., 4/2/21 at 4:30 PM). At a second timestamp (e.g., 4/3/21 at 1:30 PM), the professor can distribute the thread to the entire class. At a third timestamp, the professor can distribute the thread to another subset of students in the class (e.g., Tim, David). This distribution process can continue indefinitely. Interactive scroll bar 520 can be annotated by a user to scroll left or right on the timeline. A left scroll moves the timeline back in time relative to a current time displaying on the timeline. A right scroll moves the timeline forward in time relative to a current time displaying on the timeline.

Figure 6:
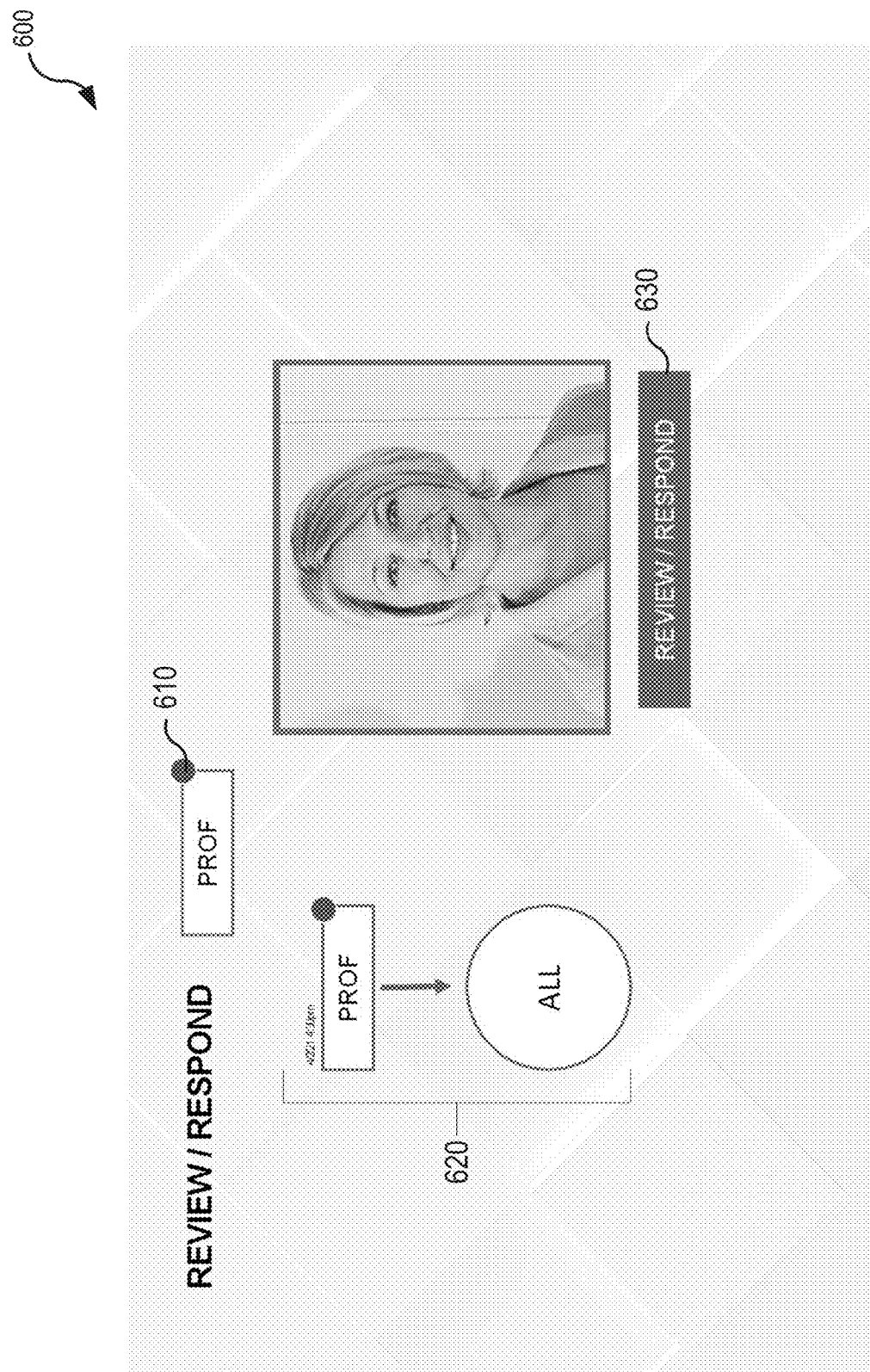
FIG. 6 is another example screen of an interactive GUI of a recipient user of a thread.

FIG. 6 is another example screen 600 of an interactive GUI of a recipient user of a thread. For example, a user can receive a prompt 610 to review/respond to the professors thread. The interactive GUI also displays a notification 620 of which users received the thread. The user can annotate the screen 600 by selecting the review/respond radio button 630 to review the thread from the professor and/or respond to it.

FIG. 7 is another example screen 700 of an interactive GUI displaying annotation options available to the user with the user selecting a disagreement option. Screen 700 can be, for example, a personalized page for the user that enables the user to annotate communicated content (e.g., the primary video communication 410 from the professor). The screen 700 includes a playable video component 710 (i.e., a video region for playing a video communication of communicated content) that can be interactively played, paused, and/or stopped in response to the user interfacing with playback feature buttons 712. The screen 700 can also include a synced transcript 720 that is synced to the playable video component 710 (i.e., a transcript region for displaying at least a part of the transcript synchronized to an audio track of the video communication). The user can interface with the interactive GUI using, for example, an interactive menu 730. Menu 730 lists a number of potential user annotations available (i.e., annotation options for users to select) such as "Vocabulary," "Note (Concept)," "Look up," "Disagree," "Ask," or "Bookmark." In the example screen 700 of FIG. 7, a user selects and highlights a portion 722 of the synced transcript 720 (i.e., text excerpt from the synchronized transcript) that they disagree with. The user then selects the "Disagree" user annotation 732, an asynchronous annotation option, from menu 730, which is color coded with the color red. This portion 722 can also be highlighted in red (e.g., the color corresponding to the "Disagree" user annotation 732 on menu 730) to illustrate to the user that the particular user annotation was selected. This portion 722 is flagged at a timestamp 714 of the playable video component 710 and a message thread (as explained in detail in FIGS. 1-2) is generated. After the annotation is generated and associated with the highlighted text excerpt, other viewers can be alerted of this user annotation via their video messaging inbox 420 and can subsequently review/respond to the user's annotation in the same manner described in FIG. 4. Additionally, an animated pop-up 716 can illustrate the user annotation on the playable video component 710 at the timestamp 714 that is synced with the portion 722 of the synced transcript 720. In other words, the annotation options are responsive to the user (i) highlighting a text excerpt from the synchronized transcript, (ii) selecting at least one of the asynchronous annotation options, and (iii) generating an annotation to be associated with the highlighted text excerpt Screen 700 also includes a summary section 740 highlighting the user annotation of the disagreement and the portion 722 of the synced transcript 720. The summary section 740 also includes a send option 742 that facilitates sending the user annotation to other users' video messaging inbox 420. Additionally, summary section 740 includes a video jump to option 744 that allows the user to view the relevant timestamp 714 of the playable video component 710.

Figure 8:
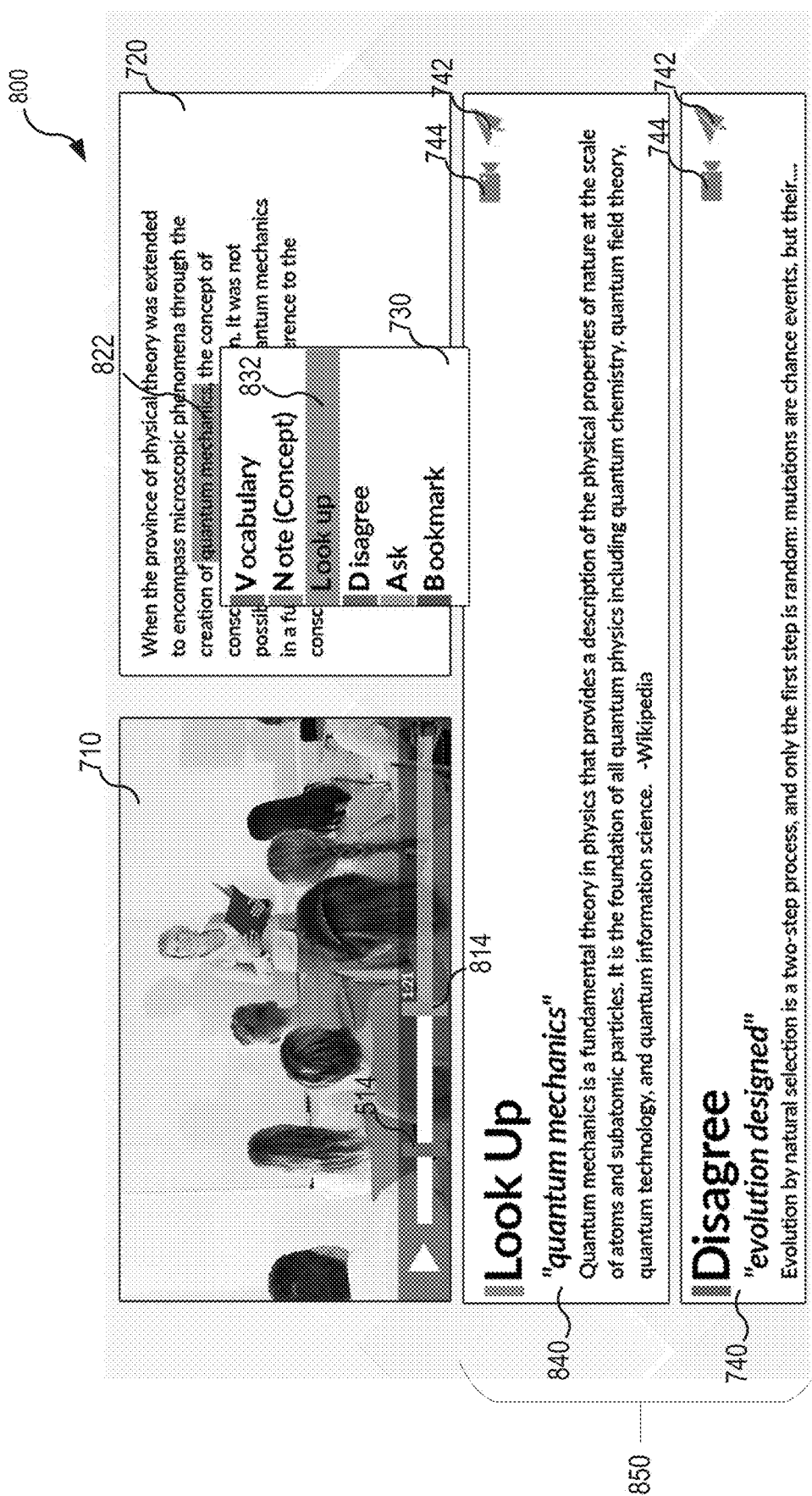
FIG. 8 is another example screen of an interactive GUI displaying annotation options available to the user with the user selecting a look-up option.

FIG. 8 is another example screen 800 of an interactive GUI displaying annotation options available to the user with the user selecting a look up option. Example screen 800 has similar components to screen 700 of FIG. 7. In FIG. 8, the user selects and highlights a portion 822 of the synced transcript 720. The user then selects the "Look up" user annotation 832 from menu 730, which in turn provides a dictionary definition of the portion 822 (e.g., term "quantum mechanics"). Alternative to, or in addition to, retrieving a dictionary definition from a dictionary source, the annotation may include content retrieved from other third-party sources, such as Wikipedia, social media, or intranet/internet (e.g., google). The retrieved content may be selected based on the highlighted portion 822. For example, a text excerpt from the highest ranked Wikipedia entry using highlighted portion 822 as search terms may be included in the annotation. As shown in FIG. 8, the "Look up" user annotation 832 is associated with the color green on menu 832. The portion 822 can also be highlighted in green (e.g., the color corresponding to the "Look up" user annotation 832 on menu 830) to illustrate to the user that the particular user annotation was selected. In some cases, the dictionary definition can be a pre-stored definition within data store 310. In other cases, the dictionary definition can be provided by an external source such as a website via network 308. This portion 822 is flagged at a timestamp 814 of the playable video component 710 and a message thread (as explained in detail in FIGS. 1-2) is generated. Other viewers can be alerted of this user annotation via their video messaging inbox 420 and can subsequently review/respond to the user's annotation in the same manner described in FIG. 4.

Screen 800 also includes a cumulative summary 850 of user annotations to date including (i) a summary section 840 highlighting the user annotation of the look-up along with the portion 822 of the synced transcript 722 and the relevant definition and (ii) a summary section 740 highlighting the user annotation of the disagreement previously entered as described in FIG. 7 along with the portion 722 of the synced transcript 720. In some embodiments, the interactive graphical user interface is configured to display annotations that are associated with the displayed portion of the transcript. In some embodiments, the display annotations may have been generated by the user and/or other users on the system.

Figure 9:
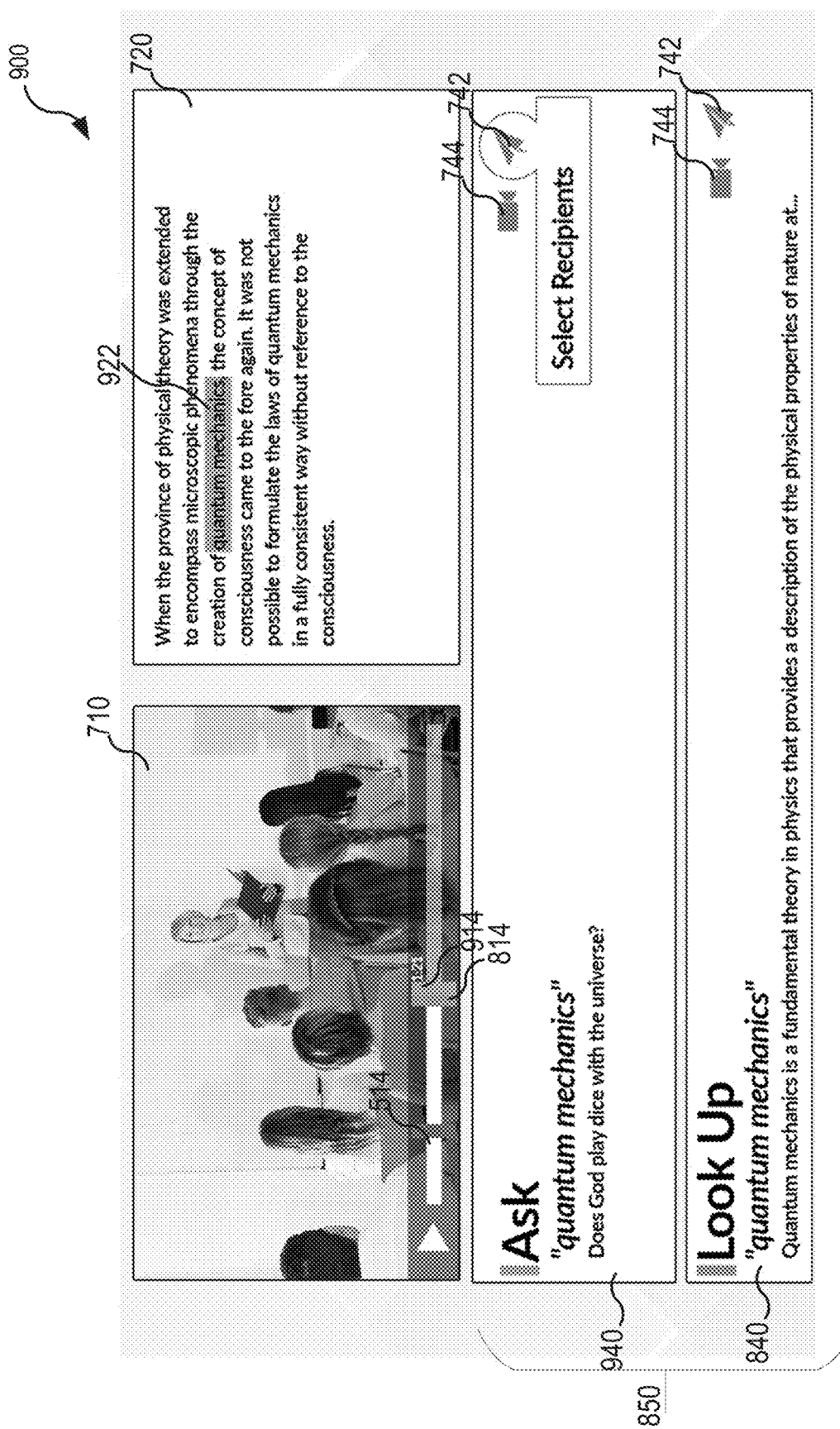
FIG. 9 is an example screen of an interactive GUI displaying annotation options available to the user with the user selecting an ask option.

FIG. 9 is an example screen 900 of an interactive GUI displaying annotation options available to the user with the user selecting an ask option. Example screen 900 has similar components to screen 700 of FIG. 7. In FIG. 9, the user selects and highlights a portion 922 of the synced transcript 720. The user then selects the "Ask" user annotation from menu 730, which in turn prompts a user to enter a question regarding the portion 922 of the synced transcript 720. The "Ask" user annotation on menu 730 is associated with the color orange. The portion 922 can also be highlighted in orange (e.g., the color corresponding to the "Ask" user annotation on menu 730) to illustrate to the user that the particular user annotation was selected. This portion 922 is flagged at a timestamp 914 of the playable video component 710 and a message thread (as explained in detail in FIGS. 1-2) is generated. Other viewers can be alerted of this user annotation via their video messaging inbox 420 and can subsequently review/respond to the user's annotation in the same manner described in FIG. 4.

Screen 900 also includes a cumulative summary 850 of user annotations to date including (i) a summary section 940 highlighting the user annotation of the asking of a question along with the portion 922 of the synced transcript 722 and (ii) a summary section 840 highlighting the user annotation of the look-up along with the portion 822 of the synced transcript 722 and the relevant definition previously described in FIG. 8.

Figure 10:
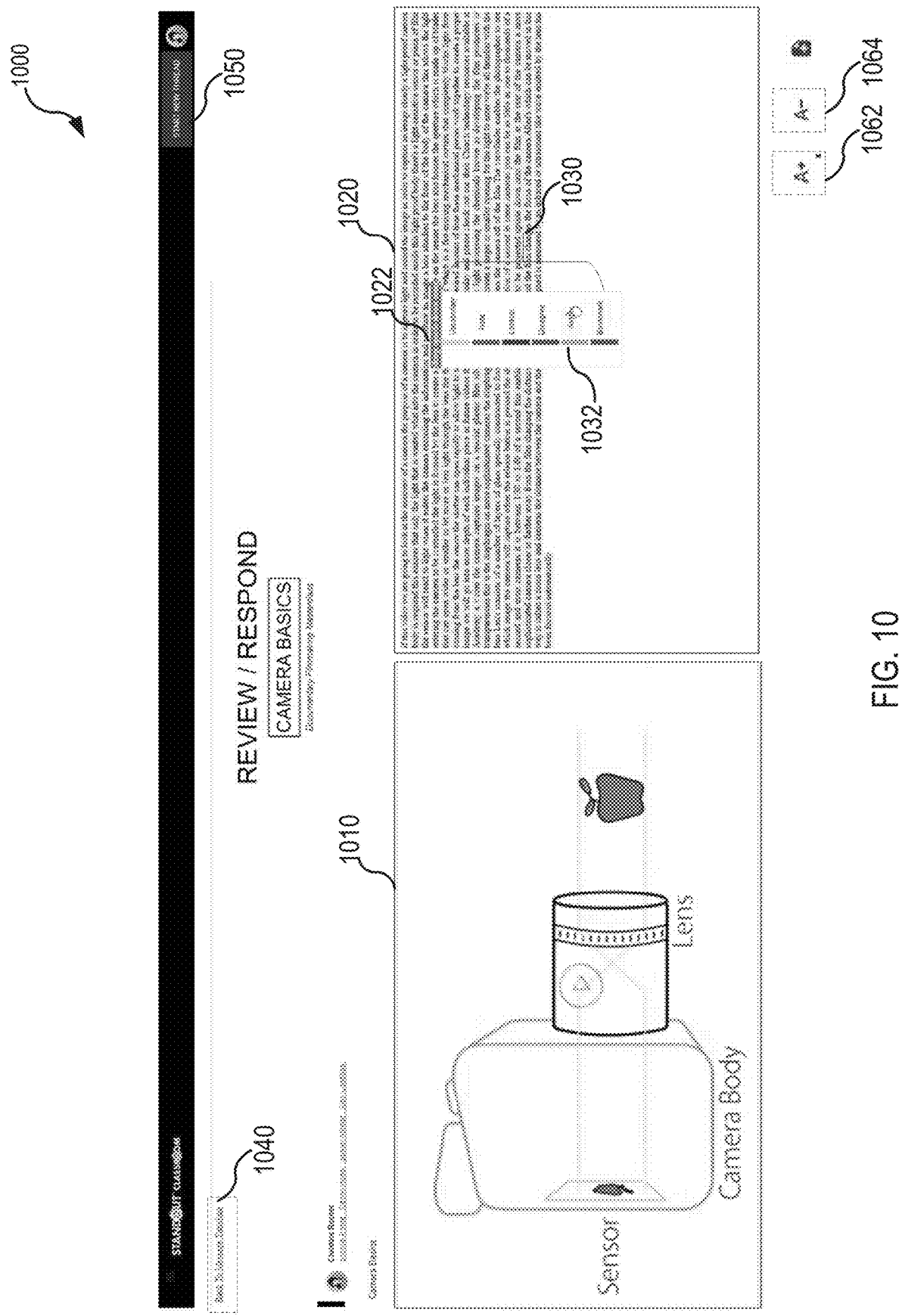
FIG. 10 is another example screen of an interactive GUI displaying annotation options available to the user with the user selecting the ask option.

FIG. 10 is another example screen 1000 of an interactive GUI displaying annotation options available to the user with the user selecting the ask option. Screen 1000 can be, for example, a personalized page for the user that enables the user to annotate communicated content. The screen 1000 includes a playable video component 1010 that can be interactively played, paused, and/or stopped in response to the user interfacing with playback feature buttons that appear when the user hovers over the playable video component 1010 with a pointer device (e.g., playback features 1612 of FIG. 16). The screen 1000 can also include a synced transcript 1020 that is synced to the playable video component 1010. The user can increase the font size of the synced transcript 1020 by selecting the increase font feature 1062. The user can decrease the font size of the synced transcript 1020 by selecting the decrease font feature 1064. The user can interface with the interactive GUI using, for example, menu 1030. Menu 1030 lists a number of potential user annotations available such as "Vocabulary," "Note," "Look up," "Disagree," "Ask," or "Bookmark." In the example screen 1000 of FIG. 10, a user selects and highlights a portion 1022 of the synced transcript 1020 that they would like to ask a question on. The user then selects the "Ask" user annotation 1032 from menu 1030.

Figure 24:
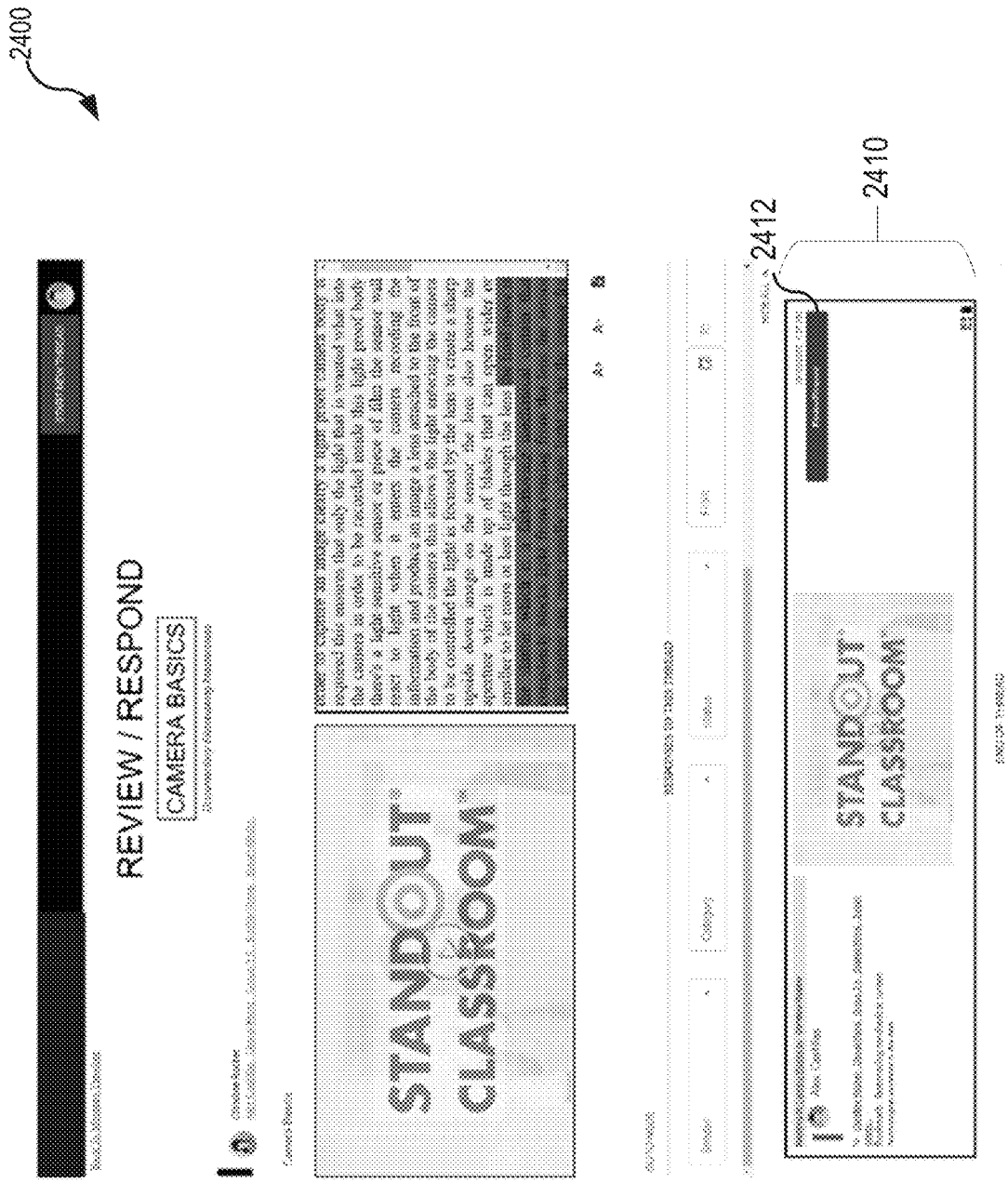
FIG. 24 is an example screen of an interactive GUI displaying a sent annotation.
Figure 33:
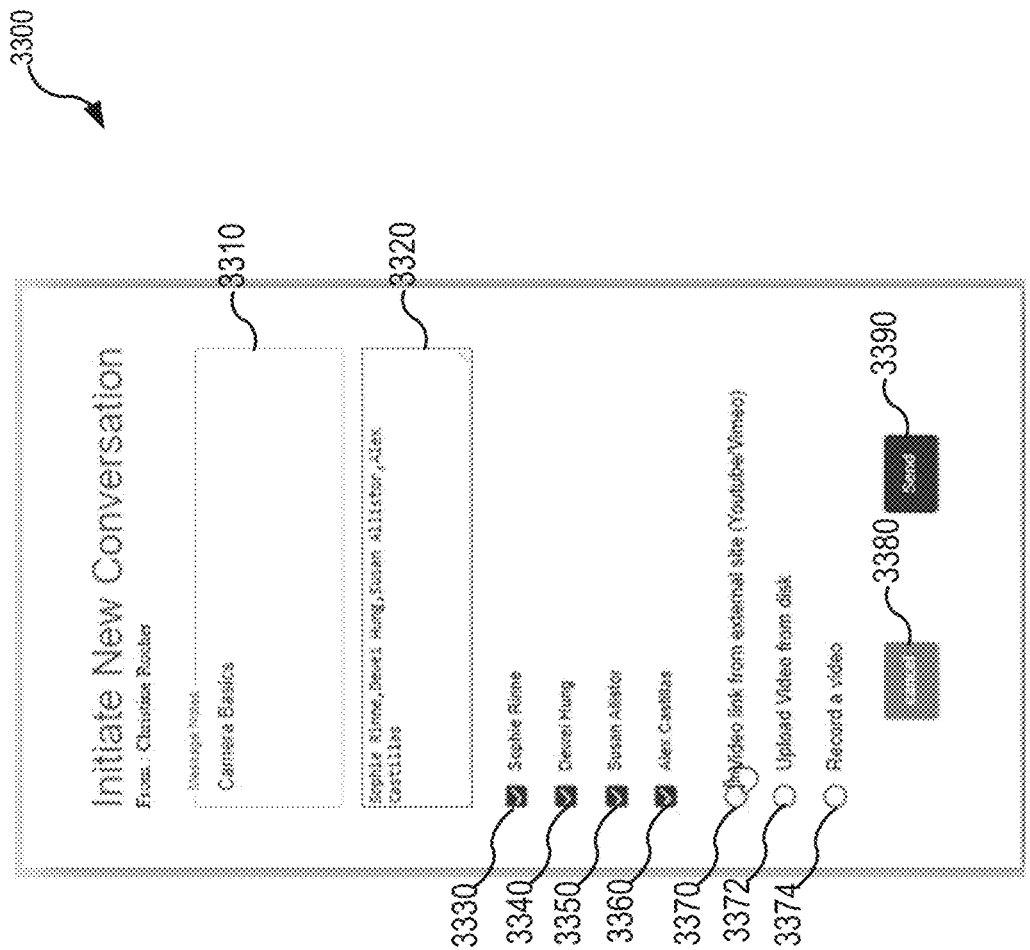
FIG. 33 is an example screen of an interactive GUI for initiating a new conversation (e.g., a new thread).
Figure 34:
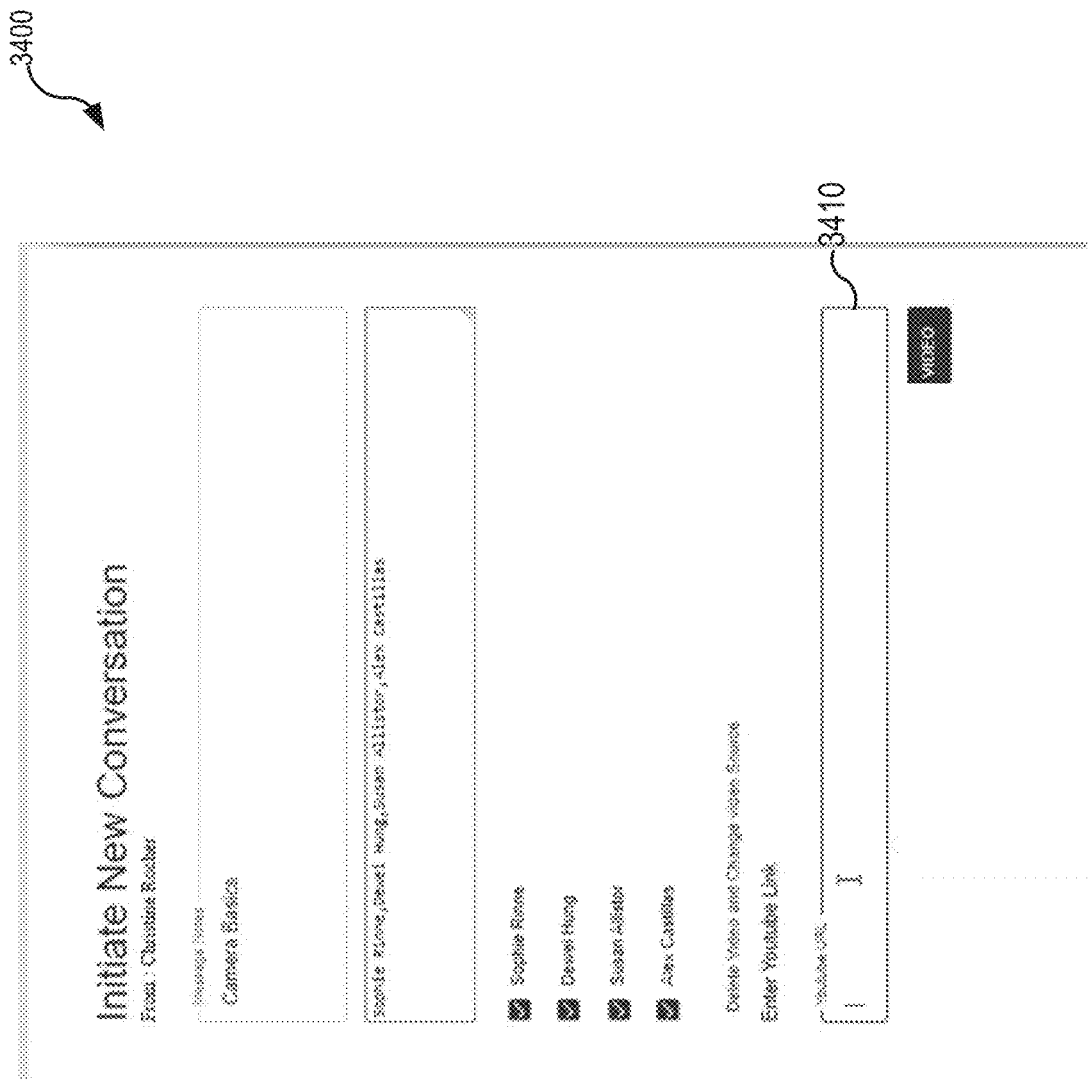
FIG. 34 is another example screen of an interactive GUI for initiating a new conversation.

In addition to the user annotations made to the synced transcript 1020, as user can go back to the message inbox or message timeline, which are described in FIGS. 24 and 33-34, by selecting the back feature 1040. A user can also start a new thread by selecting the radio button 1050.

Figure 11:
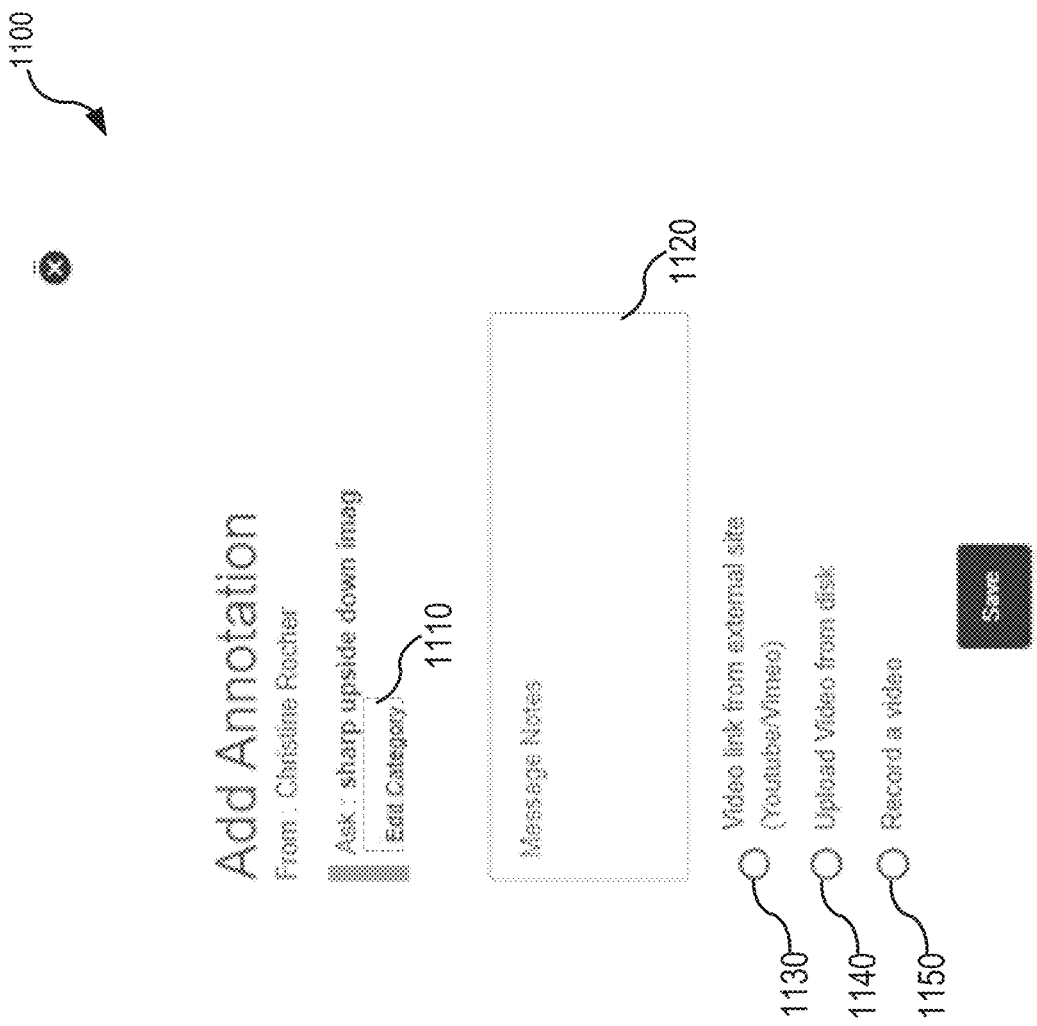
FIG. 11 is an example screen of an interactive GUI displaying adding an annotation.
Figure 12:
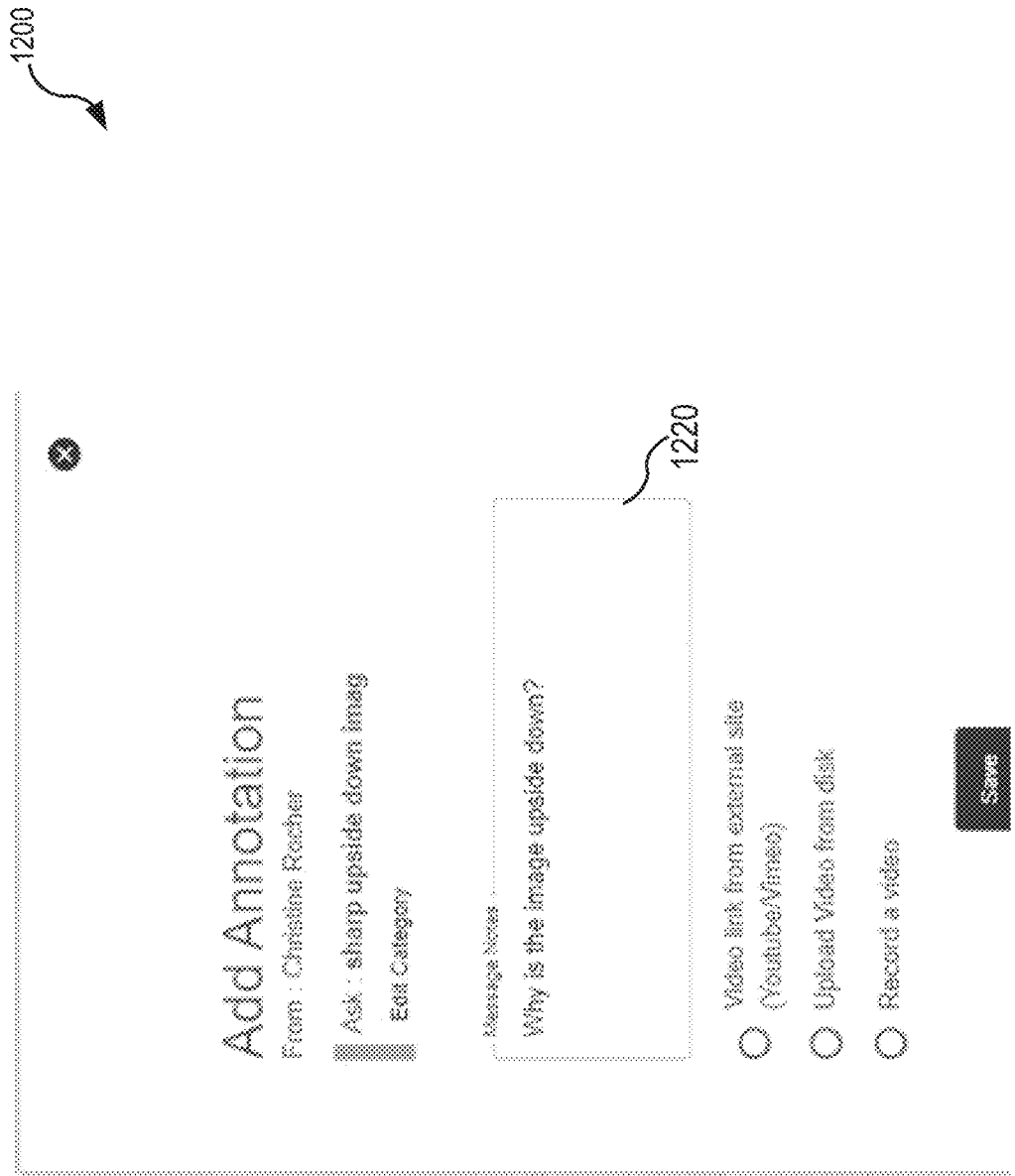
FIG. 12 is an example screen of an interactive GUI displaying adding text to an annotation.

FIG. 11 is an example screen 1100 of an interactive GUI displaying adding an annotation. A user selecting, for example, the user annotation 1032 (e.g., Ask) can then be prompted with the screen 1100. Screen 1100 solicits further input from a user for the annotation. Using screen 1100 a user can change the type of user annotation by selecting feature 1110 (e.g., Edit Category). By selecting feature 1110, a user can change the user annotation of ask to any other available user annotation (e.g., as "Vocabulary," "Note," "Look up," "Disagree," or "Bookmark"). In the example illustrated in FIG. 11, the user keeps the user annotation 1032 of ask. The user can then enter in a question by typing into the entry box 1120. An example question from a user is illustrated by example screen 1200 of FIG. 12. For example, a user can ask the question "Why is the image upside down?"

Figure 13:
FIG. 13 is an example screen of an interactive GUI for a user selecting the radio button to record a video to upload.

Additionally or alternatively, the user can select any of the radio buttons 1130, 1140, 1150 in the example screen 1100 to add video to the annotation. For example, by selecting radio button 1130 a user can add in a video link from an external site. By selecting radio button 1140 a user can upload a video from another location using an explorer window. By selecting radio button 1150, a user can record a video to upload. FIG. 13 is an example screen 1300 of an interactive GUI for a user selecting the radio button 1150 to record a video to upload. The user can select a radio button 1310 to start a video capture. The user can either delete the captured video or change the video source to one of the other available options (e.g., upload video from another location or add in a video link from an external site) using radio option 1320. The user can save the annotation by selecting radio button 1330.

Figure 14:
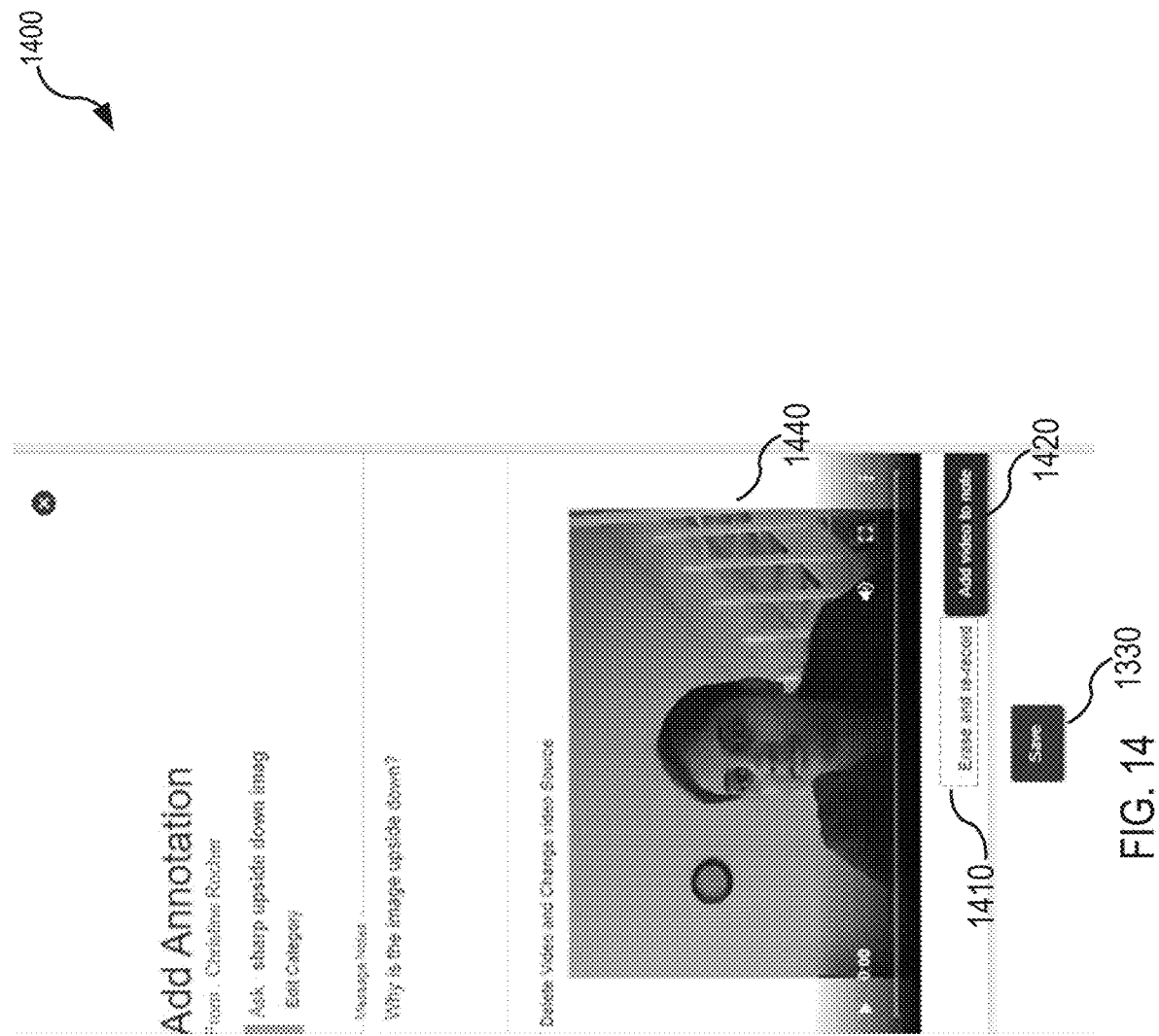
FIG. 14 is an example screen of an interactive GUI further illustrating the adding of a video to the annotation
Figure 15:
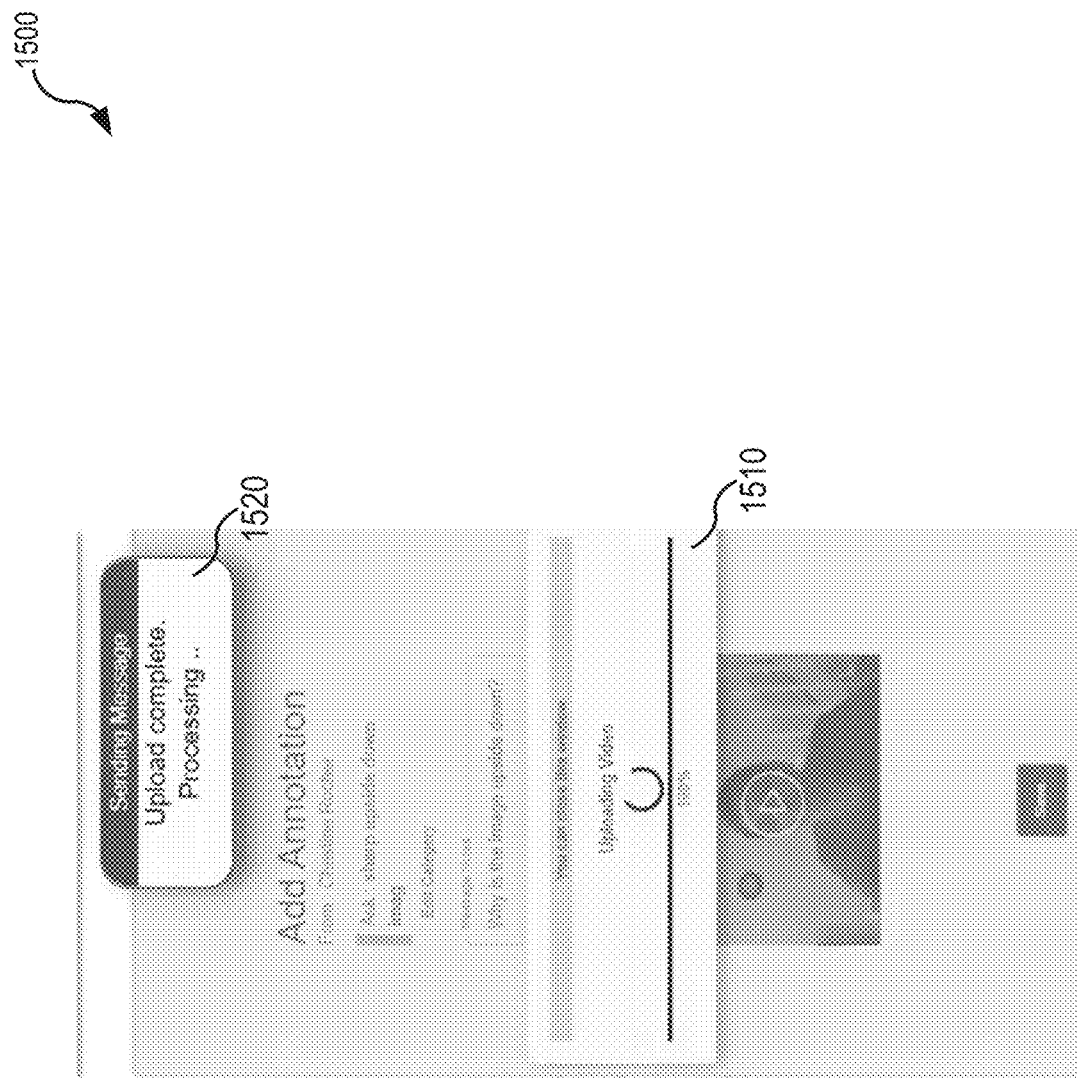
FIG. 15 is an example screen of an interactive GUI displaying windows shown to a user that the video is uploading.
Figure 16:
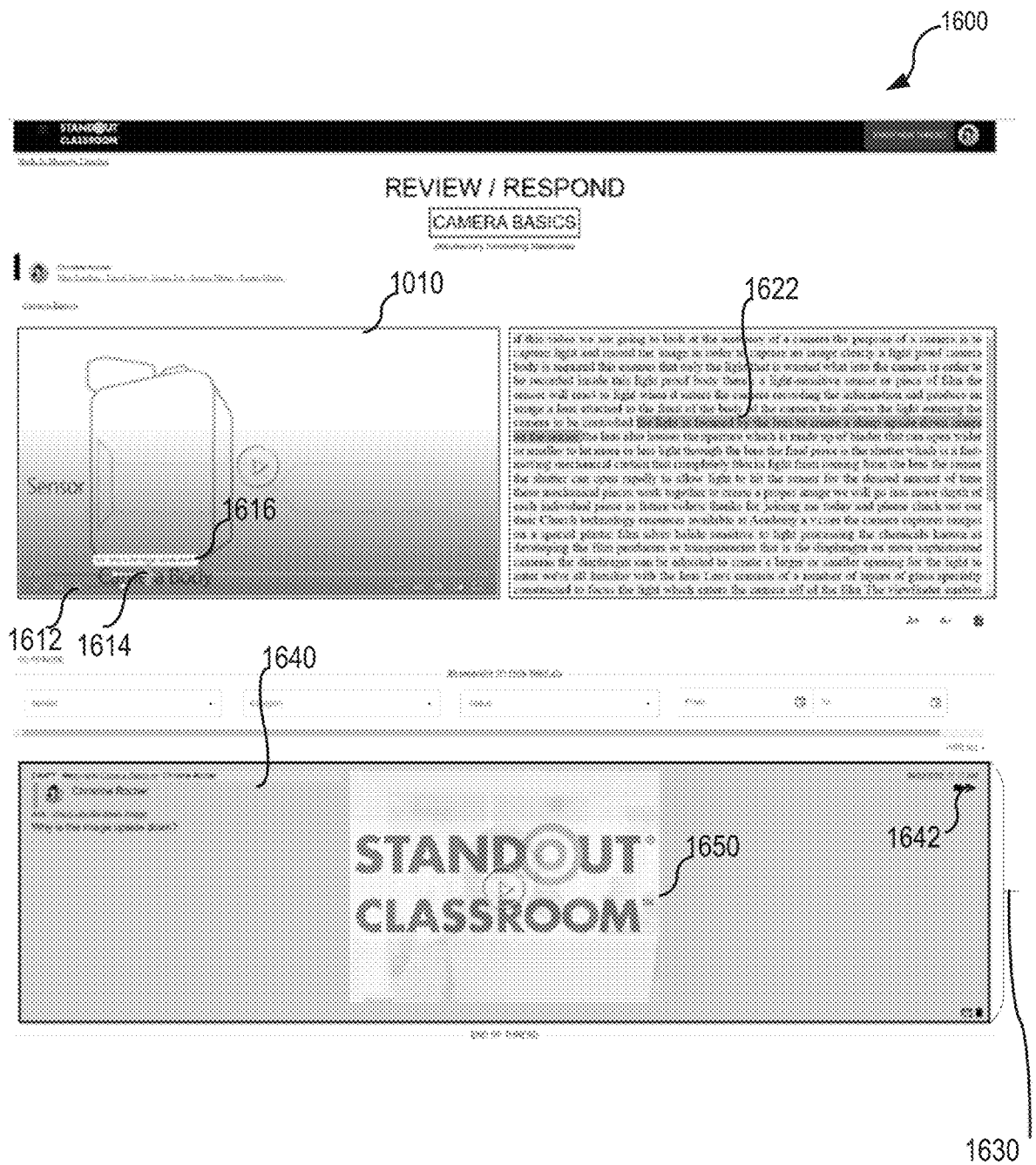
FIG. 16 is an example screen of an interactive GUI illustrating an annotated portion of a synced transcript.

FIG. 14 is an example screen 1400 of an interactive GUI further illustrating the adding of a video to the annotation. Once a user has captured a video 1440, the user can utilize screen 1400 to "Erase and re-record" the video using feature 1410. The user can also add the captured video 1440 to the annotation by selecting radio button 1420. At any time, a user can save the annotation using the radio button 1330. When a user selects radio button 1420 to add the captured video 1440, the example screen 1500 of FIG. 15 shows the user that the video is uploading in window 1510. Once complete, the user can see a confirmation window 1520 that informs a user the upload is complete and the message is being sent. This concludes the annotation and the user is then presented with example screen 1600 of FIG. 16, which illustrates an annotated portion 1622 of the synced transcript 1020. The annotated portion 1622 corresponds to the portion 1022 that the user highlighted in FIG. 10. The "Ask" user annotation 1032 of menu 1030 is associated with the color orange and the annotated portion 1622 is displayed in the same color orange on screen 1600. In addition to the annotated portion 1622, the screen 1600 also includes a timestamp 1614 marking when in the playable video component 1010 the user made the ask annotation. Optionally, by hovering over the timestamp 1614 a user can see a summary 1616 of the annotation (e.g., Ask: Why is the image upside down?). Screen 1600 also includes a summary section 1630 displaying a draft message 1640 with the video 1650 saved by the user. The draft message 1640 has a send option 1642. The send option 1642 may only be present when a synced transcript has been generated for the video 1650, as discussed in more detail in FIGS. 44-45. A user can send the draft message 1640 to others by selecting the send option 1642, which can result in a message populating in other users' video messaging inbox 420.

Figure 17:
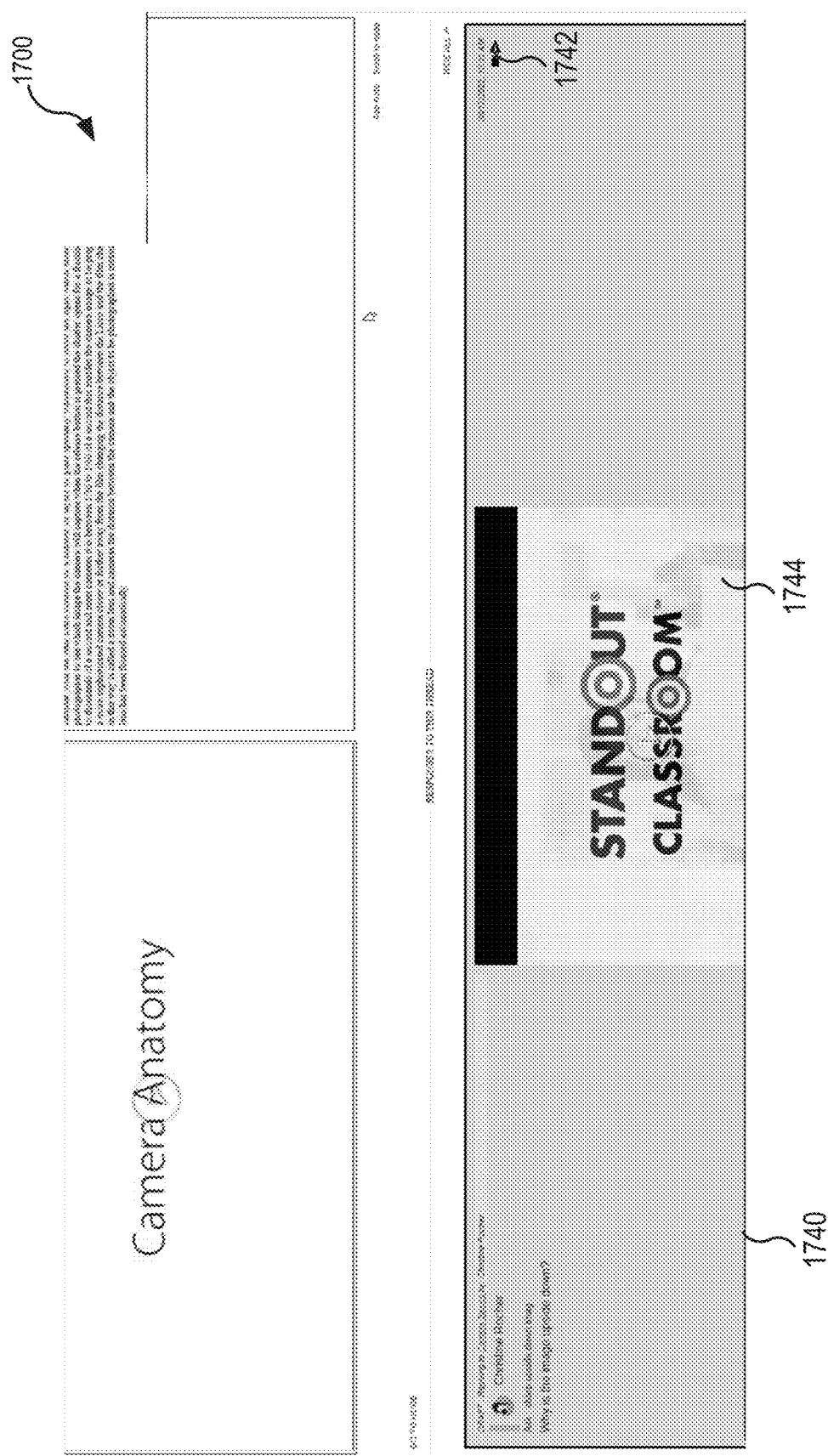
FIG. 17 is an example screen of an interactive GUI that includes a summary section highlighting an ask user annotation and corresponding portion of the synced transcript.

FIG. 17 is an example screen 1700 that includes a summary section 1740 highlighting the user annotation of the ask and the portion 1022 of the synced transcript 1020. The summary section 1040 also includes a send option 1742 that facilitates sending the user annotation to other users' video messaging inbox (shown in FIG. 32). Additionally, summary section 1740 includes a video jump to option 1744 that allows the user to view the relevant timestamp 1614 of the playable video component 1010.

Figure 18:
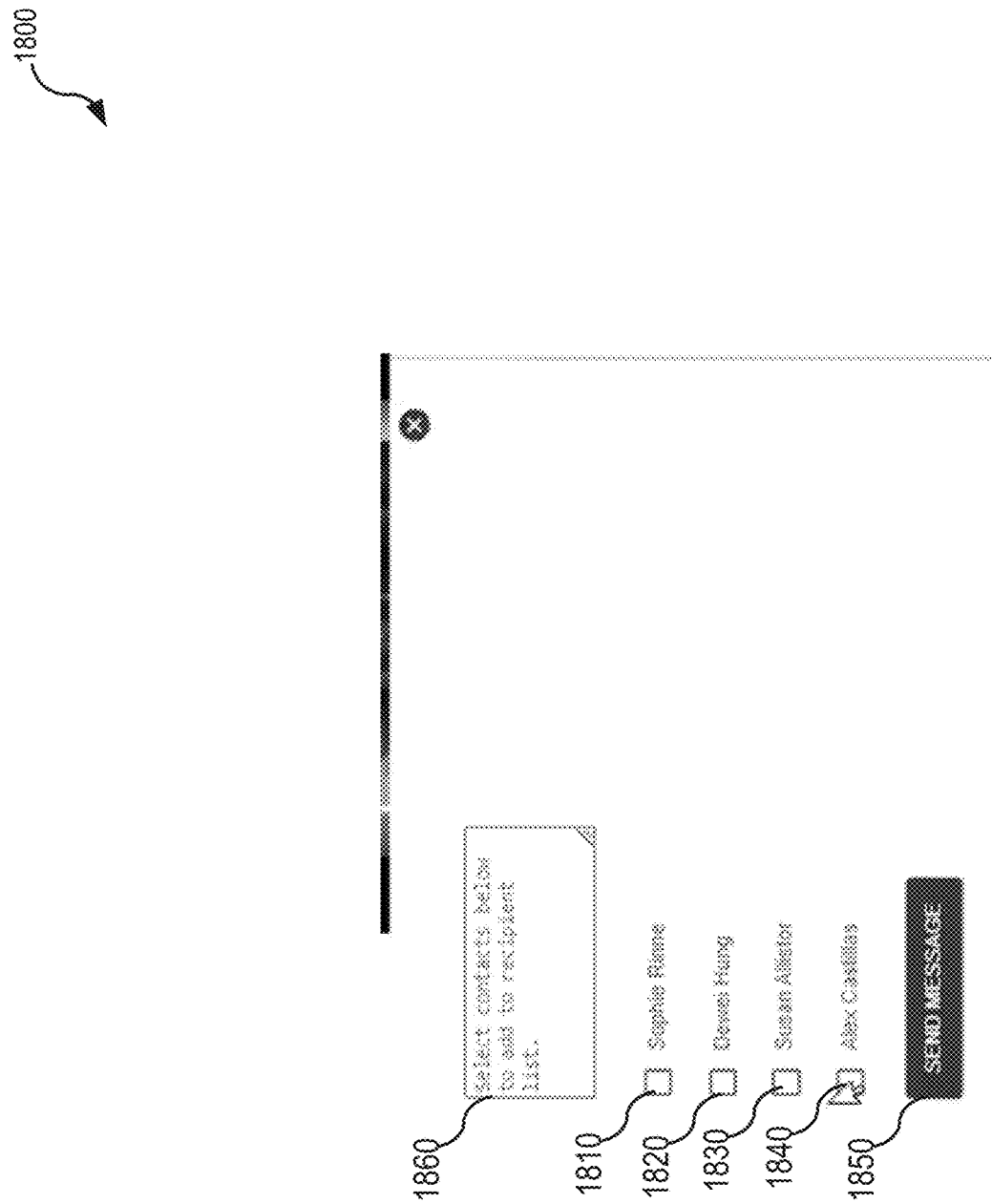
FIG. 18 is an example screen of an interactive GUI displaying message send options to recipients.

By selecting the send option 1742, the user can be presented with example screen 1800 of FIG. 18. Using screen 1800, a user can select any available recipients options 1810, 1820, 1830, 1840. Any selected recipients can also automatically population in window 1860. After selecting appropriate the recipients, the user can use radio button 1850 to send the message.

FIG. 19 is an example screen 1900 of an interactive GUI displaying annotation options available to the user in response to the user selecting an ask option. Example screen 1900 has similar components to screen 700 of FIG. 7. A user receiving an alert in their video messaging inbox 420 regarding another user asking a question on a portion 922 of the synced transcript 720 can respond to that question via response box 1940.

Figure 20:
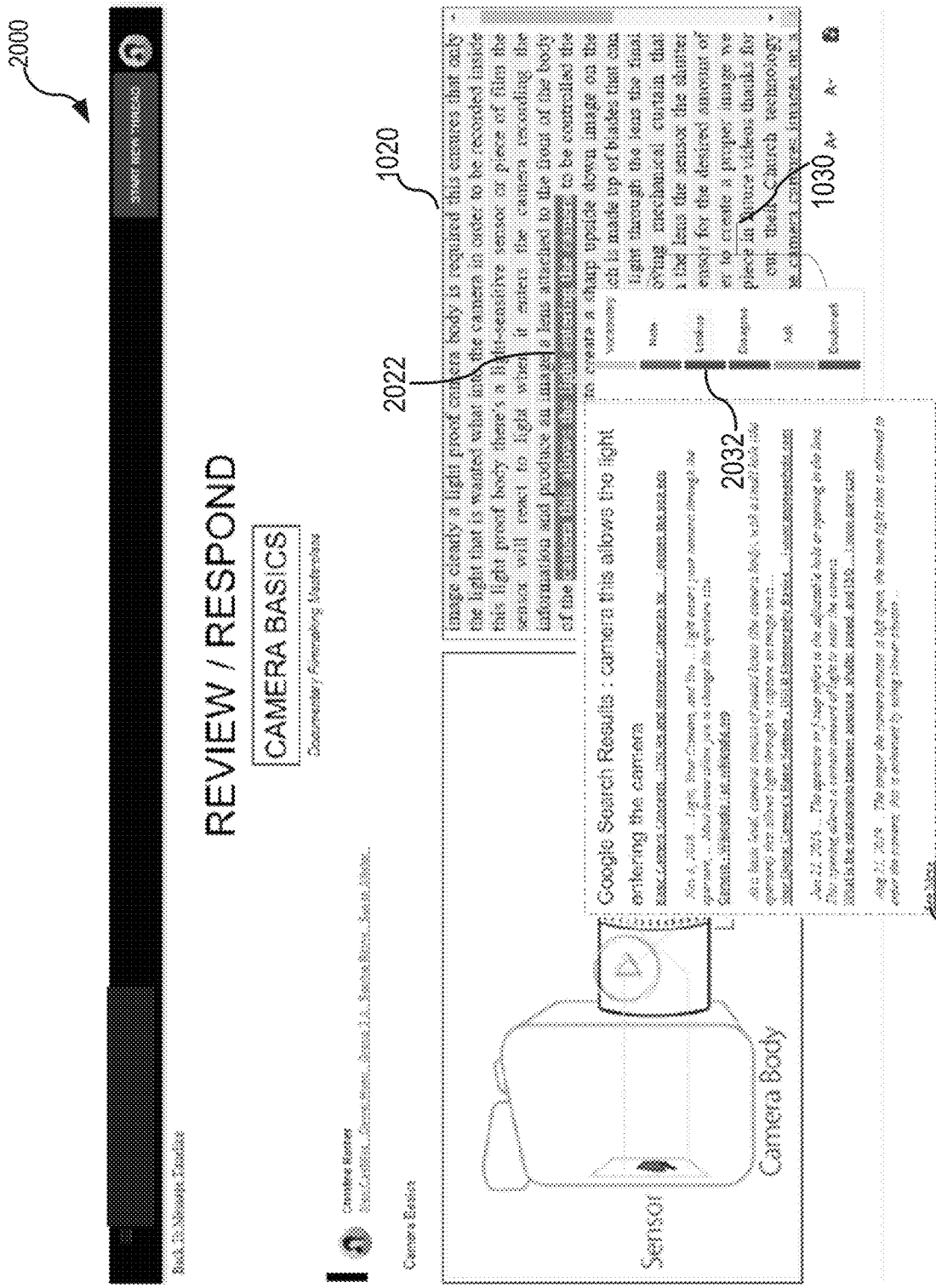
FIG. 20 is an example screen of an interactive GUI displaying annotation options available to the user in response to the user hovering over the lookup option.

FIG. 20 is an example screen 2000 of an interactive GUI displaying annotation options available to the user in response to the user hovering over the lookup option. A user can interact with the screen 2000 to highlight a portion 2022 of the synced transcript 1020. By hovering over the "Lookup" option 2032 of menu 1030, a pop-up window 2010 can display a listing of top internet results for searching that portion 2022. The user can select any of the results listed in pop-up window 2010 to further search the portion 2022 of the synced transcript 1020. The results within pop-up window 2010 can be provided by an external source such as an internet search engine via network 308.

Figure 21:
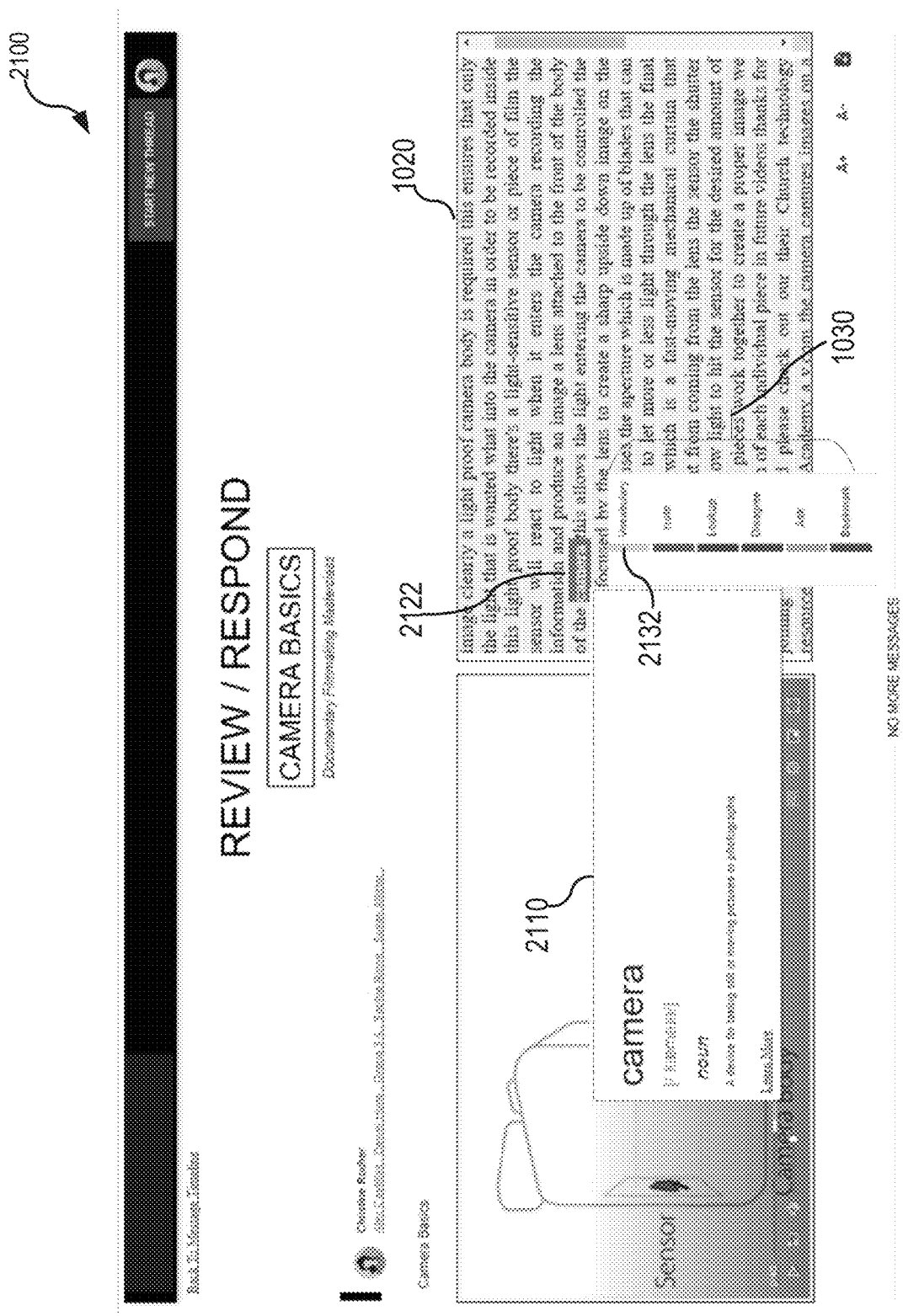
FIG. 21 is an example screen of an interactive GUI displaying annotation options available to the user in response to the user hovering over the vocabulary option.

FIG. 21 is an example screen 2100 of an interactive GUI displaying annotation options available to the user in response to the user hovering over the vocabulary option. A user can interact with the screen 2100 to highlight a portion 2122 of the synced transcript 1020. By hovering over the "Vocabulary" option 2132 of menu 1030, a pop-up window 2110 can display a pronunciation and/or a dictionary definition of the word(s) within portion 2122. In some cases, the pronunciation and/or dictionary definition can be pre-stored within data store 310. In other cases, pronunciation and/or dictionary definition can be provided by an external source such as a website via network 308.

Figure 22:
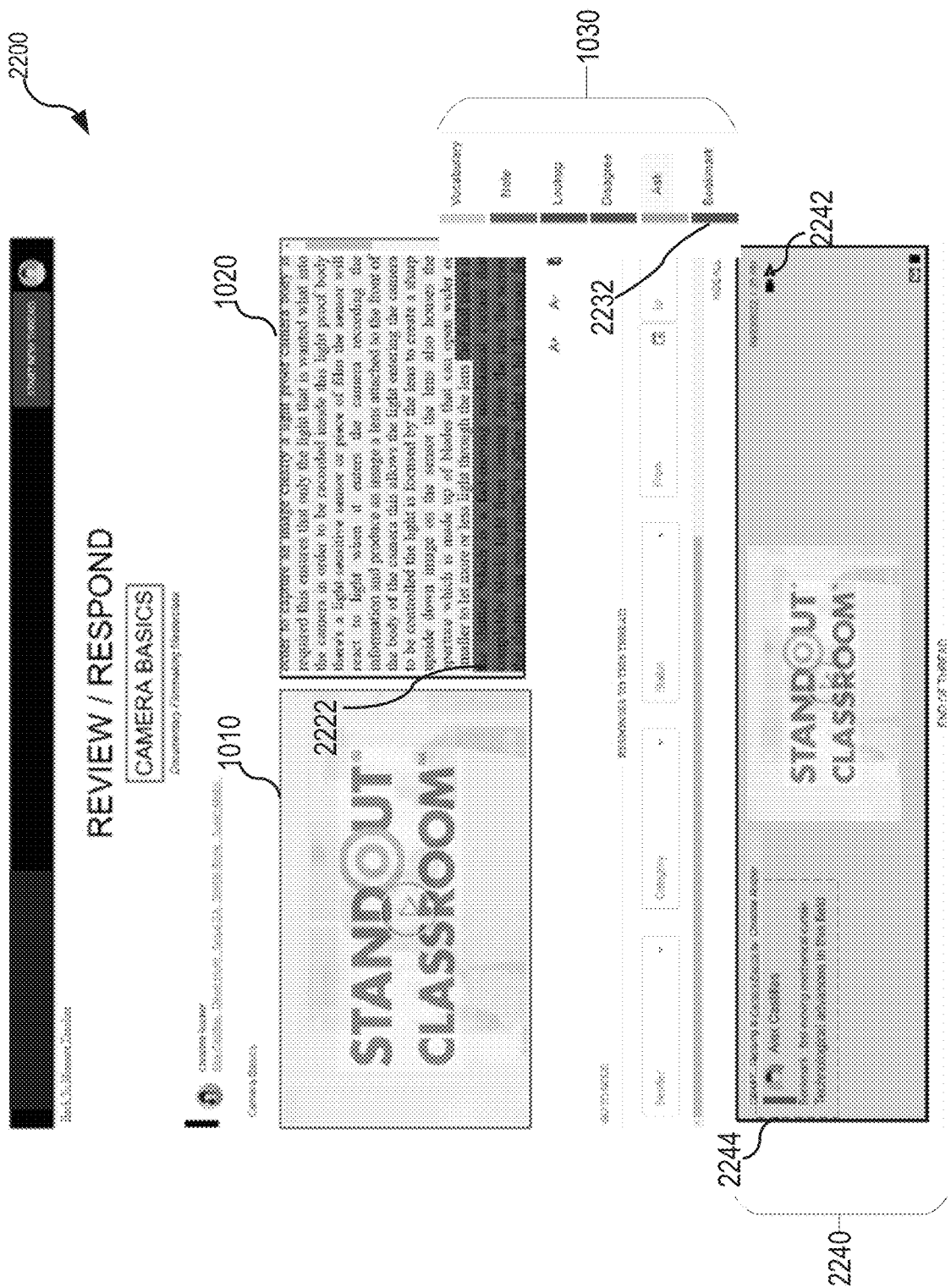
FIG. 22 is an example screen of an interactive GUI displaying annotation options available to the user in response to the user selecting the bookmark option.
Figure 23:
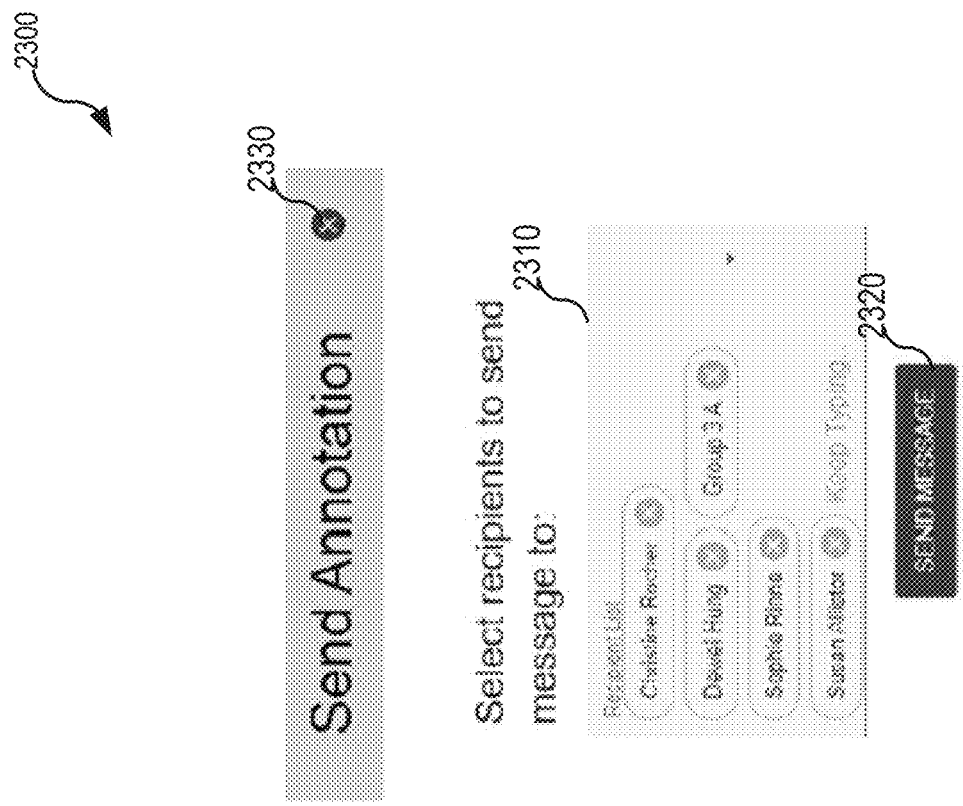
FIG. 23 is an example screen of an interactive GUI displaying send annotation options.

FIG. 22 is an example screen 2200 of an interactive GUI displaying annotation options available to the user in response to the user selecting the bookmark option. A user can interact with the screen 2200 to highlight a portion 2222 of the synced transcript 1020. By selecting the "Bookmark" option 2232 from menu 1030, a user can bookmark the portion 2222. A bookmark can facilitate quick access to that portion 2222 in the playable video component 1010 at a later time. A user can send the bookmark annotation, for example, by selecting the send option 2242 within summary section 2240. A color-coded summary 2244 can include a summary of the annotation made by the user in a color matching the "Bookmark" user annotation 2232 from menu 1030 (e.g., purple). FIG. 23 is an example screen 2300 of an interactive GUI displaying send annotation options. The screen 2300 can be displayed to a user after the user selects the send option 2242. Using the screen 2300, a user can enter in individuals who should receive the annotation in the Recipient List 2310. The user can then send the annotation to those listed in the Recipient List 2310 by selecting the "Send Message" radio button 2320. At any time, a user can exit out of the screen 2300 by selecting the Cancel (e.g., "X") radio button 2330. Once the annotation is sent through the selection of the "Send Message" radio button 2320, the thread is visible to the recipients listed in the Recipient List 2310 as shown in summary section 2410 of FIG. 24. In some embodiments, example screen 2300 may be a part of the interactive menu 730 of FIG. 7. For example, screen 2300 may be displayed (in a new screen or adjacent to menu 730 shown in FIG. 7) after a user selects an annotation option (e.g., menu item 732). In the example of FIG. 23, the interactive menu includes user selection options for the user to select a subset of the recipients for whom the annotation is to be displayed (e.g., using recipient list 2310). FIG. 24 is an example screen 2400 of an interactive GUI displaying a sent annotation. Users can review and/or respond to the annotation through selection of the "Review/Respond" radio button 2412.

Figure 25:
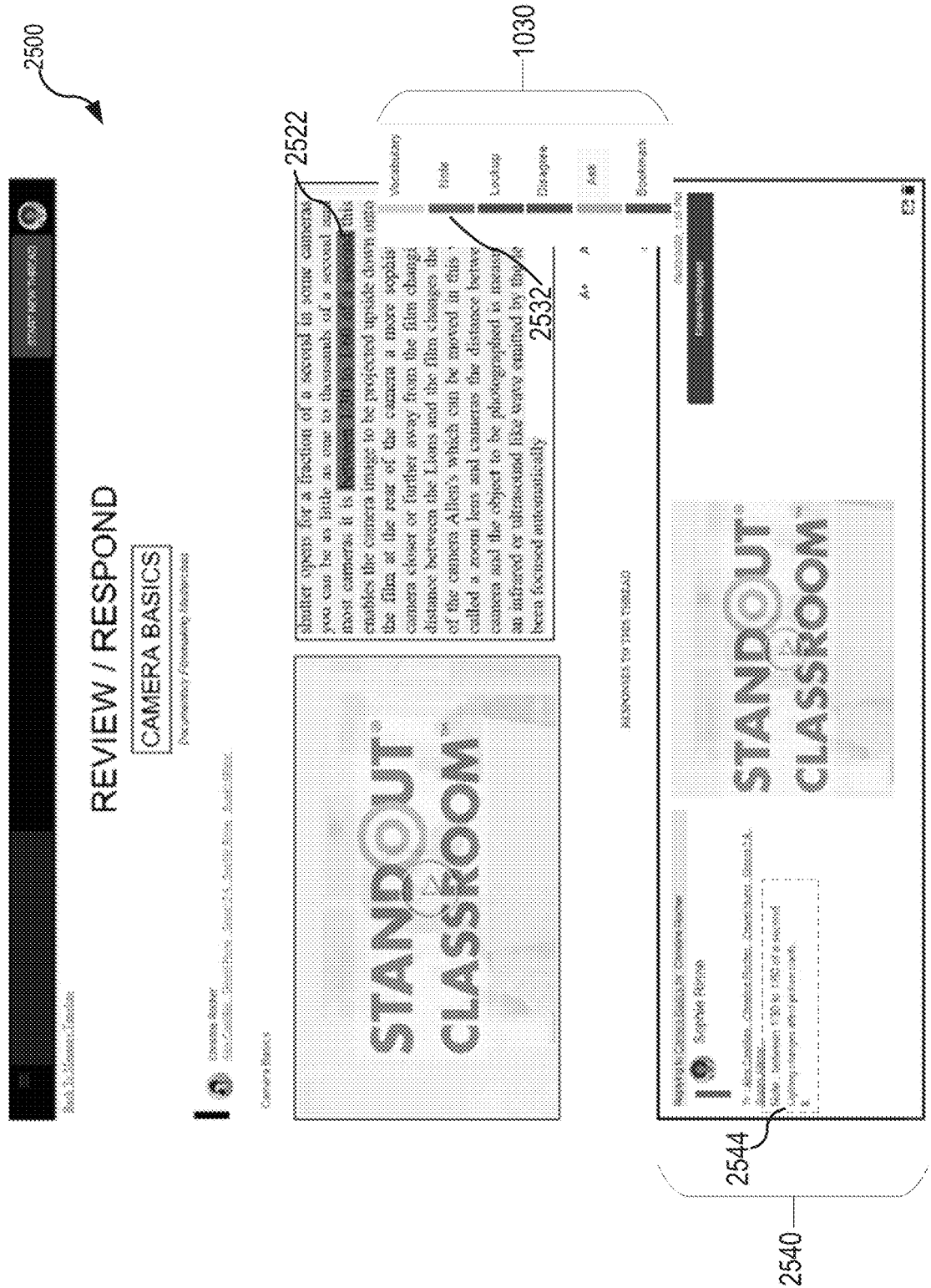
FIG. 25 is an example screen of an interactive GUI displaying annotation options available to the user with the user selecting the note option.

FIG. 25 is an example screen 2500 of an interactive GUI displaying annotation options available to the user with the user selecting the note option. A user can interact with screen 2500 to highlight a portion 2522 of synced transcript 1020. The user can select the "Note" user annotation 2532 from the menu 1030 to add a note corresponding to the portion 2522. The portion 2522 is highlighted in a color that corresponds to the same color as the "Note" user annotation 2532 (e.g., blue). A short summary 2544 of the selected user annotation summarizes the note made by the user within the summary section 2540.

Figure 26:
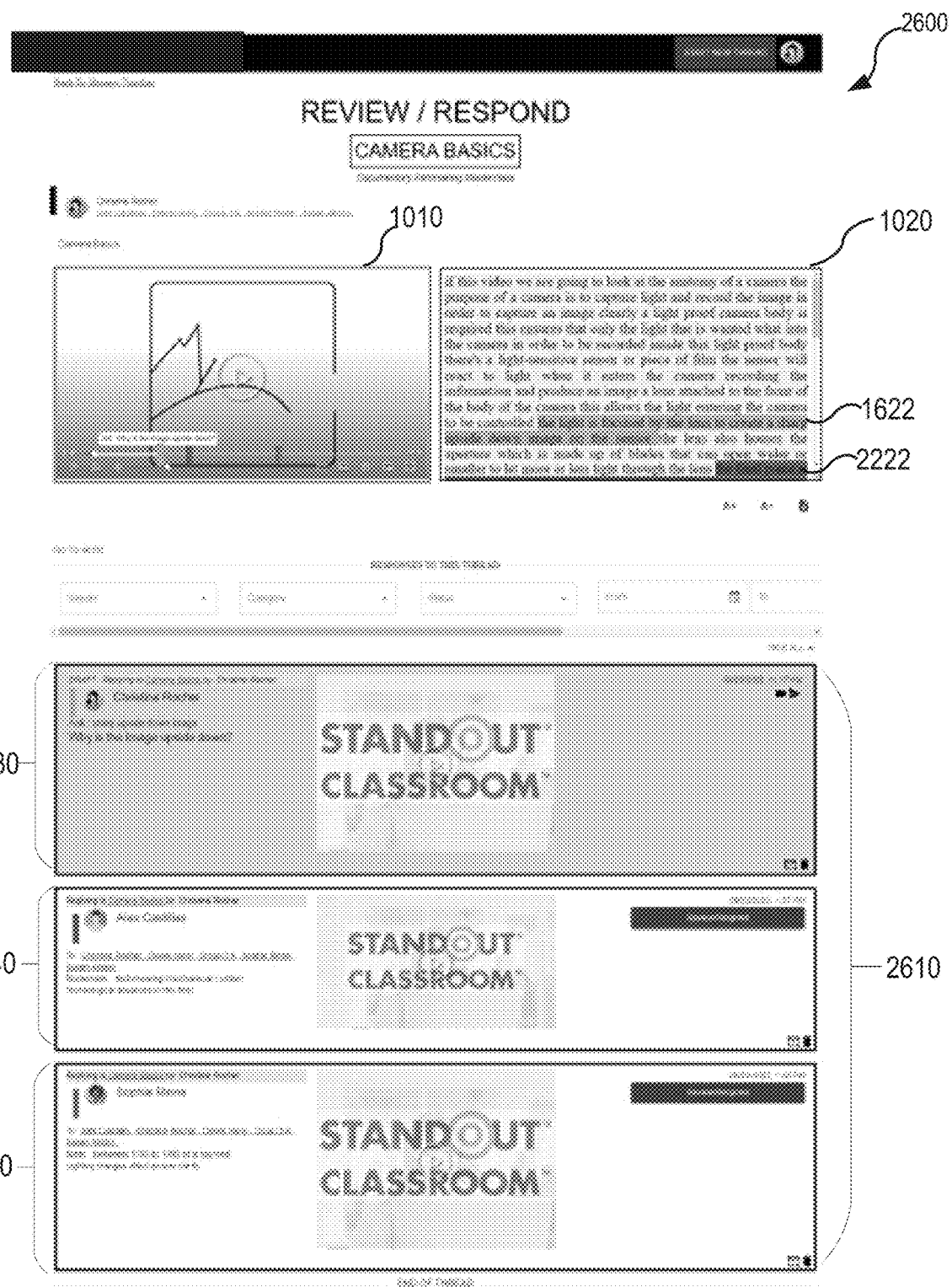
FIG. 26 is an example screen that includes a cumulative summary of user annotations made on the playable video component.

FIG. 26 is an example screen 2600 that includes a cumulative summary 2610 (i.e., an annotations region) of user annotations made on the playable video component 1010. Cumulative summary 2610 includes (i) a summary section 1630 highlighting the "Ask" user annotation on portion 1622, (ii) a summary section highlighting the user annotation 2240, and (iii) a summary section highlighting the user annotation of the note 2540. In some embodiments, the displayed annotations may be associated with the displayed portion of the synced transcript 1020 (in the transcript region) of the GUI. In some embodiments, instead of highlighting (i.e., text background color change), a text style of portion 1622 may be changed. A text style change may include, for example, italicizing, bolding, underlining, changing text color, changing font, changing text background color, or a combination thereof.

Figure 27:
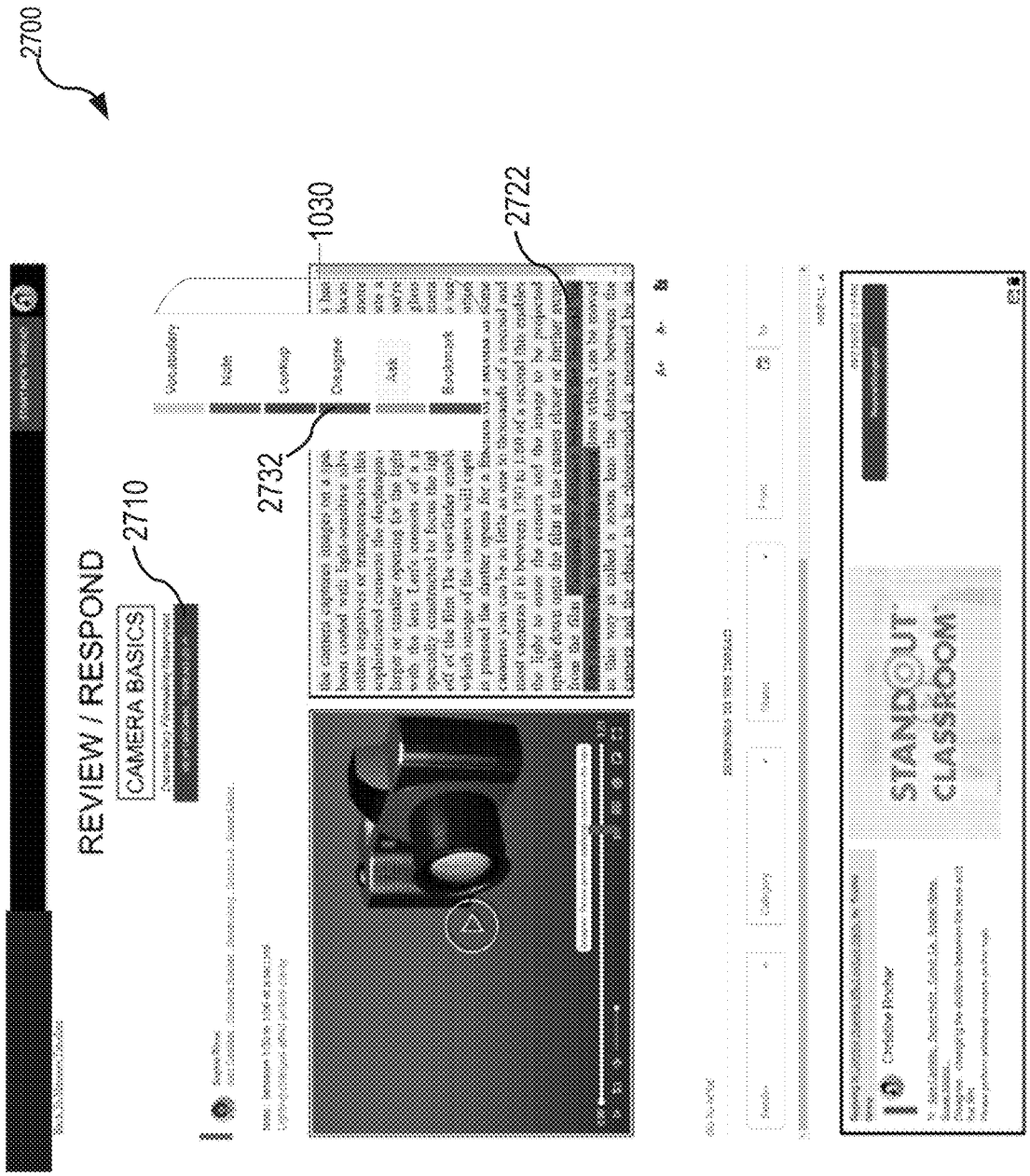
FIG. 27 is an example screen of an interactive GUI displaying a user responding to a message within an embedded thread instead of the original thread.

FIG. 27 is an example screen 2700 of an interactive GUI displaying a user responding to a message within an embedded thread instead of the original thread. In screen 2700 the user (e.g., Christine Rocher) has responded to the message created in screen 2500. A user views the original thread by selecting the "View Original Thread" radio button 2710. In screen 2700, the user highlighted a portion 2722 of the synced transcript 1020 and selected the "Disagree" user annotation 2732 from menu 1030.

Figure 28:
FIG. 28 illustrates an example screen showing textual analysis of various user entries within the asynchronous communications system.

FIG. 28 is an example screen 2800 showing textual analysis of various user entries within the asynchronous communications system. The text entries, for example, of the user response within summary section 840 or the user question within summary section 940 can be evaluated using sentiment analysis techniques to evaluate an emotional tone 2810 or language tone 2820. An emotional tone 2810 can include, for example, categories such as expressions of joy, sadness, fear, disgust, or anger. A language tone 2820 can include, for example, tentative, analytical, or confident.

Figure 29:
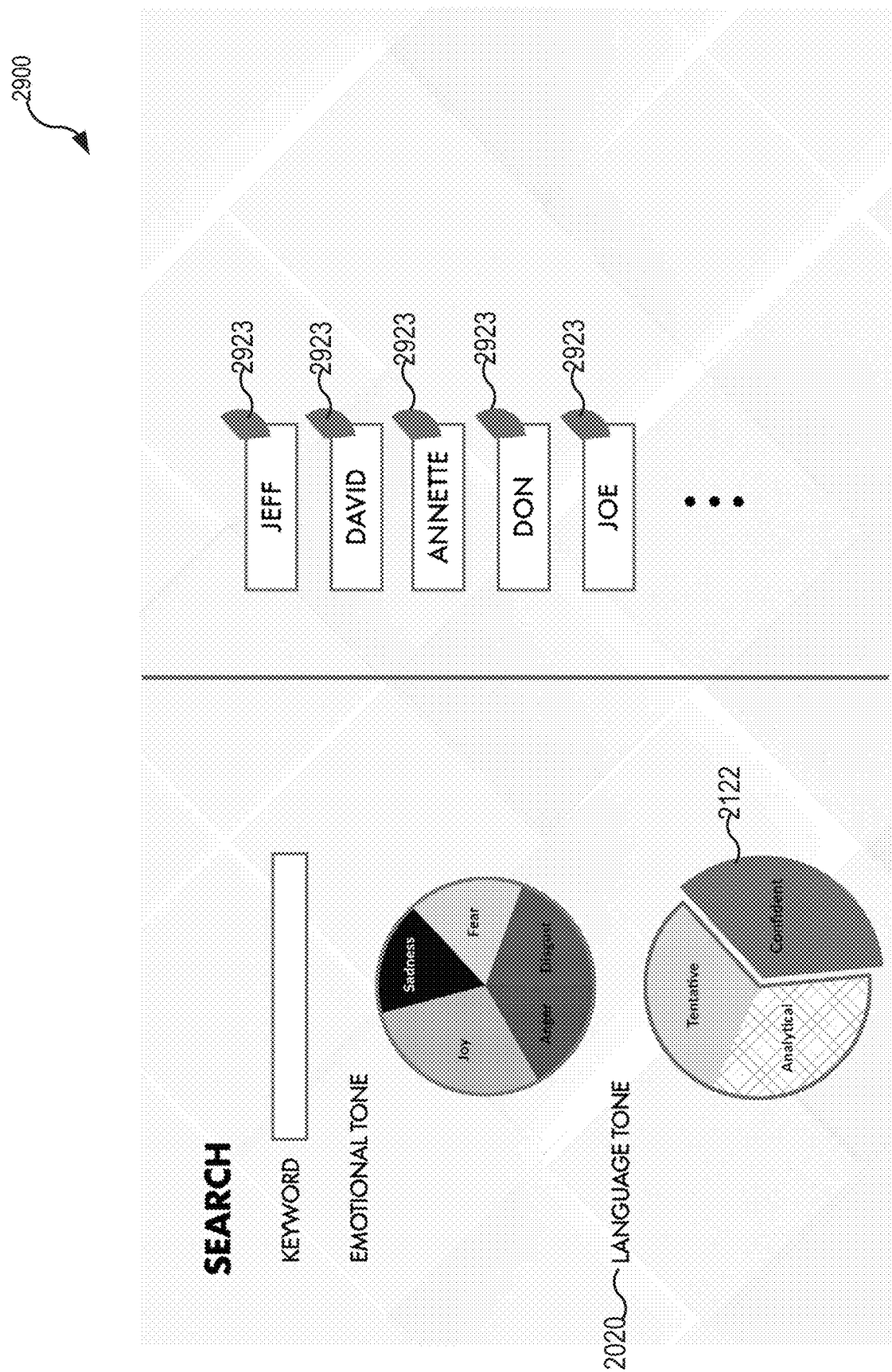
FIG. 29 is another example screen further illustrating textual analysis of various user entries within the asynchronous communications system.

FIG. 29 is another example screen 2900 further illustrating textual analysis of various user entries within the asynchronous communications system. The textual analysis can be allocated to each individual user. For example, a portion 2122 of the language tone 2820 can be allocated as confident. Individual user responses that include language tone identified as confidence can be flagged for each user. For example, each user (e.g., Jeff, David, Annette, Don, Joe, etc.) can have a confident flag 2923 indicating their responses have such a language tone.

Figure 30:
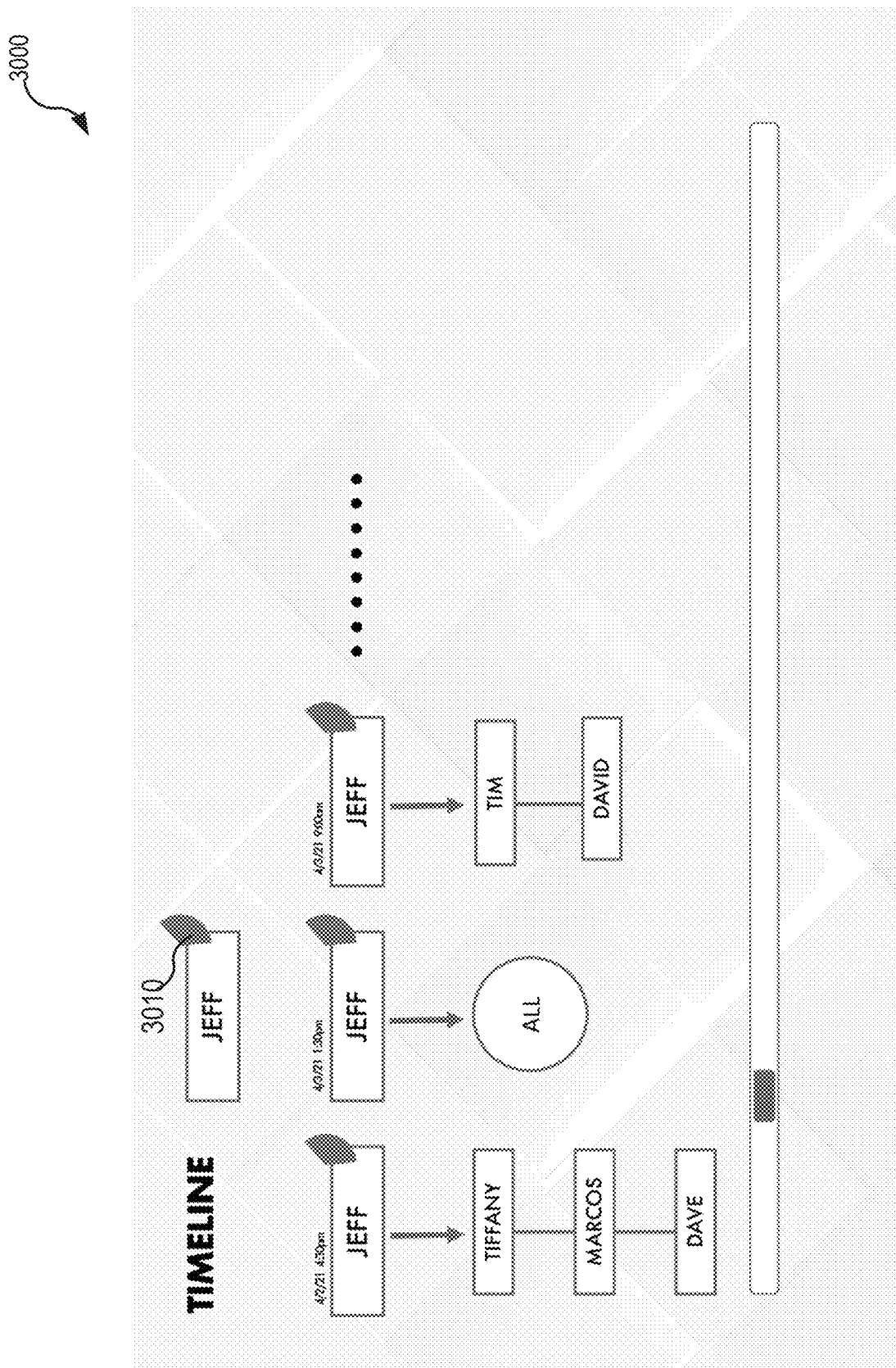
FIG. 30 is another example screen of an interactive GUI displaying an example timeline of generation of the threads with sentiment flags.

FIG. 30 is another example screen 3000 of an interactive GUI displaying an example timeline of generation of the threads with sentiment flags. Example screen 3000 is similar to example screen 500 of FIG. 5 but differs in that confident flag 2923 are associated with each user, rather than message alerts 510.

Figure 31:
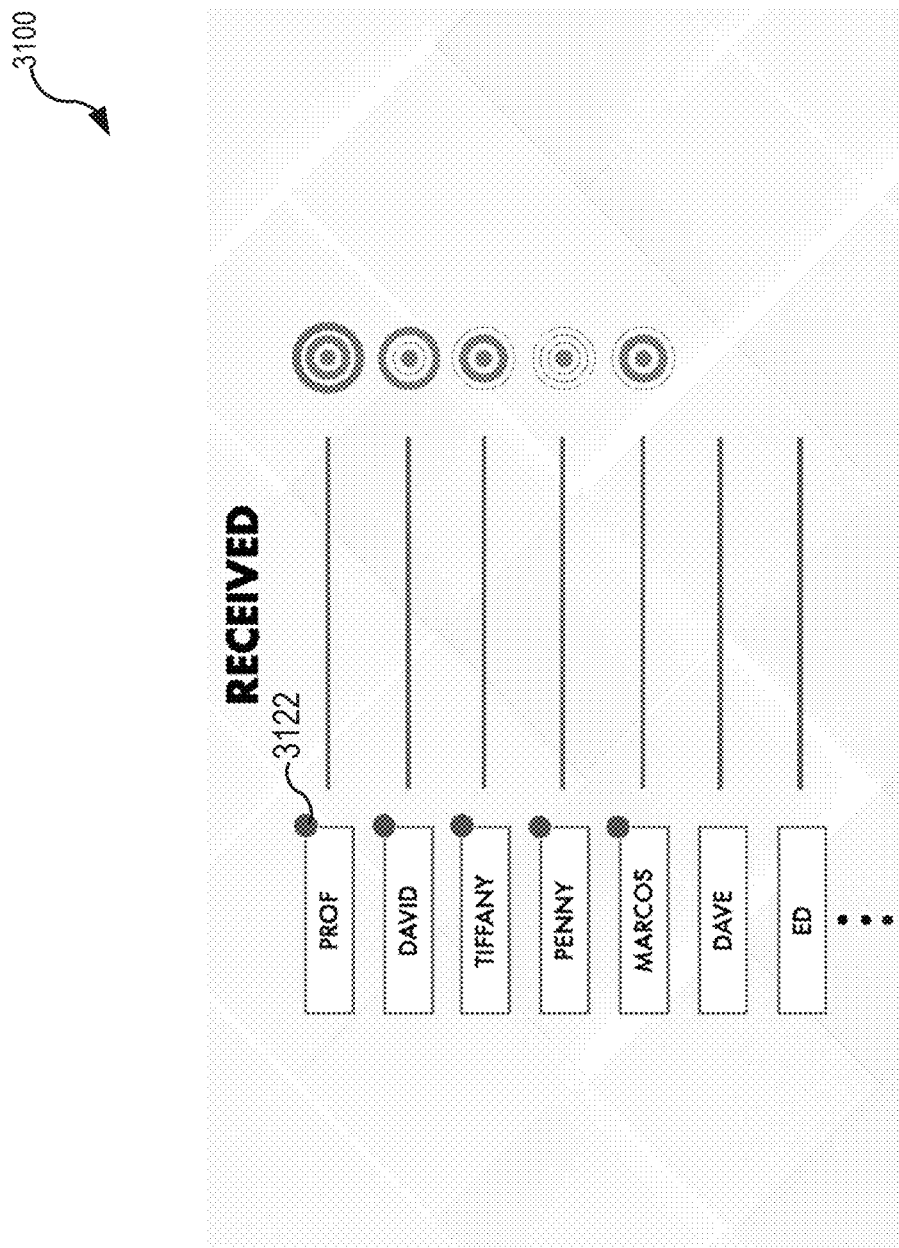
FIG. 31 is another example screen illustrating received messages within a video messaging inbox.

FIG. 31 is another example screen 3100 illustrating received messages within a video messaging inbox. Each user can receive a prompt 3122 alerting them that a structured video thread awaits their review.

Figure 32:
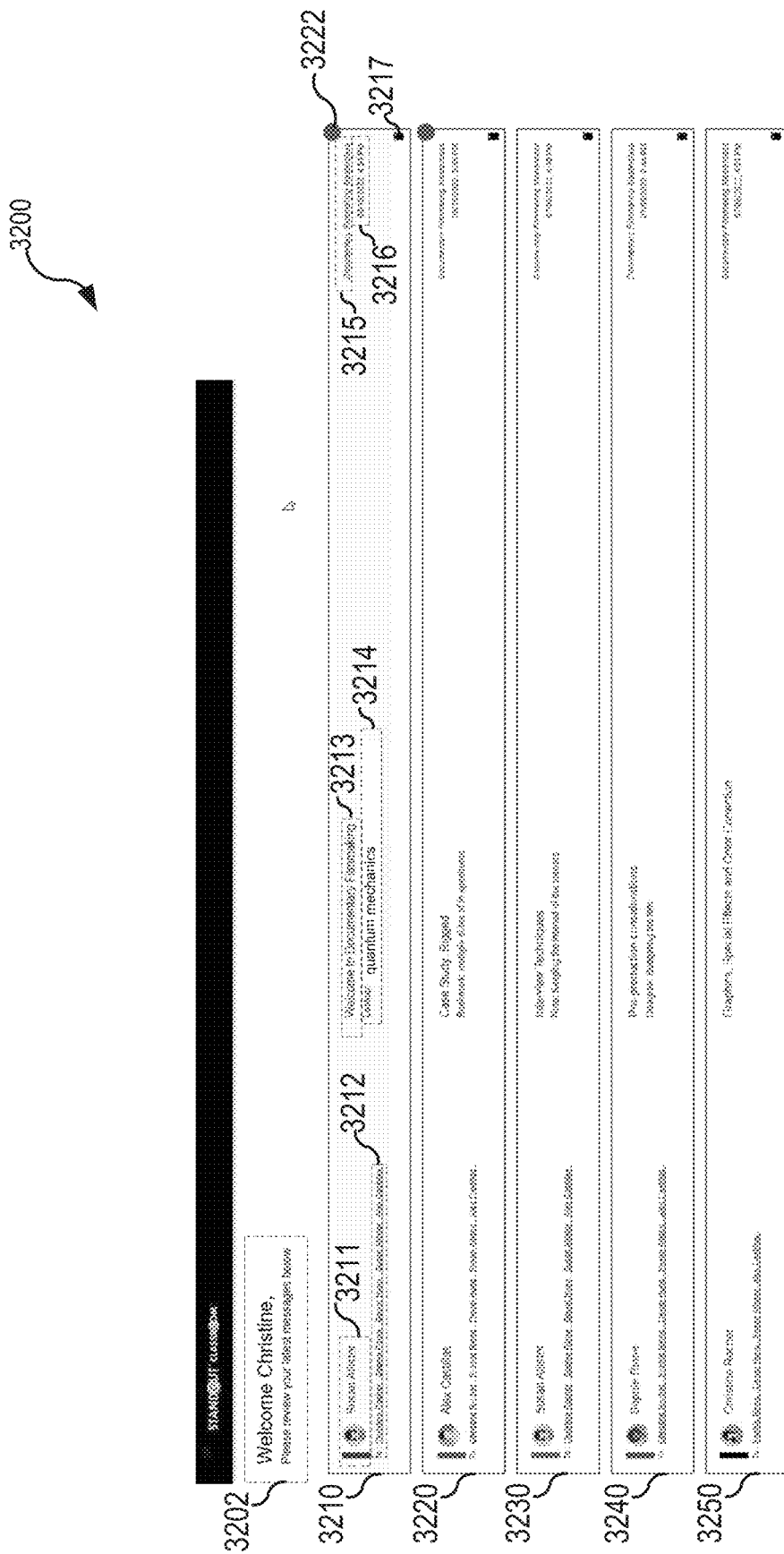
FIG. 32 is another example screen of an interactive GUI illustrating received messages within a video messaging inbox.

FIG. 32 is another example screen 3200 illustrating received messages within a video messaging inbox. In the example screen 3200, a video messaging inbox for a user named "Christine" is displayed. The example screen 3200 can include a welcome message 3202. Welcome message 3202 can state, for example, "Welcome, Christine. Please review your latest messages below." The screen includes a number of individual messages 3210, 3220, 3230, 3240, 3250. The individual messages 3210, 3220, 3230, 3240, 3250 can be arranged by default in chronological order based on the timestamp 3216 with the most recently received message 3210 displayed at the top of the list and the oldest received message 3250 at the bottom of the list. Each user can receive a prompt 3222 alerting them that a structured video thread awaits their review. Messages such as messages 3230, 3240, 3250 in the example screen 3200 have already been read or acknowledged by the user Christine. In some variations, the messages can be filtered by the user to show only specific messages to a user. This filtering can be based on any of the following features: sender, timestamp, title of playable video component, title of series, unread messages, read messages, etc.

Each individual message 3210, 3220, 3230, 3240, 3250 can include various features regarding annotations made by users. For example, message 3210 has summary features viewable by the user from the inbox view. The message 3210 can include a sender summary 3211 containing, for example, a sender name (e.g., Susan Allistor) and a summary tag such as a user photo and/or user-specific color. The message 3210 can also include a recipient list 3212 (e.g., To: Christine Rocher, Sophie Rinne, Dewei Hung, Susan Allistor, Alex Castillas). The message 3210 also can include a title 3213 such as the title of the playable video component 710. The message 3210 can include a user annotation summary 3214 that summarizes the user annotation 832 (e.g., Lookup) as well as summary of the portion 822 of the synced transcript 720 that was highlighted (e.g., quantum mechanics). The message 3210 can also include a series title 3215 to which the playable video component 710 belongs (e.g., Documentary Filmmaking Masterclass). The message 3210 can also include a timestamp 3216 defining the calendar date and time that the message was sent. The message can be deleted using the delete radio button 3217.

FIG. 33 is an example screen 3300 of an interactive GUI for initiating a new conversation (e.g., a new thread). Within window 3310 a user can enter a message note such as a title of a conversation. Using any of the selection buttons 3330, 3340, 3350, 3360 a user can select any number of recipients for the new conversation. The selection of any of the selection buttons 3330, 3340, 3350, 3360 automatically populates the recipient window 3320, which lists out all of the recipients of the new conversation. A user can select to add a video to the new conversation by selecting one of the radio buttons 3370, 3372, 3374. By selecting the radio button 3370, a user can add in a video link from an external site. By selecting the radio button 3372 to add a video from a stored device (e.g., via an explorer window). By selecting the radio button 3374, a user can record a video for the new conversation. At any time, a user can select the cancel radio button 3370, a radio button 3380 to cancel out of the new conversation. A user can select the send radio button 3390 to send the new conversation.

FIG. 34 is another example screen 3400 of an interactive GUI for initiating a new conversation. By selecting the radio button 3370 a user can input an external website link via entry box 3410.

Figure 35:
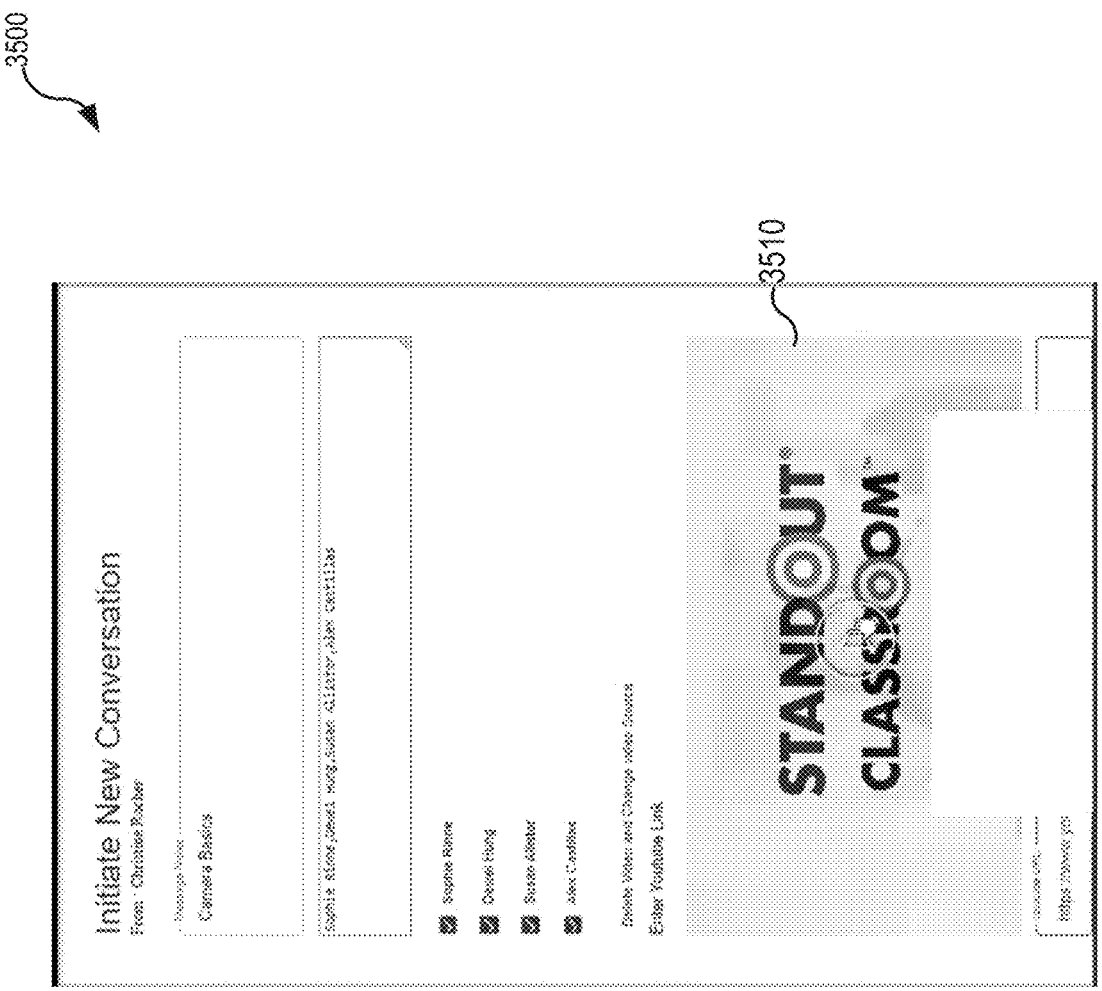
FIG. 35 is another example screen of an interactive GUI for initiating a new conversation.

FIG. 35 is another example screen 3500 of an interactive GUI for initiating a new conversation. After a user uses entry box 3410 to enter an external website link, a video 3510 is uploaded from that link in example screen 3500.

Figure 36:
FIG. 36 is another example screen of an interactive GUI for initiating a new conversation.

FIG. 36 is another example screen 3600 of an interactive GUI for initiating a new conversation. Using example screen 3600, a user can delete or change an uploaded video 2710 using delete options 3610.

Figure 37:
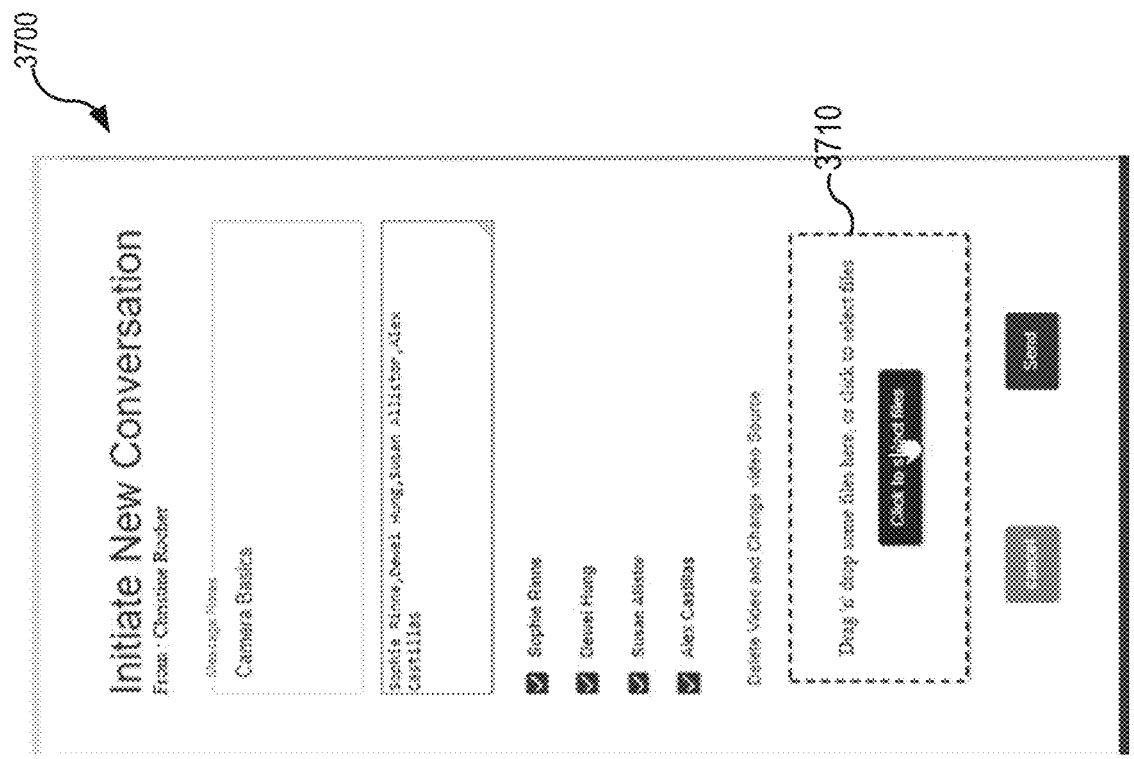
FIG. 37 is another example screen of an interactive GUI for initiating a new conversation.

FIG. 37 is another example screen 3700 of an interactive GUI for initiating a new conversation. By selecting the radio button 3372 of screen 3300 to add a video from a stored device (e.g., via an explorer window), a user can drag and drop a file to an upload window 3710. The file such as a video can be stored on a disk of processing system running the GUI, for example, or an external disk.

Figure 38:
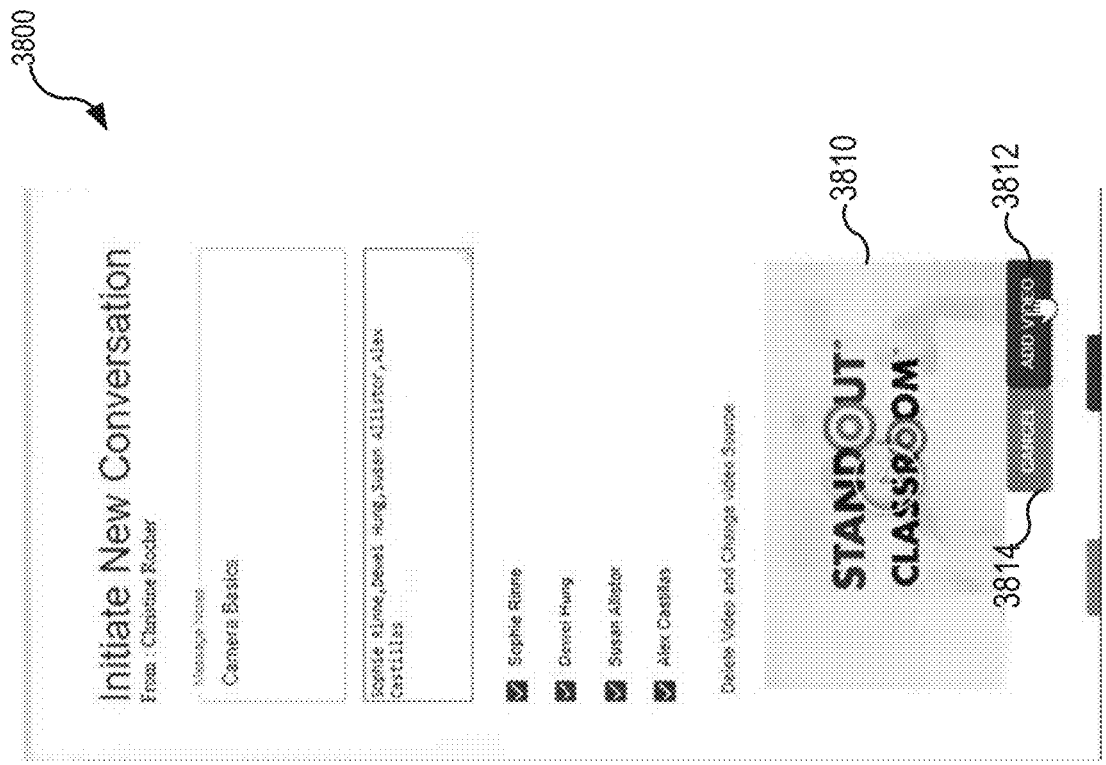
FIG. 38 is another example screen of an interactive GUI for initiating a new conversation.

FIG. 38 is another example screen 3800 of an interactive GUI for initiating a new conversation. An uploaded video 3810 can be added to a new conversation by selecting radio button 3812. At any time a user can cancel out from the new conversation using radio button 3814.

Figure 39:
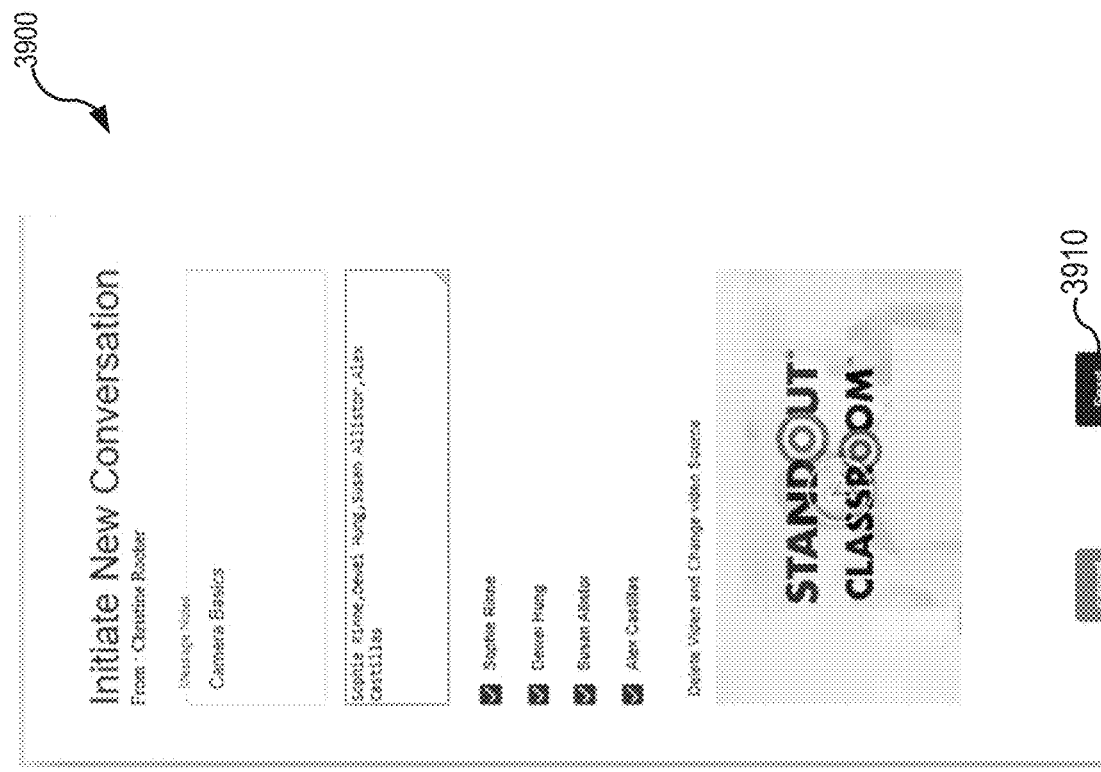
FIG. 39 is another example screen of an interactive GUI for initiating a new conversation.

FIG. 39 is another example screen 3900 of an interactive GUI for initiating a new conversation. A new conversation can be sent to a video messaging inbox through selection of the send radio button 3910.

Figure 40:
FIG. 40 is another example screen of an interactive GUI for initiating a new conversation.

FIG. 40 is another example screen 4000 of an interactive GUI for initiating a new conversation. Example screen 4000 displays a user confirmation window 4010 confirming the upload of a video.

Figure 41:
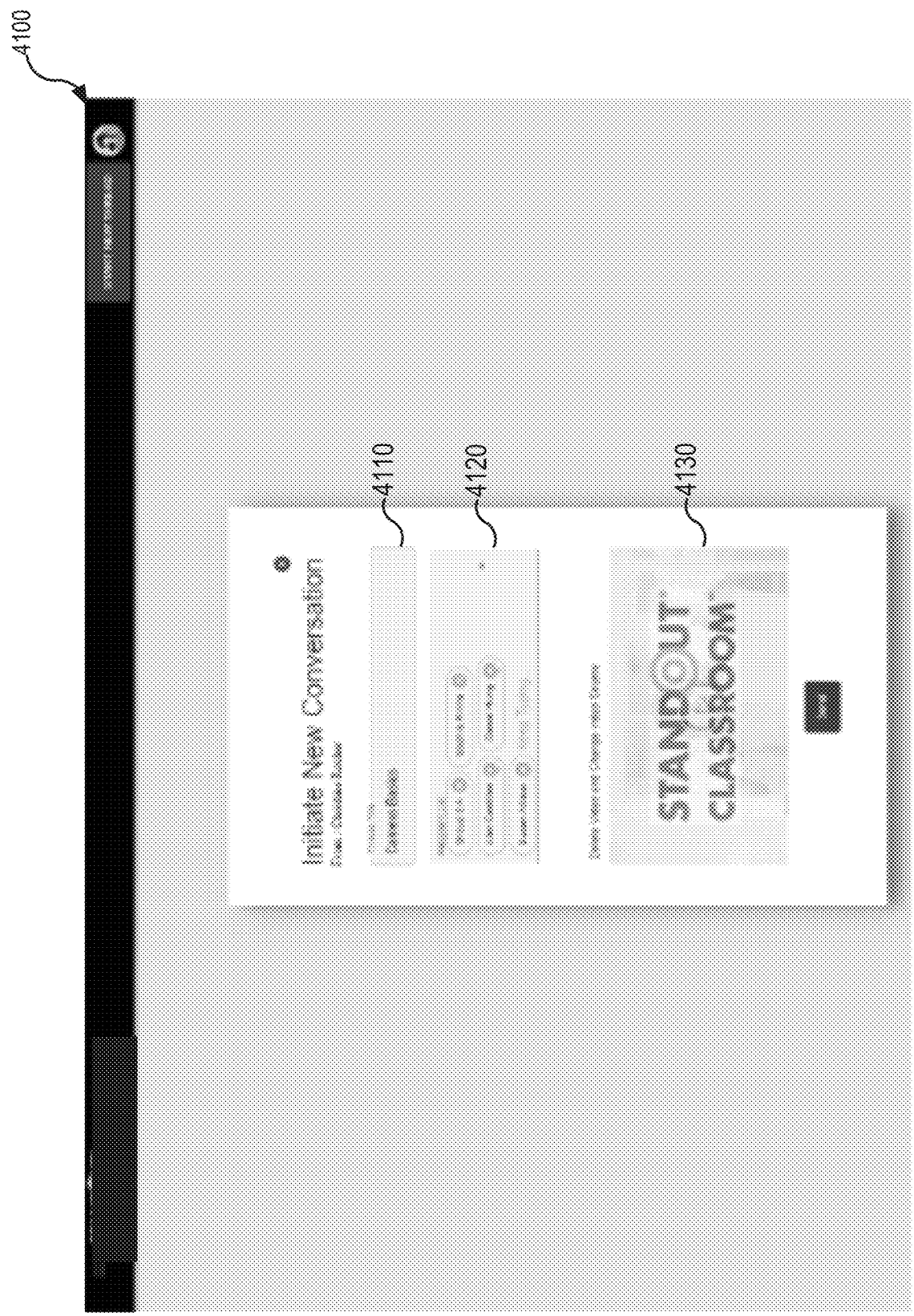
FIG. 41 another example screen of an interactive GUI of the asynchronous communication system.

FIG. 41 another example screen 4100 of an interactive GUI of the asynchronous communication system 304. In the collegiate setting, a class can include a professor (e.g., Christine Rocher) and any number of students (e.g., Alex Castillas, Dewei Hung, Sophie Rinne etc.) and groups (Group 3 A, etc.). The screen 4100 includes a primary video communication 4130 that can be recorded by a professor. The professor can add a title 4110 to his or her message and choose recipients 4120 to send the message to, which can be either a set of students or groups.

Figure 42:
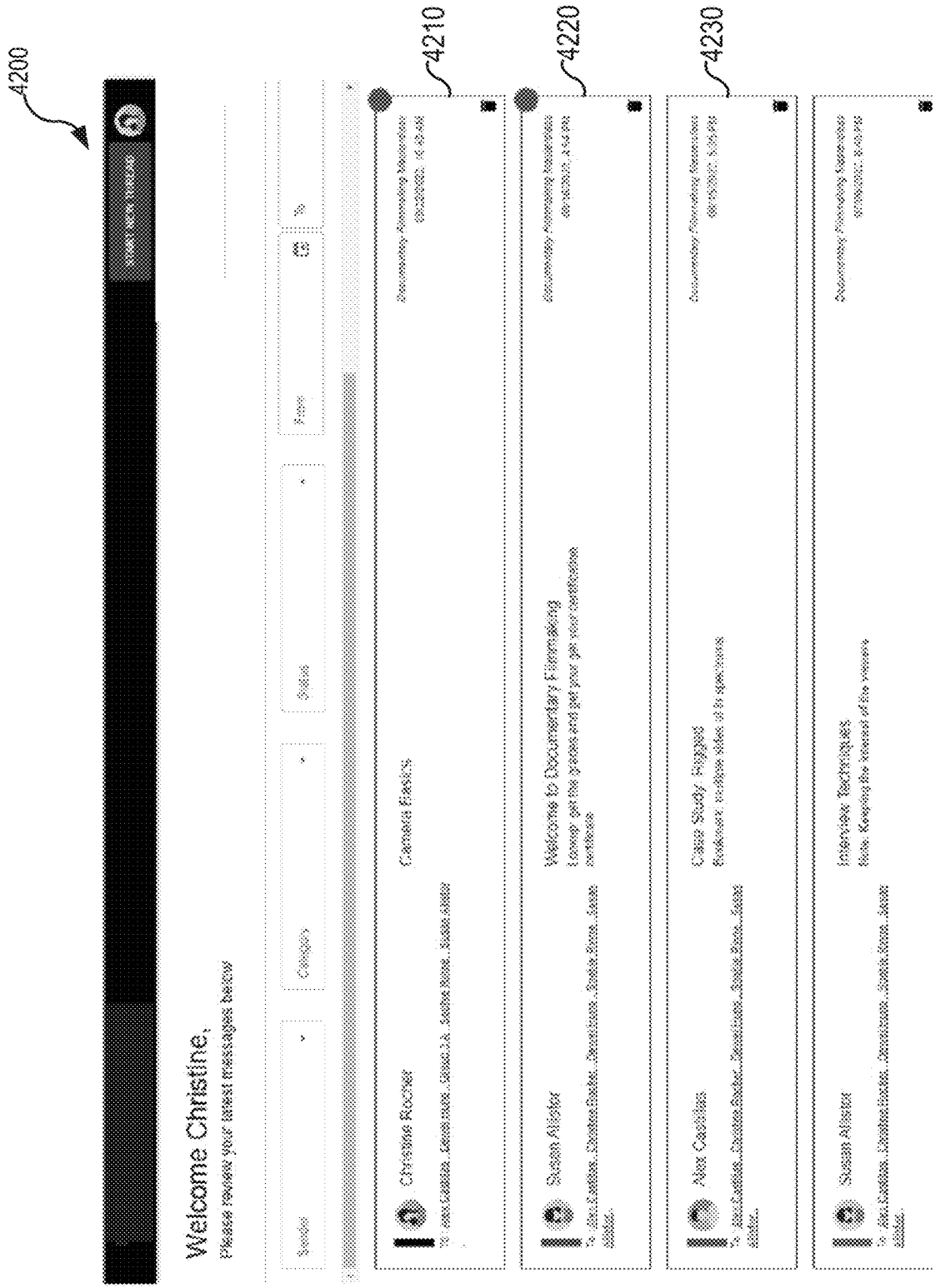
FIG. 42 is another example screen of an interactive GUI illustrating received messages within a video messaging inbox.
Figure 43:
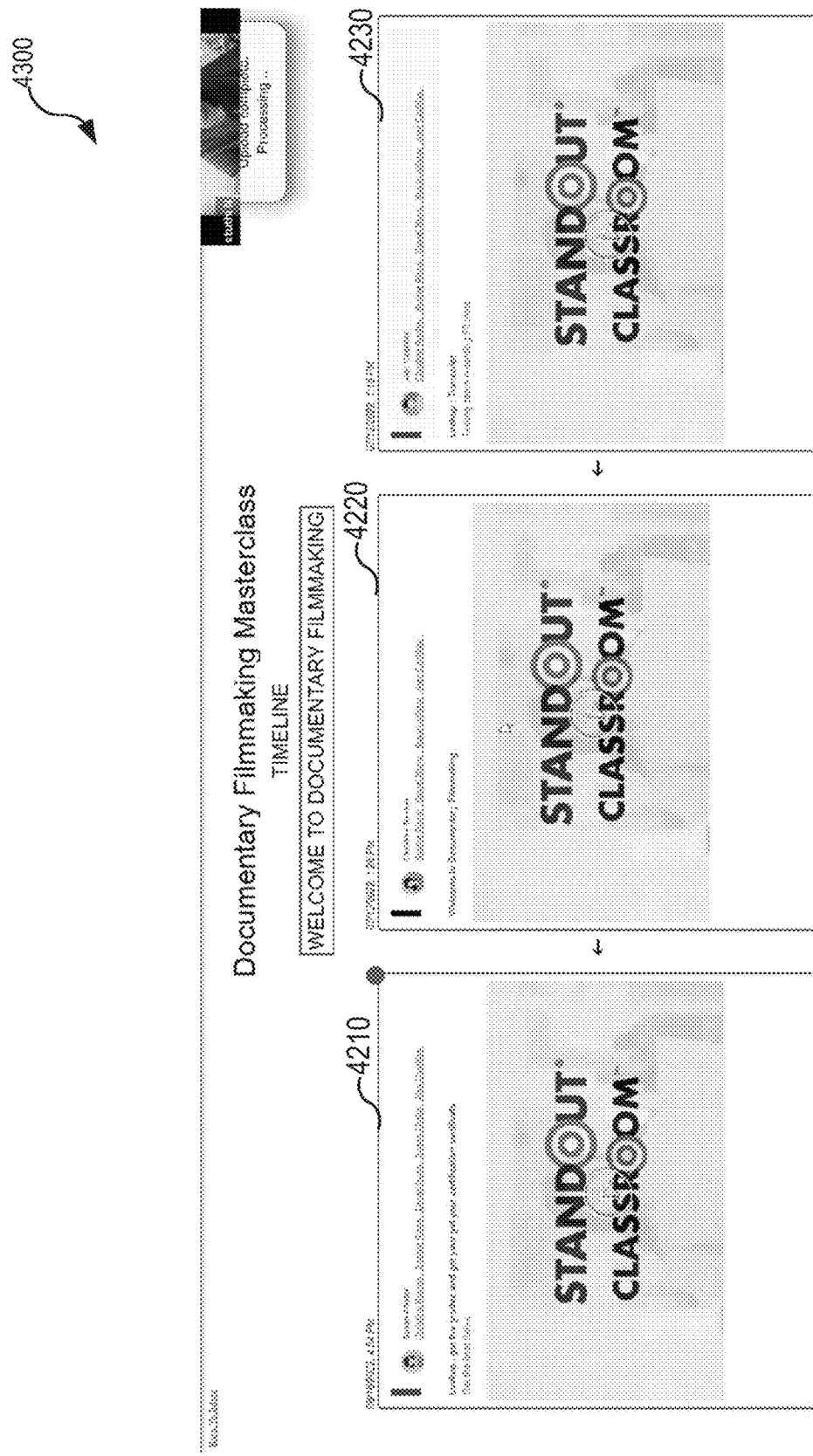
FIG. 43 is an example screen of an interactive GUI illustrating a timeline of messages.

FIG. 42 is another example screen 4200 illustrating received messages within a video messaging inbox. By selecting message 4210 of screen 4200, a user can open a timeline 4300 such as the example timeline illustrated in FIG. 43. The timeline 4300 illustrates messages 4210, 4220, 4230 affiliated for a specific lecture such as a documentary filmmaker masterclass. The timeline 4300 orients messages 4210, 4220, 4230 in a horizontal manner. A user can drag the timeline in a left direction or a right direction to move the timeline and view additional messages.

Figure 44:
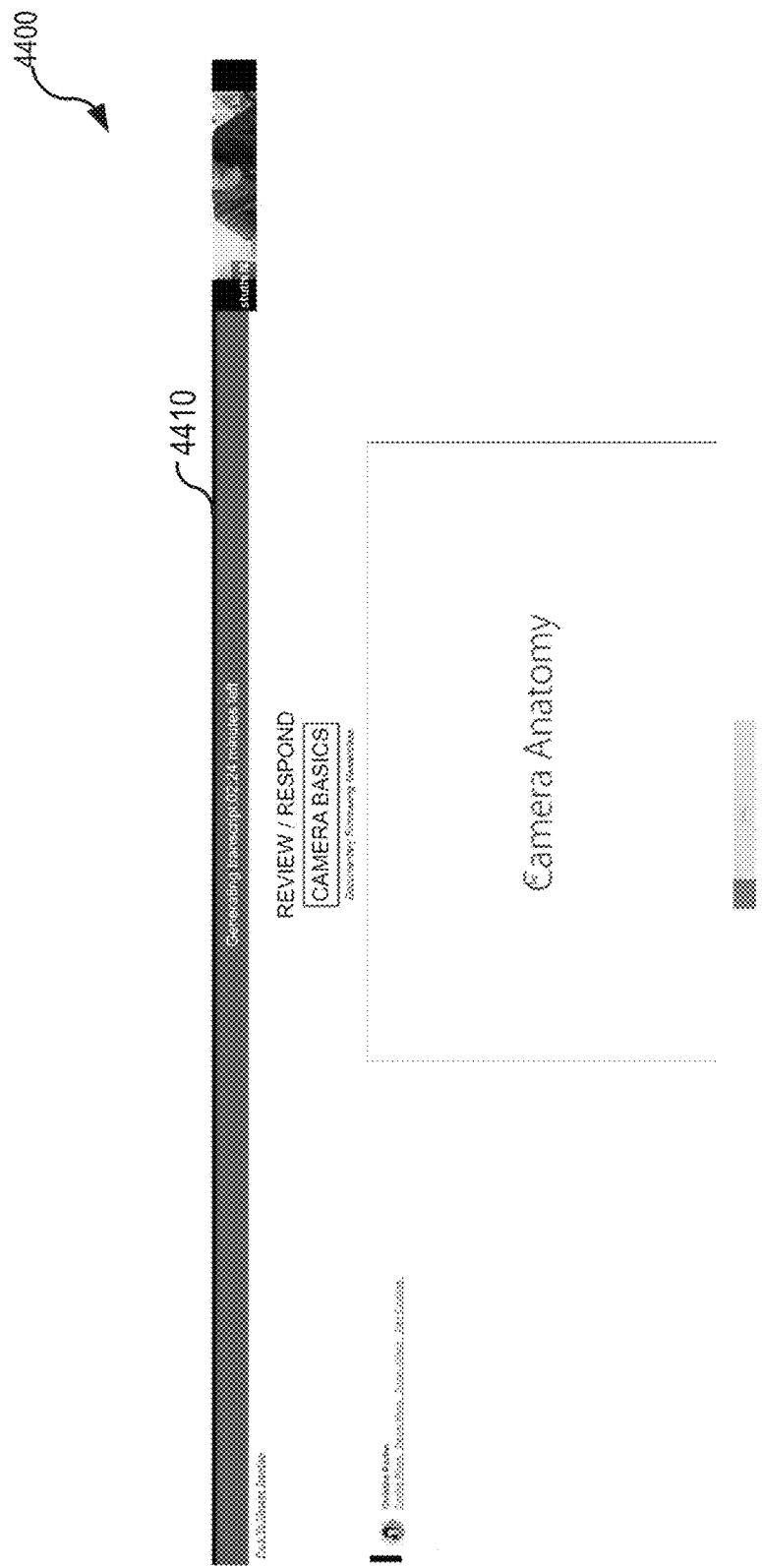
FIG. 44 is an example screen of an interactive GUI illustrating a transcript generation.

FIG. 44 is an example screen 4400 of an interactive GUI illustrating a transcript generation. A user can select a message such as message 4210 from timeline 4300. Selecting message 4220 from timeline 4300 can open screen 4400. Screen 4400 includes a notification 4410 that a transcript such as synched transcript for a particular video associated with the message 4220.

Figure 45:
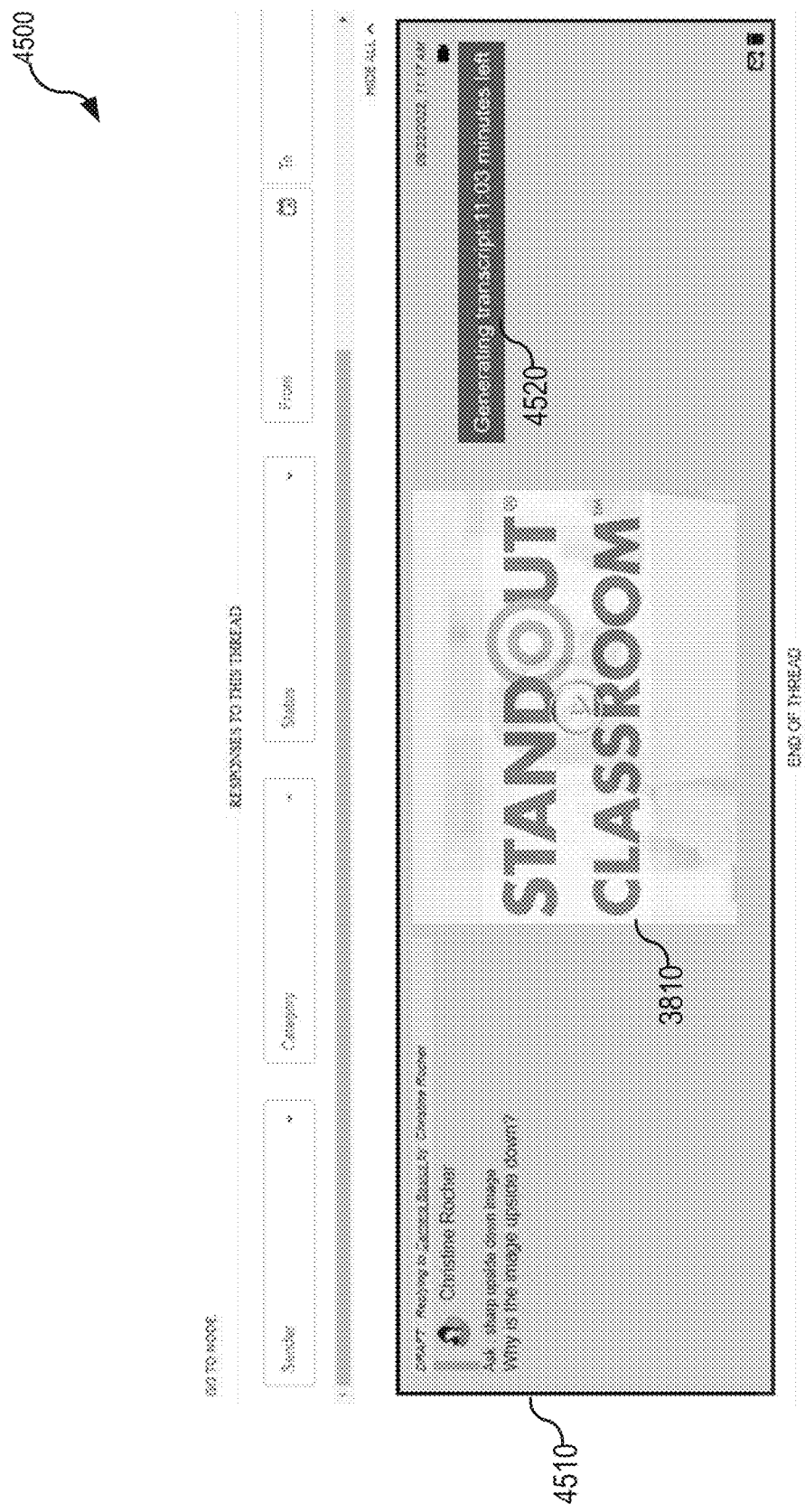
FIG. 45 is an example screen of an interactive GUI illustrating a saved draft message.

FIG. 45 is an example screen 4500 of an interactive GUI illustrating a saved draft message 4510. A draft message 4510 saved by the user can be displayed in a summary section 4520 of the screen 4500 below the original message thread. If uploaded video 3810 is successfully uploaded, a synced transcript for the uploaded video 3810 is automatically generated and the estimated time to generate the synced transcript is displayed to the user via notification 4520. In some configurations, the user cannot send this draft message 4510 to other users until the synced transcript generation is complete.

Figure 46:
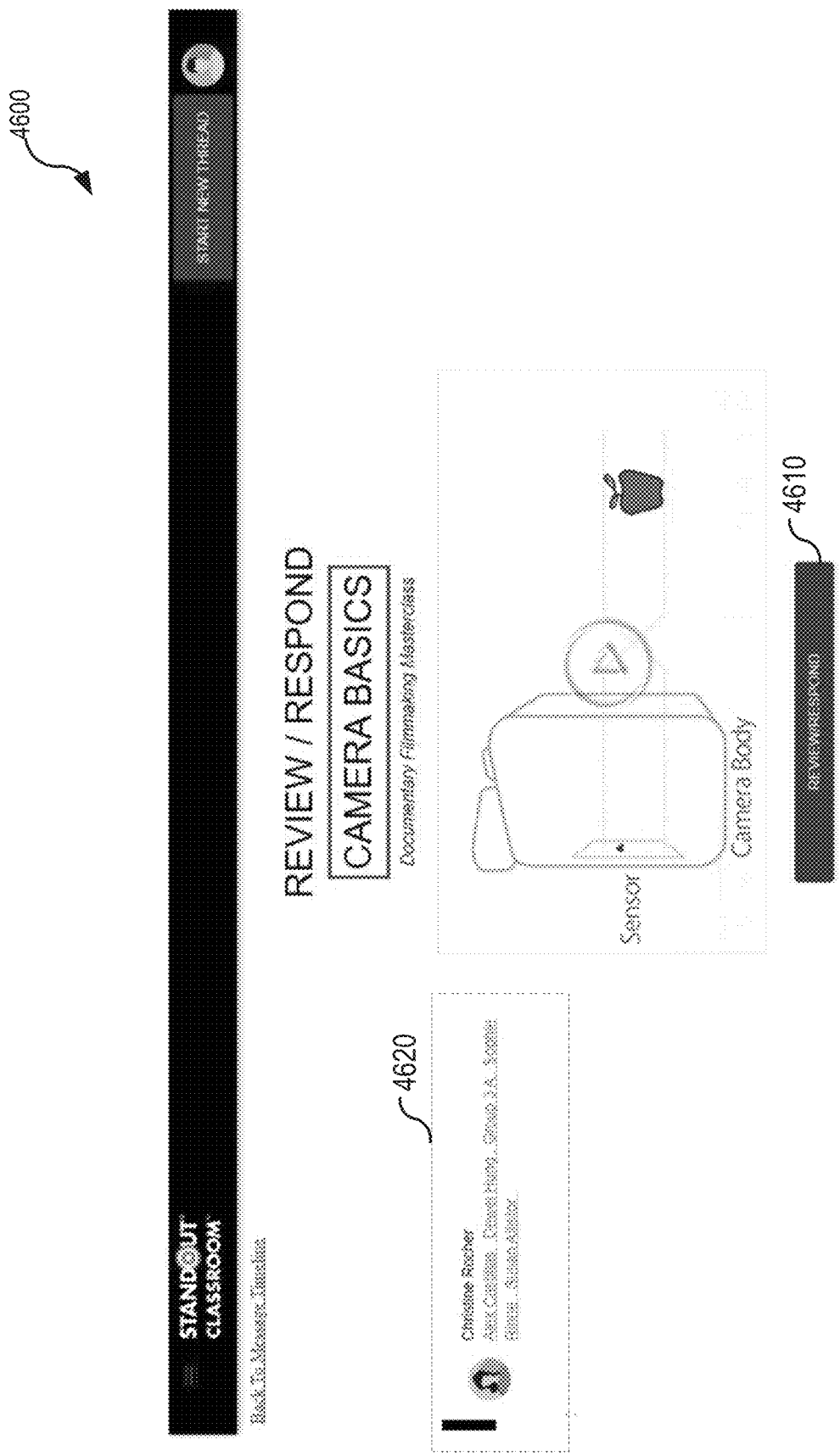
FIG. 46 is an example screen of an interactive GUI that is displayed to a user after selecting, for example, message from the example screen of FIG. 42.
Figure 47:
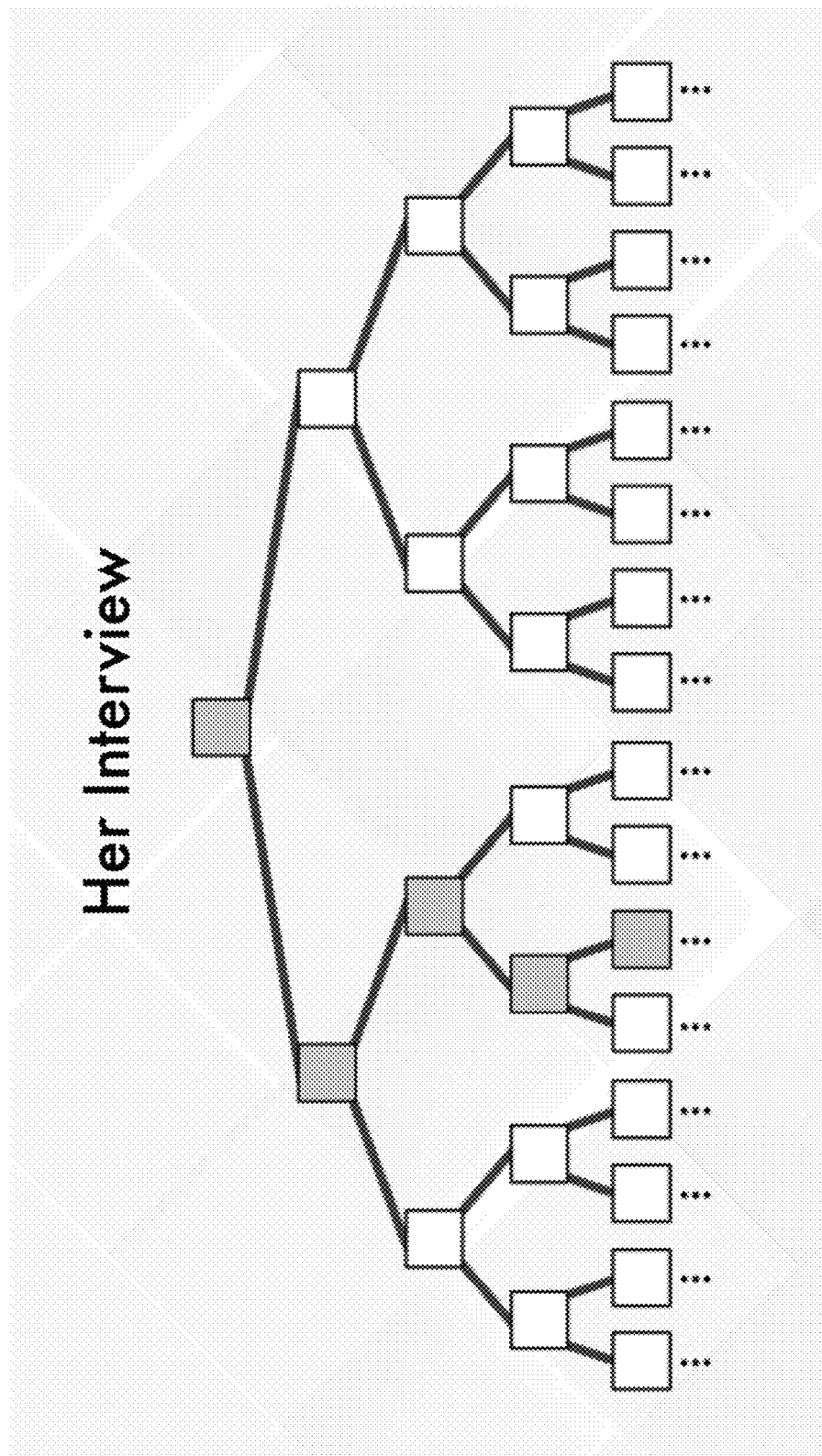
FIG. 47 is an example diagram illustrating a dating profile interview.

FIG. 46 is an example screen 4600 of an interactive GUI that is displayed to a user after selecting, for example, message 4220 from screen 4200. The user can review/respond to message 4220 by selecting radio button 4610. Additionally, screen 4600 includes a notification 4620 that identifies a listing of users received the thread One example application of the asynchronous communication system 304 is in an online dating environment, which is described in more detail in FIGS. 37-44. FIG. 47 is an example diagram 4700 illustrating a dating profile interview.

Figure 48:
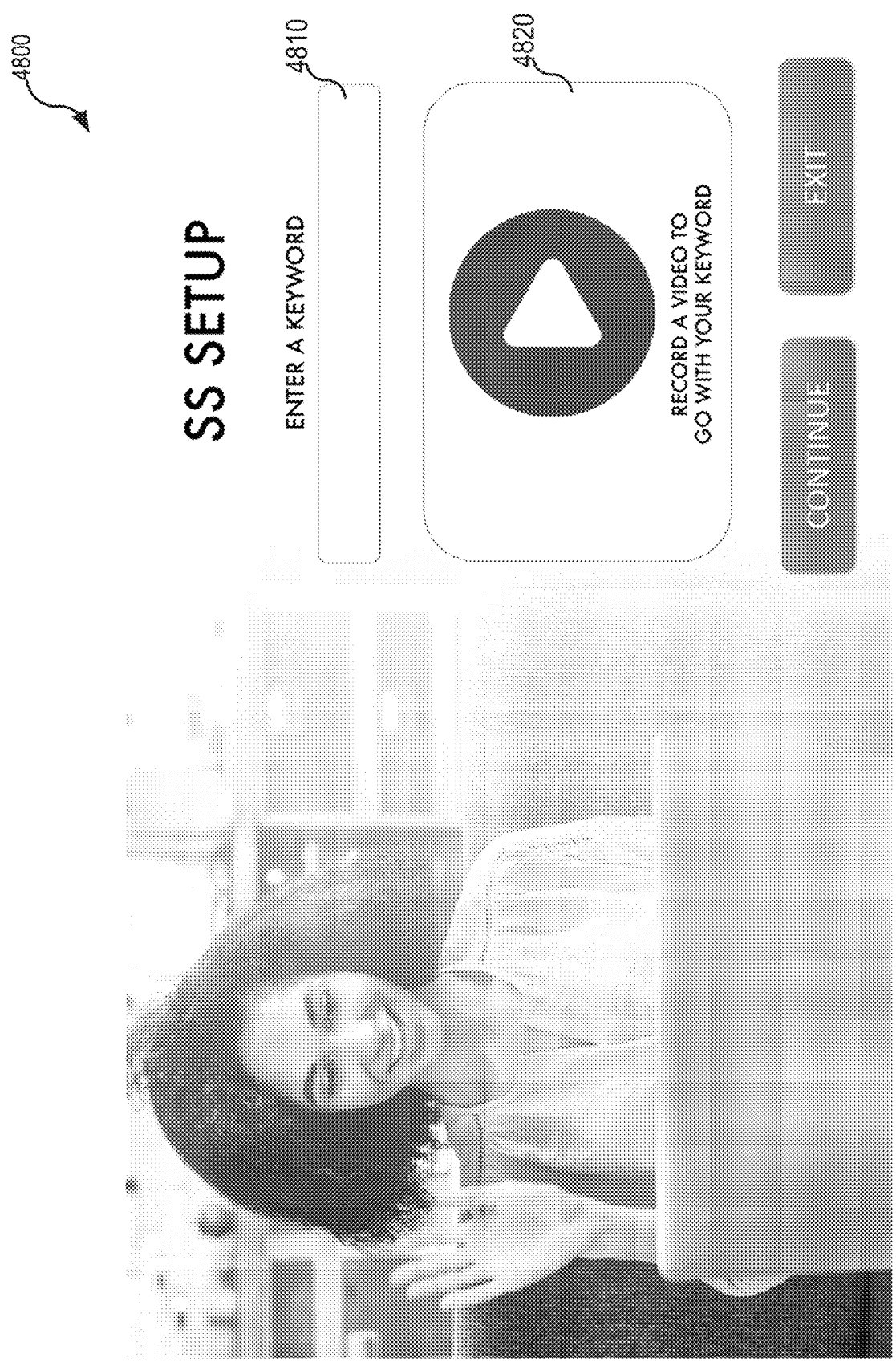
FIG. 48 is an example screen of an online dating site using an asynchronous communication system.

FIG. 48 is an example screen 4800 of an online dating site using an asynchronous communication system. The example screen 4800 can be an initial setup screen where a user can enter a keyword within entry box 4810 relevant to the user's dating preferences. This keyword can be used, for example, by other users to find the user. The user can initiate a recording of a primary video communication to go with the keyword using radio button 4820. This primary video communication can be processed into a message thread as described in detail in FIGS. 1-2.

Figure 49:
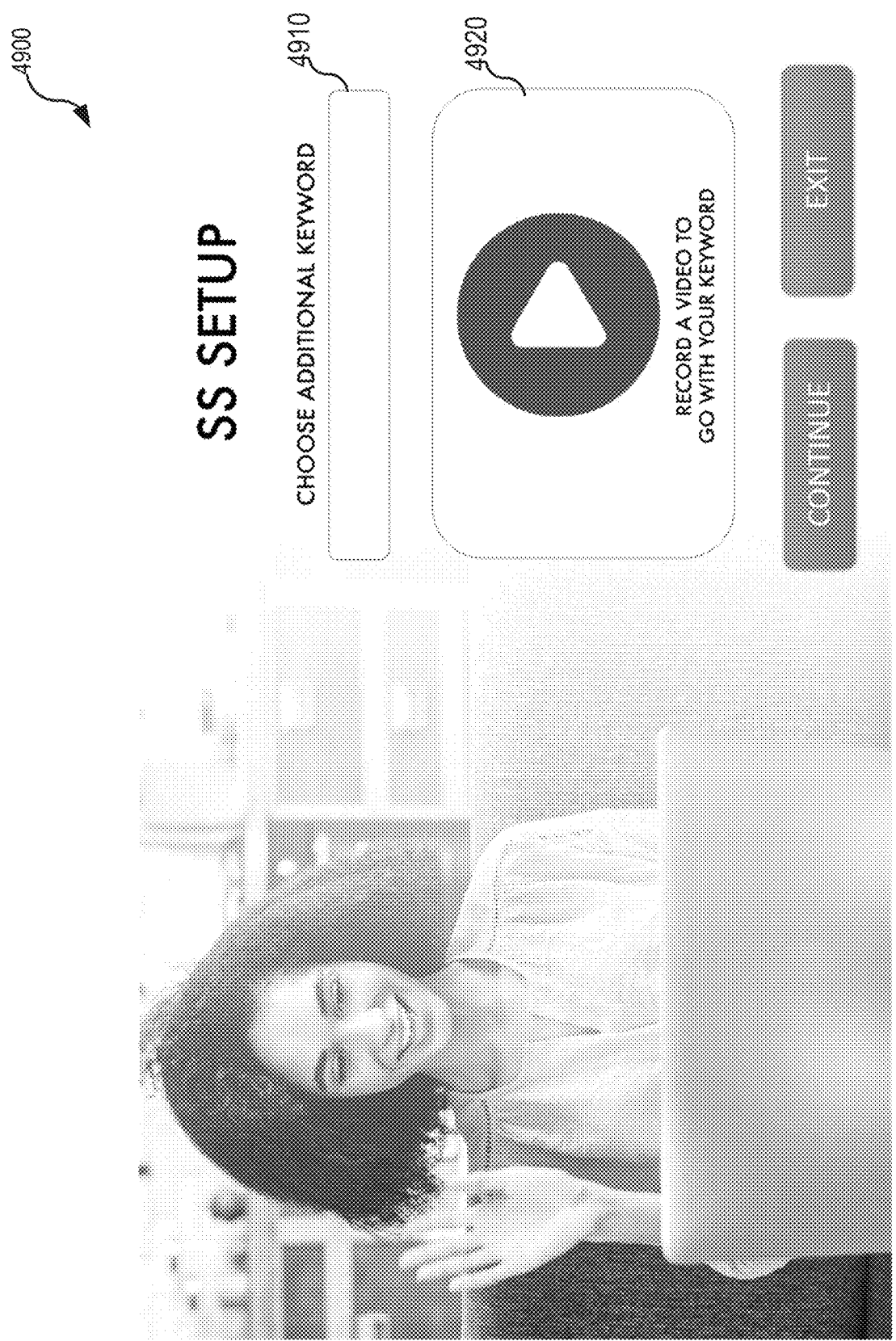
FIG. 49 is another example screen of an online dating site using an asynchronous communication system.

FIG. 49 is another example screen 4900 of an online dating site using an asynchronous communication system. The user can enter additional keywords for the dating profile using entry box 4910. Additional video communications can be recorded for each keywords using radio button 4920.

FIG. 50 is another example screen 5000 of an online dating site using an asynchronous communication system for dating profile data entry. Through annotation of screen 5000, a user can submit a number of identifying personal features to setup a dating profile. Such features can include, for example, personal details about themselves such as a nickname, age, gender, sexual preference, and the like. The user can also enter preferences for a potential partner such as age, gender, sexual preference, and the like.

Figure 51:
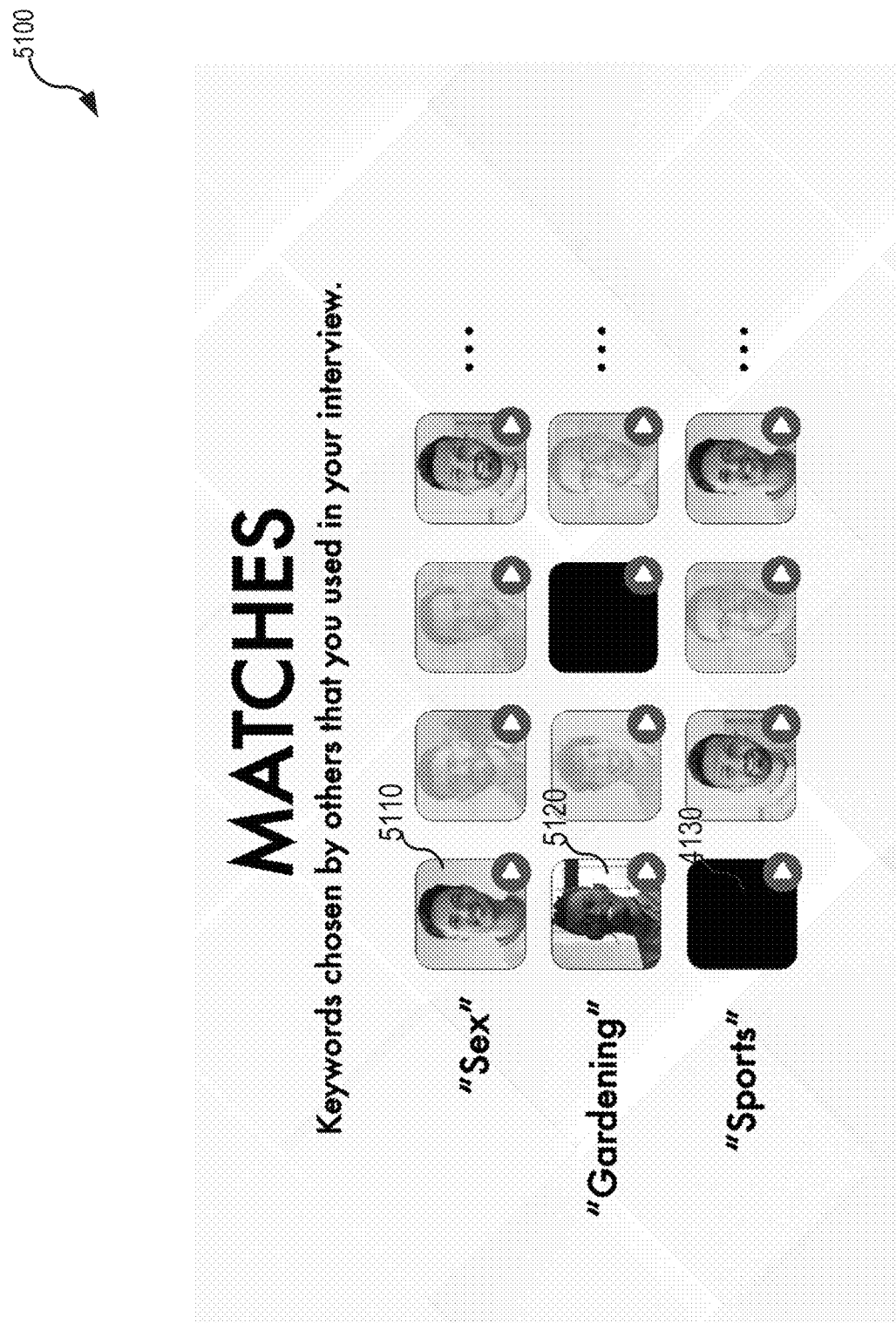
FIG. 51 is an example screen of an online dating site using an asynchronous communication system displaying potential keyword matches.

FIG. 51 is an example screen 5100 of an online dating site using an asynchronous communication system displaying potential keyword matches. If a user enters, for example, keywords such as sex, gardening, or sports using screens 4800, 4900, then a number of video communications 5110, 5120, 5130 of users that also entered in such keywords. For example, video communication 5110 is of a user who entered a keyword of sex and recorded such video associated with that keyword. Video communication 5120 is of a user who entered a keyword of gardening and recorded such video associated with that keyword. Video communication 5130 is of a user who entered a keyword of sports and recorded such video associated with that keyword.

Figure 52:
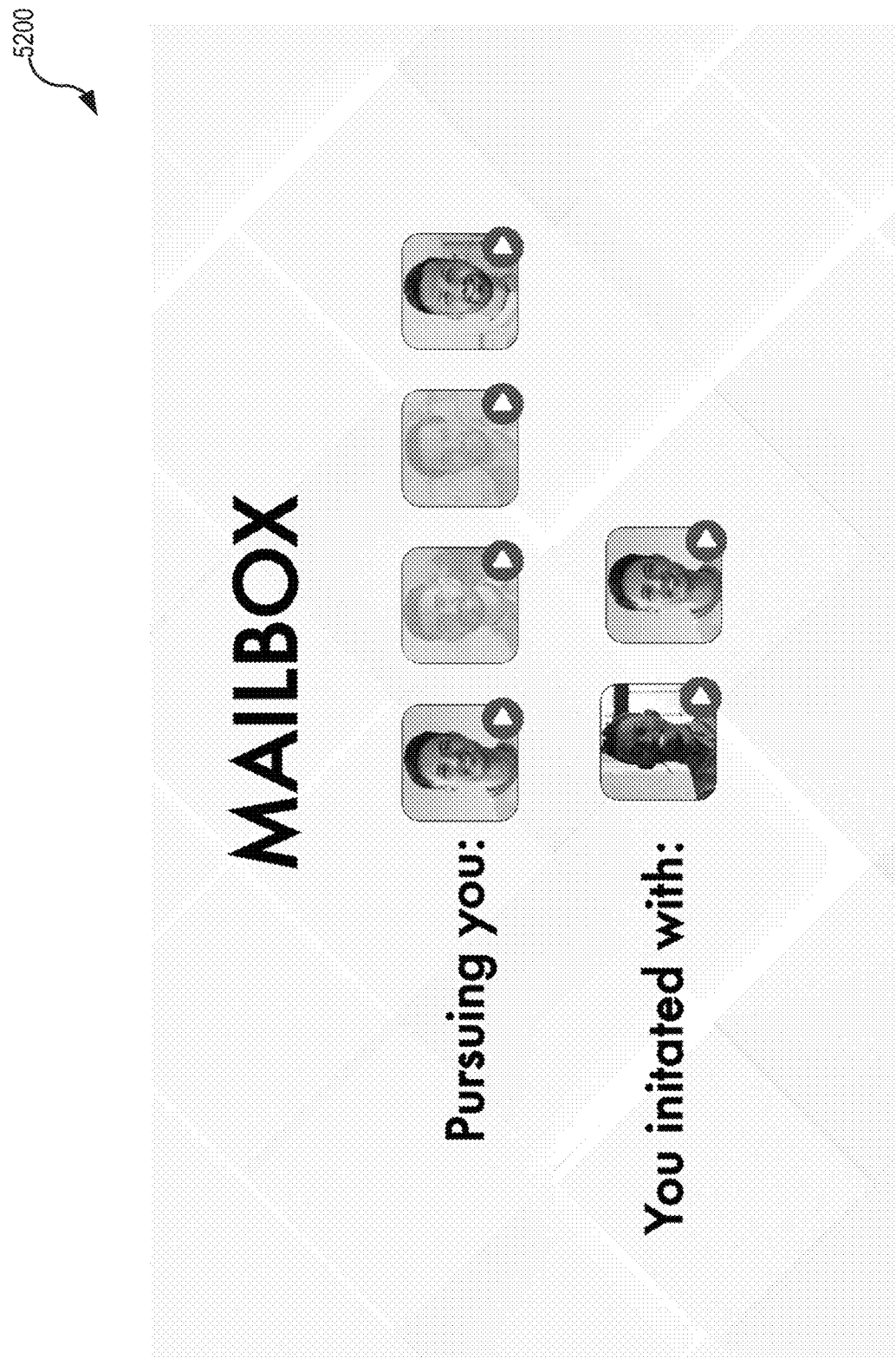
FIG. 52 is an example screen of an online dating site using an asynchronous communication system displaying a video messaging mailbox.

FIG. 52 is an example screen 5200 of an online dating site using an asynchronous communication system displaying a video messaging mailbox. The video messaging mailbox can include video communications of users pursuing a specific user as well as video communications of users being pursued by that specific user.

Figure 53:
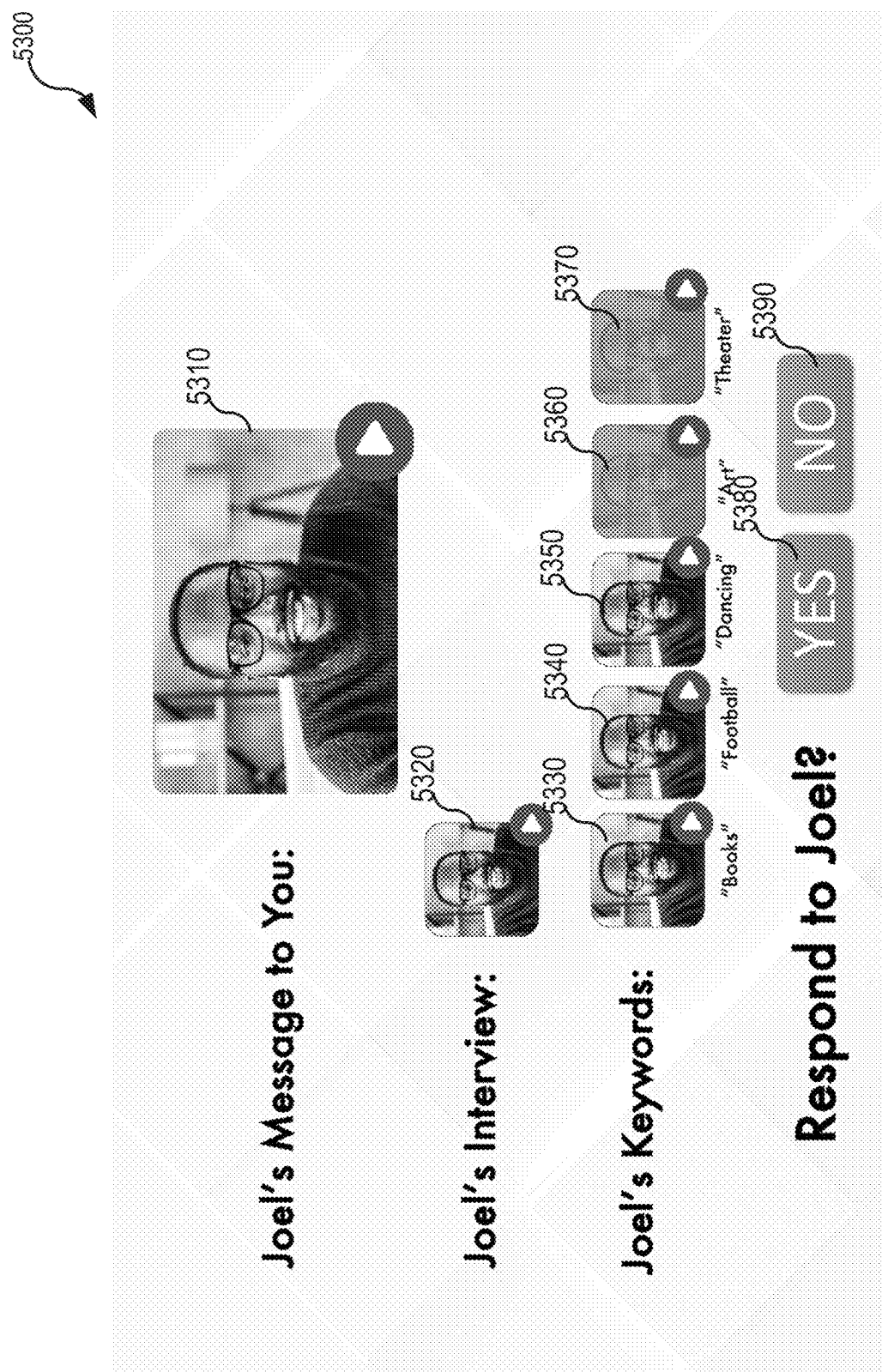
FIG. 53 is an example screen of an online dating site using an asynchronous communication system displaying video communications of a specific user being pursued by another user.

FIG. 53 is an example screen 5300 of an online dating site using an asynchronous communication system displaying video communications of a specific user being pursued by another user. For example, in FIG. 53 a user is pursing another user, Joel. The user can access a unique video 5310 Joel recorded for that user. The user can also access Joel's interview video 5320. Additionally, the user can access any videos Joel recorded for particular keyword such as video communication 5330 associated with the keyword books, video communication 5340 associated with the keyword football, video communication 5350 associated with the keyword dancing, video communication 4360 associated with the keyword art, and video communication 5370 associated with the keyword theatre. Via screen 5300 the user also has the option to respond to Joel by recording a video message using the affirmative radio button 5380 or the discarding radio button 4390.

Figure 54:
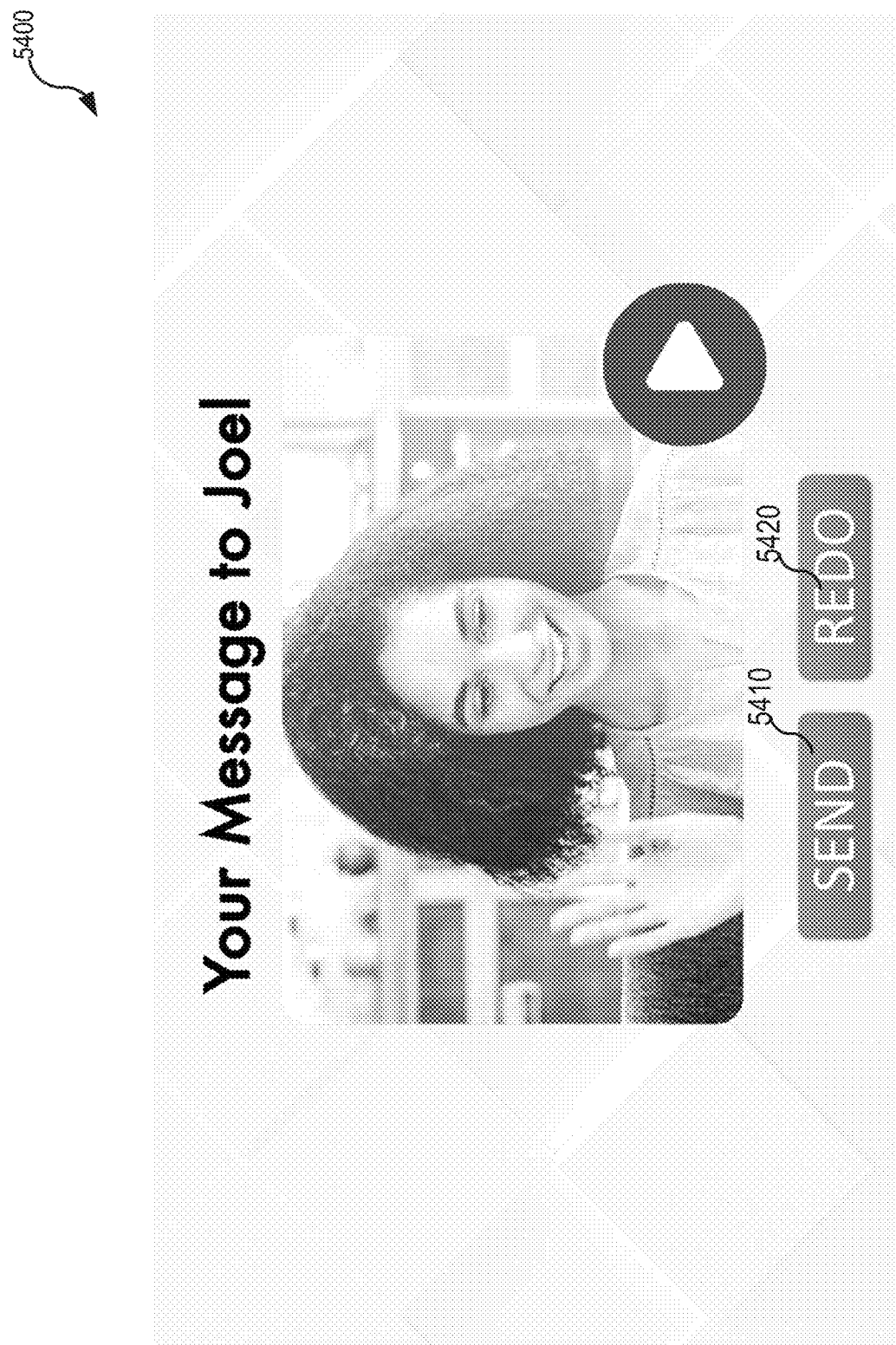
FIG. 54 is an example screen of an online dating site using an asynchronous communication system displaying options to record video responses.

FIG. 54 is an example screen 5400 of an online dating site using an asynchronous communication system displaying options to record video responses. A user selecting affirmative radio button 5380 can record a video communication in response to Joel. The user can send any recorded video communication to Joel using the send radio button 5410. Alternatively, the user can re-record a recorded video communication using the redo radio button 5420.

Figure 55:
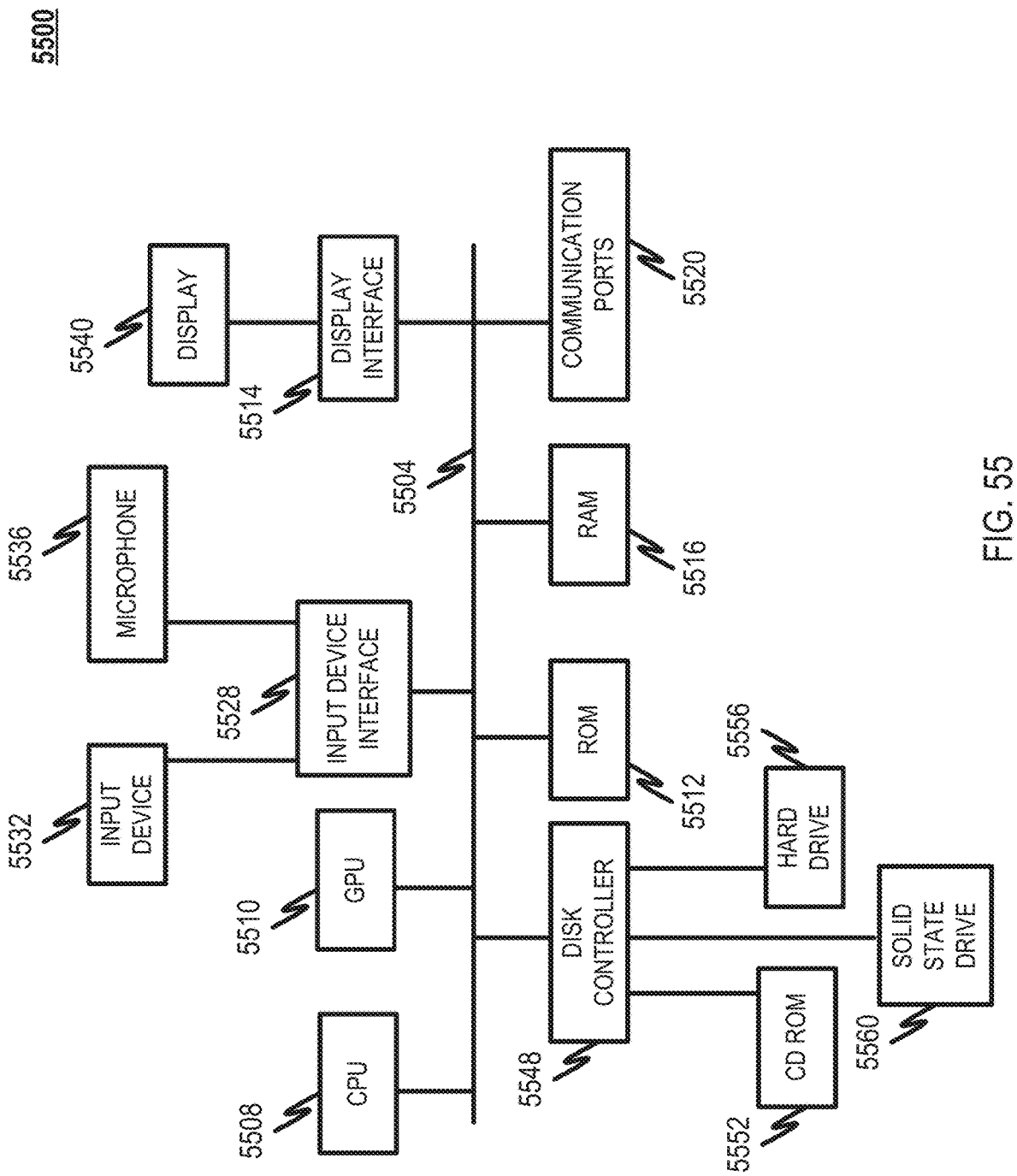
FIG. 55 is a diagram illustrating a sample computing device architecture for implementing various aspects described herein in which certain components can be omitted depending on the application.

FIG. 55 is a diagram 5500 illustrating a sample computing device architecture for implementing various aspects described herein in which certain components can be omitted depending on the application. A bus 5504 can serve as the information highway interconnecting the other illustrated components of the hardware. A processing system 5508 labeled CPU (central processing unit) (e.g., one or more computer processors/data processors at a given computer or at multiple computers) and/or a GPU-based processing system 5510 can perform calculations and logic operations required to execute a program. A non-transitory processor-readable storage medium, such as read only memory (ROM) 5512 and random-access memory (RAM) 5516, can be in communication with the processing system 5508 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 5548 can interface with one or more optional disk drives to the system bus 5504. These disk drives can be external or internal floppy disk drives such as 5560, external or internal CD-ROM, CD-R, CD-RW or DVD, or solid-state drives such as 5552, or external or internal hard drives 5556. As indicated previously, these various disk drives 5552, 5556, 5560 and disk controllers are optional devices. The system bus 5504 can also include at least one communication port 5520 to allow for communication with external devices either physically connected to the computing system or available externally through a wired or wireless network. In some cases, the at least one communication port 5520 includes or otherwise comprises a network interface.

To provide for interaction with a user, the subject matter described herein can be implemented on a computing device having a display device 5540 (e.g., a CRT (cathode ray tube) or LCD (liquid crystal display) or OLED (organic LED) monitor) for displaying information obtained from the bus 5504 via a display interface 5514 to the user and an input device 5532 such as keyboard and/or a pointing device (e.g., a mouse or a trackball) and/or a touchscreen by which the user can provide input to the computer. Other kinds of input devices 5532 can be used to provide for interaction with a user as well; for example, feedback provided to the user can be any form of sensory feedback (e.g., visual feedback, auditory feedback by way of a microphone 5536, or tactile feedback); and input from the user can be received in any form, including acoustic, speech, or tactile input. The input device 5532 and the microphone 5536 can be coupled to and convey information via the bus 5504 by way of an input device interface 5528. Other computing devices, such as dedicated servers, can omit one or more of the displays 5540 and display interface 5514, the input device 2332, the microphone 5536, and input device interface 5528.

Figure 56:
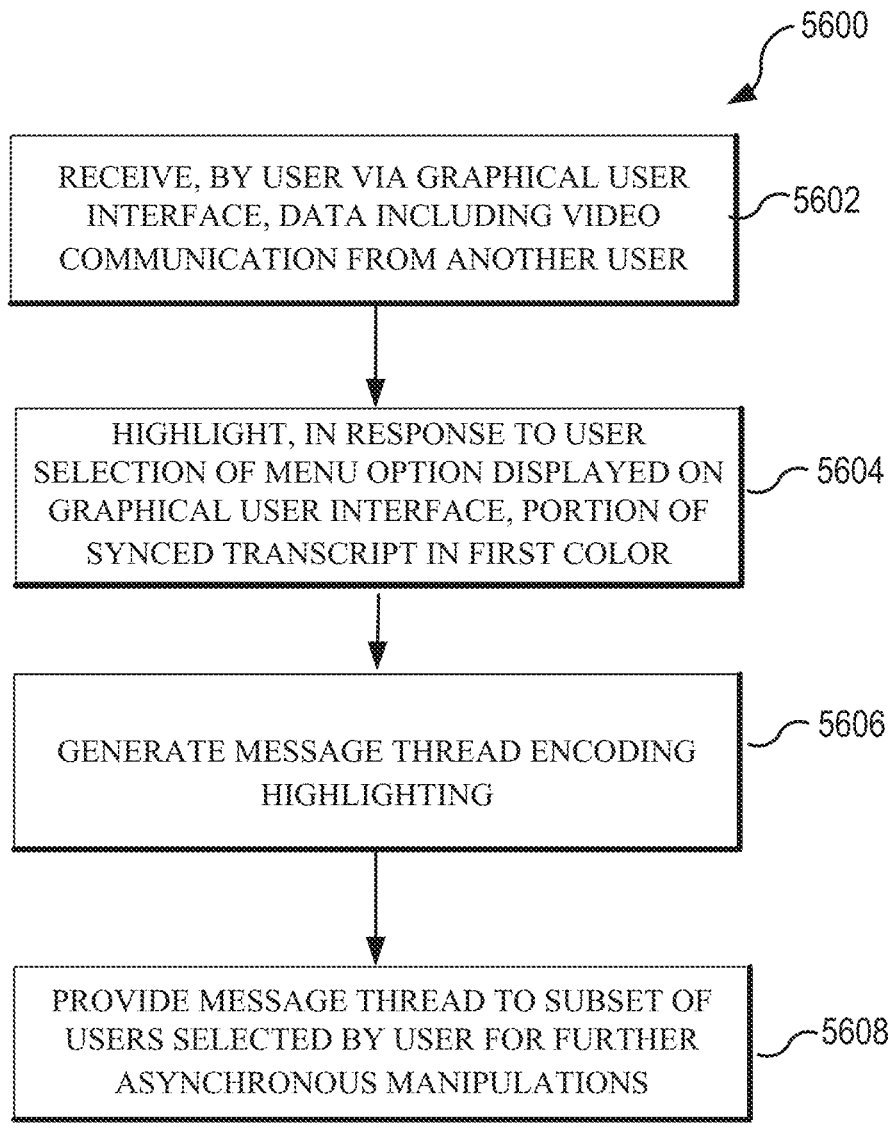
FIG. 56 is a process flow diagram illustrating a method of asynchronous communication using the asynchronous communication system.

FIG. 56 is a process flow diagram 5600 illustrating a method of asynchronous communication using an asynchronous communication system 304. A user receives, at 5602, via a graphical user interface data including a video communication from another user. In response to a user selection of a menu option (e.g., from menus 730, 1030) displayed on the graphical user interface, a portion of a synced transcript (e.g., synced transcript 720, 1020) is highlighted, at 5604, in a first color. The synced transcript corresponds to an audio component of the video communication (e.g., playable video component 710, 1010). The first color corresponds to the same color of the menu option (e.g., portion 722 is highlighted in red which corresponds to the red color of the "Disagree" user annotation 732 of menu 730, portion 822 is highlighted in green which corresponds to the green color of the "Lookup" user annotation 832 of menu 830, portion 1622 is highlighted in orange which corresponds to the orange color of the "Ask" user annotation 1032 of menu 1030). A message thread is generated, at 5606, that encodes the highlighting. The message thread includes (1) a playable video component W1 including an audio recording of spoken words, (2) a synced transcript W2 of the spoken words, and (3) a reserved space W3 for a second message thread made in response to the playable video component and the synced transcript. The message thread is provided, at 5608, to a subset of users selected by the user for further asynchronous annotations.

Figure 57:
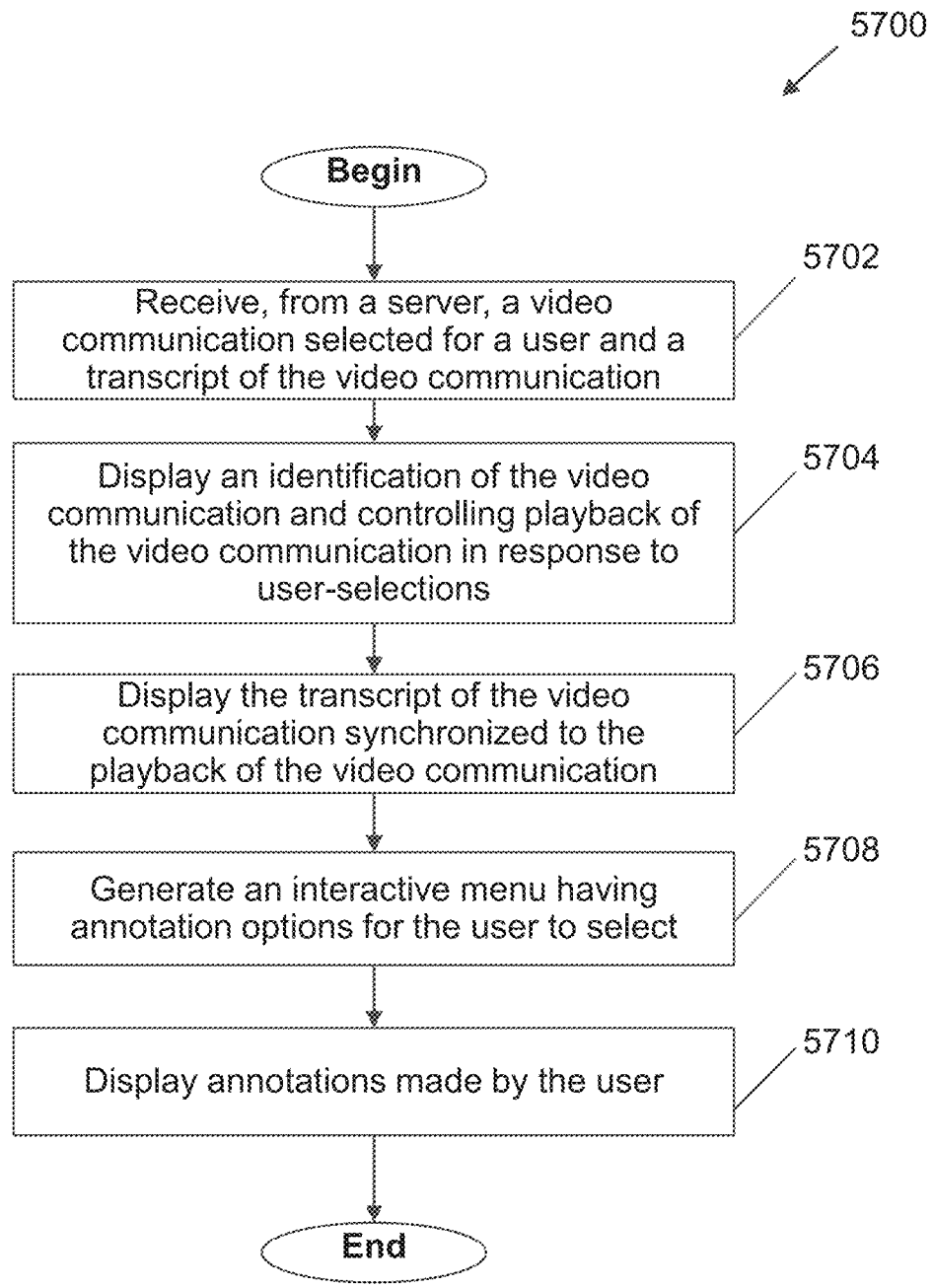
FIG. 57 is a process flow diagram illustrating a method for distributing communications among selected users using an asynchronous communication system.

FIG. 57 is a process flow diagram 5700 illustrating a method for distributing communications among selected users using an asynchronous communication system 304. At a step 5702, a user device receives, from a server, a video communication selected for a user and a transcript of the video communication. In some embodiments, the server maintains a plurality of asynchronous communicated content. In some embodiments, communicated content includes the video communication, the transcript synchronized to at least part of an audio track of the video communication, a distribution list of recipients of the communicated content, and any annotations made to the communicated content. The some embodiments, the annotation can be a textual annotation, an audio annotation, a video annotation, or a combination thereof.

At a step 5704, the user device displays an identification of the video communication and controlling playback of the video communication in response to user-selections.

At a step 5706, the user device displays the transcript of the video communication synchronized to the playback of the video communication.

At a step 5708, the user device generates an interactive menu (e.g., menu 730 of FIG. 7 and/or having annotation options for the user to select that is responsive to the user (i) highlighting a text excerpt from the transcript, (ii) selecting at least one of the asynchronous annotation options, and (iii) generating an annotation to be associated with the highlighted text excerpt. In some embodiments, the interactive menu further includes user selection options for the user to select a subset of the recipients for whom the annotation is to be displayed. In some embodiments, the annotation may include a textual content retrieved from a third-party source based on the highlighted text excerpt (e.g., dictionary definition from an online dictionary, a portion of Wikipedia entry from Wikipedia).

At a step 5710, the user device displays annotations made by the user (e.g., in summary section 740 in screen 700, or in cumulative summary 2610 in screen 2600). In some embodiments, the displayed annotations are associated with the displayed portion of the transcript. At an optional step, the user device may display annotations that are (1) made by other users and (2) selected for the user (e.g., by checking the user's name in screen 2300 in FIG. 23). At an optional step, the user device may change a text style (e.g., by bolding, italicizing, underlining, changing font, changing text color, and/or changing background color) of text excerpts in the displayed portion of the transcript that are associated with the displayed annotations.

In some embodiments, one or more steps in process 5700 may be performed concurrently and/or in a different order.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random-access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An asynchronous communications system for distributing, to a group of users, multimedia content that can be augmented asynchronously, the system comprising:
  a server for maintaining a plurality of asynchronously communicated content, wherein an instance of communicated content includes a video communication, a transcript synchronized to at least a portion of an audio track of the video communication, a distribution list of selected recipients of the communicated content, and any augmentations made to the communicated content; and
  an interactive graphical user interface operable on a device of a user, wherein the device is in communication with the server to access or provide communicated content, and wherein the graphical user interface generates a display and includes:
    a video region for playing a video communication of communicated content,
    a transcript region for displaying at least a portion of the transcript synchronized to an audio track of the video communication, and
    an interactive menu of a plurality of types of communication functions from which the user can select, wherein the graphical user interface is responsive to the user
      (i) highlighting a text excerpt from the synchronized transcript, and
      (ii) selecting, from the interactive menu, a type of communication function to be associated with the highlighted excerpt,
    wherein the graphical user interface augments the communicated content into a third region of the user's display based upon the type of function that the user selects from the interactive menu and the highlighted text excerpt from the synchronized transcript, and depending upon the selected type of communication function, the augmentation is additionally made accessible via the server to any other users that the user selects from the group.

2. The system of claim 1, wherein when the selectable type of communication function is an annotation, the graphical user interface enables the user to configure the annotation as a textual annotation, an audio annotation, a video annotation, or a combination thereof.

3. The system of claim 1, wherein the interactive graphical user interface is configured to provide a visual indication in the transcript region that the user associated the highlighted text excerpt of the transcript with a selected type of communication function.

4. The system of claim 3, wherein the user selects to make the augmentation to the communicated content accessible to another user, and the user then accesses further augmentations made to the communicated content by the other user.

5. The system of claim 3, wherein when the selected type of communication function is an annotation, the interactive graphical user interface configures the third region for displaying the annotations provided by the user.

6. The system of claim 1, wherein the types of communications functions in the interactive menu can include at least one of (i) dictionary lookup requests, (ii) asking a question to the user that generated the video content, and (iii) indicating disagreement with a portion of the content, and wherein the third region of the graphical user interface provides user selection options for the user to select a subset of users in the group to access the annotation.

7. The system of claim 1, wherein when the selected type of communication function is a lookup annotation function, the lookup operation includes a textual content retrieved from a third-party source based on the highlighted text excerpt.

8. A method for distributing, to a group of users, multimedia content that can be augmented asynchronously, the method comprising:

receiving, from a server, a video communication selected for a user and a transcript of the video communication, wherein the server maintains a plurality of asynchronous communicated content, wherein an instance of communicated content includes the video communication, the transcript synchronized to at least a portion of an audio track of the video communication, a distribution list of recipients of the communicated content, and any augmentations made to the communicated content; and in a graphical user interface:

displaying in an transcript region an identification of the video communication and controlling playback of the video communication in response to user-selections;

displaying in a transcript region the transcript of the video communication synchronized to the playback of the video communication; and generating an interactive menu of a plurality of types of communications functions from which the user can select, wherein the graphical user interface is responsive to the user (i) highlighting a text excerpt from the transcript, and (ii) selecting, from the interactive menu, a type of communication function to be associated with the highlighted excerpt, wherein the graphical user interface augments the communicated content into a third region of the user's display based upon the type of function that the user selects from the interactive menu and the highlighted text excerpt from the synchronized transcript, and depending upon the selected type of communication function, the augmentation is additionally made accessible via the server to any other users that the user selects from the group.

9. The method of claim 8, wherein when the selectable type of communication function is an annotation, the graphical user interface enables the user to configure the annotation as a textual annotation, an audio annotation, a video annotation, or a combination thereof.

10. The method of claim 8, wherein the graphical user interface is configured to provide a visual indication in the transcript region that the user associated the highlighted text excerpt of the transcript with a selected type of communication function.

11. The method of claim 8, wherein the user selects to make the augmentation to the communicated content accessible to another user, and then the user accesses further augmentations made to the communicated content by the other user.

12. The method of claim 8, wherein the graphical user interface is configured to change a text style of text excerpts in the displayed portion of the transcript that are associated with the selected type of communication function.

13. The method of claim 8, wherein the types of communications functions in the interactive menu can include at least one of (i) dictionary lookup requests, (ii) asking a question to the user that generated the video content, and (iii) indicating disagreement with a portion of the content, and wherein the third region of the graphical user interface provides user selection options for the user to select a subset of users in the group to access augmented communication content.

14. The method of claim 8, wherein when the selected type of communication function is a lookup function, the lookup operation includes retrieving a textual content from a third-party source based on the highlighted text excerpt.

15. A computer-readable storage medium comprising instructions which, when executed by a computer, cause the computer to carry out, a method for distributing, to a group of users, multimedia content that can be augmented asynchronously, the method comprising:

receiving, from a server, a video communication selected for a user and a transcript of the video communication, wherein the server maintains a plurality of asynchronous communicated content, wherein an instance of communicated content includes the video communication, the transcript synchronized to at least a portion of an audio track of the video communication, a distribution list of recipients of the communicated content, and any augmentations made to the communicated content; and in a graphical user interface:

displaying in an transcript region an identification of the video communication and controlling playback of the video communication in response to user-selections;

displaying in a transcript region the transcript of the video communication synchronized to the playback of the video communication; and generating an interactive menu of a plurality of types of communications functions from which the user can select, wherein the graphical user interface is responsive to the user (i) highlighting a text excerpt from the transcript, and (ii) selecting, from the interactive menu, a type of communication function to be associated with the highlighted excerpt, wherein the graphical user interface augments the communicated content into a third region of the user's display based upon the type of function that the user selects from the interactive menu and the highlighted text excerpt from the synchronized transcript, and depending upon the selected type of communication function, the augmentation is additionally made accessible via the server to any other users that the user selects from the group.

16. The storage medium of claim 15, wherein when the selectable type of communication function is an annotation, the graphical user interface enables the user to configure the annotation as a textual annotation, an audio annotation, a video annotation, or a combination thereof.

17. The storage medium of claim 15, wherein the graphical user interface is configured to provide a visual indication in the transcript region that the user associated the highlighted text excerpt of the transcript with a selected type of communication function.

18. The storage medium of claim 15, wherein the user selects to make the augmentation to the communicated content accessible to another user, and then the user accesses further augmentations made to the communicated content by the other user.

19. The storage medium of claim 15, wherein the graphical user interface is configured to change a text style of text excerpts in the displayed portion of the transcript that are associated with the selected type of communication function.

20. The storage medium of claim 15, wherein the interactive menu further includes user selection options for the user to select a subset of the recipients for whom the annotation is to be displayed, wherein the graphical user interface is configured to change a text style of text excerpts in the displayed portion of the transcript that are associated with the selected type of communication function.

* * * * *